(12) United States Patent
Myers et al.

(10) Patent No.: US 9,820,152 B2
(45) Date of Patent: Nov. 14, 2017

(54) INVITATIONS FOR FACILITATING ACCESS TO INTERCONNECTED DEVICES

(71) Applicant: Delphian Systems, LLC, Buffalo Grove, IL (US)

(72) Inventors: Gary L. Myers, Monee, IL (US); Ashok Hirpara, Carol Stream, IL (US); John D. Veleris, Northbrook, IL (US)

(73) Assignee: Delphian Systems, LLC, Buffalo Grove,, IL (US)

( * ) Notice: Subject to any disclaimer, the term of this patent is extended or adjusted under 35 U.S.C. 154(b) by 0 days.

(21) Appl. No.: 15/223,243

(22) Filed: Jul. 29, 2016

(65) Prior Publication Data

US 2017/0055156 A1    Feb. 23, 2017

Related U.S. Application Data

(63) Continuation of application No. 14/712,646, filed on May 14, 2015, now Pat. No. 9,407,624.

(51) Int. Cl.
*H04W 12/08* (2009.01)
*H04L 29/06* (2006.01)
(Continued)

(52) U.S. Cl.
CPC .......... *H04W 12/08* (2013.01); *G06F 3/0484* (2013.01); *H04L 41/28* (2013.01); *H04L 63/08* (2013.01);
(Continued)

(58) Field of Classification Search
CPC .................................................... H04W 12/08
See application file for complete search history.

(56) References Cited

U.S. PATENT DOCUMENTS 6,771,966 B1    8/2004    Chow
6,998,977 B2    2/2006    Gregori et al.
(Continued)

FOREIGN PATENT DOCUMENTS

| WO | 0190843 | 11/2001 |
|---|---|---|
| WO | 2001090843 A2 | 11/2001 |
| WO | 2005091803 | 10/2005 |
| WO | 2005091803 A2 | 10/2005 |

OTHER PUBLICATIONS

"Freescale ZigBee Application User's Guide," Doc. No. ZAUG, Rev. 1.3, Freescale Semiconductor, Jan. 2008.
(Continued)

*Primary Examiner* — Kambiz Zand
*Assistant Examiner* — Thanh Le
(74) *Attorney, Agent, or Firm* — Banner & Witcoff, Ltd.

(57) ABSTRACT

Systems, methods, and devices for forming networks of interconnected devices are provided. Individual devices of the network are configured to utilize multiple wireless communication standards which may include wireless LAN communication standards, short-range wireless communication standards, and low-power wireless communication standards. User utilize access devices to monitor and control the devices of the network. Communications transmitted to devices of the network may be routed through a server located remotely relative to the network as well as through other devices of the network. The devices of the network are configured with multiple security modes having different security features resulting in different response times. The security mode a device utilizes when communicating with an access device or another device of the network is selectable by the user.

20 Claims, 20 Drawing Sheets

(51) Int. Cl.
*H04L 12/24* (2006.01)
*G06F 3/0484* (2013.01)
*H04W 12/04* (2009.01)
*H04W 12/06* (2009.01)
*H04W 84/12* (2009.01)

(52) U.S. Cl.
CPC .......... *H04L 63/105* (2013.01); *H04W 12/04* (2013.01); *H04W 12/06* (2013.01); *H04W 84/12* (2013.01); *Y02B 60/50* (2013.01)

(56) References Cited

U.S. PATENT DOCUMENTS

| | | | |
|---|---|---|---|
| 7,447,176 | B2 | 11/2008 | Ruan et al. |
| 7,606,175 | B1 | 10/2009 | Maufer |
| 7,688,739 | B2 | 3/2010 | Frei et al. |
| 7,689,169 | B2 | 3/2010 | Lee et al. |
| 7,733,833 | B2 | 6/2010 | Kalika et al. |
| 7,852,212 | B2 | 12/2010 | Fitzgibbon |
| 7,865,142 | B2 | 1/2011 | Hansen et al. |
| 8,024,073 | B2 | 9/2011 | Imes et al. |
| 8,027,324 | B2 | 9/2011 | Kalika et al. |
| 8,082,065 | B2 | 12/2011 | Imes et al. |
| 8,099,195 | B2 | 1/2012 | Imes et al. |
| 8,108,076 | B2 | 1/2012 | Imes et al. |
| 8,112,794 | B2* | 2/2012 | Little ............... H04L 63/0853 380/270 |
| 8,159,955 | B2 | 4/2012 | Larsson |
| 8,174,381 | B2 | 5/2012 | Imes et al. |
| 8,190,193 | B2 | 5/2012 | Feher |
| 8,208,635 | B2 | 6/2012 | Karschnia et al. |
| 8,238,259 | B2 | 8/2012 | Monden et al. |
| 8,331,544 | B2 | 12/2012 | Kraus et al. |
| 8,396,602 | B2 | 3/2013 | Imes et al. |
| 8,396,604 | B2 | 3/2013 | Imes et al. |
| 8,411,590 | B2* | 4/2013 | Wang ............... H04L 63/0428 370/254 |
| 8,412,382 | B2 | 4/2013 | Imes et al. |
| 8,428,782 | B2 | 4/2013 | Imes |
| 8,442,695 | B2 | 5/2013 | Imes et al. |
| 8,457,797 | B2 | 6/2013 | Imes et al. |
| 8,462,707 | B2 | 6/2013 | Husney |
| 8,473,109 | B1 | 6/2013 | Imes et al. |
| 8,498,749 | B2 | 7/2013 | Imes et al. |
| 8,504,180 | B2 | 8/2013 | Imes et al. |
| 8,509,954 | B2 | 8/2013 | Imes et al. |
| 8,553,664 | B2 | 10/2013 | Bansal et al. |
| 8,571,518 | B2 | 10/2013 | Imes et al. |
| 8,600,564 | B2 | 12/2013 | Imes et al. |
| 8,626,344 | B2 | 1/2014 | Imes et al. |
| 8,748,745 | B2 | 6/2014 | Imes et al. |
| 8,774,041 | B2 | 7/2014 | Akay et al. |
| 8,774,072 | B2 | 7/2014 | Morris et al. |
| 8,832,428 | B2 | 9/2014 | Ota et al. |
| 8,855,794 | B2 | 10/2014 | Imes et al. |
| 8,855,830 | B2 | 10/2014 | Imes et al. |
| 8,856,901 | B2 | 10/2014 | Os et al. |
| 8,885,519 | B2 | 11/2014 | Aguirre et al. |
| 8,887,230 | B2 | 11/2014 | Barton et al. |
| 8,918,575 | B2 | 12/2014 | Markey et al. |
| 8,953,040 | B1 | 2/2015 | Scalisi et al. |
| 8,989,386 | B2 | 3/2015 | Falk |
| 9,014,621 | B2 | 4/2015 | Mohebbi |
| 2002/0095588 | A1 | 7/2002 | Shigematsu et al. |
| 2004/0028023 | A1 | 2/2004 | Mandhyan et al. |
| 2004/0246922 | A1 | 12/2004 | Ruan et al. |
| 2005/0254652 | A1 | 11/2005 | Engler et al. |
| 2006/0002368 | A1 | 1/2006 | Budampati et al. |
| 2006/0056370 | A1 | 3/2006 | Hancock et al. |
| 2006/0103503 | A1 | 5/2006 | Rodriguez |
| 2007/0019593 | A1 | 1/2007 | Sarkar |
| 2007/0290793 | A1 | 12/2007 | Tran |
| 2008/0019289 | A1 | 1/2008 | Monden et al. |
| 2008/0069351 | A1 | 3/2008 | Walker et al. |
| 2008/0085702 | A1 | 4/2008 | Park et al. |
| 2008/0104693 | A1 | 5/2008 | McAlister |
| 2008/0291862 | A1 | 11/2008 | Lu |
| 2008/0298250 | A1 | 12/2008 | Larsson |
| 2009/0010190 | A1 | 1/2009 | Gong |
| 2009/0190494 | A1 | 7/2009 | De Giovanni et al. |
| 2009/0217348 | A1 | 8/2009 | Salmela et al. |
| 2009/0313464 | A1 | 12/2009 | Shukla et al. |
| 2010/0220630 | A1 | 9/2010 | Kalika et al. |
| 2010/0318685 | A1 | 12/2010 | Kraus et al. |
| 2011/0015802 | A1 | 1/2011 | Imes |
| 2011/0046792 | A1 | 2/2011 | Imes et al. |
| 2011/0046798 | A1 | 2/2011 | Imes et al. |
| 2011/0046799 | A1 | 2/2011 | Imes et al. |
| 2011/0046800 | A1 | 2/2011 | Imes et al. |
| 2011/0046801 | A1 | 2/2011 | Imes et al. |
| 2011/0051823 | A1 | 3/2011 | Imes et al. |
| 2011/0054699 | A1 | 3/2011 | Imes et al. |
| 2011/0054710 | A1 | 3/2011 | Imes et al. |
| 2011/0169654 | A1* | 7/2011 | Ketari ............... G08B 13/1427 340/687 |
| 2011/0210816 | A1 | 9/2011 | Wang |
| 2011/0214060 | A1 | 9/2011 | Imes et al. |
| 2011/0311052 | A1 | 12/2011 | Myers et al. |
| 2011/0316667 | A1 | 12/2011 | Tran |
| 2012/0046859 | A1 | 2/2012 | Imes et al. |
| 2012/0064923 | A1 | 3/2012 | Imes et al. |
| 2012/0072033 | A1 | 3/2012 | Imes et al. |
| 2012/0082308 | A1 | 4/2012 | Chamberlain |
| 2012/0093141 | A1 | 4/2012 | Imes et al. |
| 2012/0167176 | A1* | 6/2012 | Hwang ............... H04L 9/3226 726/3 |
| 2012/0252430 | A1 | 10/2012 | Imes et al. |
| 2012/0324119 | A1 | 12/2012 | Imes et al. |
| 2013/0054758 | A1 | 2/2013 | Imes et al. |
| 2013/0054863 | A1 | 2/2013 | Imes et al. |
| 2013/0060387 | A1 | 3/2013 | Imes et al. |
| 2013/0090744 | A1 | 4/2013 | Tran |
| 2013/0173027 | A1 | 7/2013 | Imes et al. |
| 2013/0222110 | A1 | 8/2013 | Nardelli et al. |
| 2013/0278379 | A1 | 10/2013 | Fitzgibbon |
| 2013/0318217 | A1 | 11/2013 | Imes et al. |
| 2013/0318444 | A1 | 11/2013 | Imes et al. |
| 2013/0318519 | A1 | 11/2013 | Coolidge |
| 2013/0325190 | A1 | 12/2013 | Imes et al. |
| 2013/0326595 | A1 | 12/2013 | Myers et al. |
| 2013/0332000 | A1 | 12/2013 | Imes et al. |
| 2014/0033773 | A1 | 2/2014 | Myers et al. |
| 2014/0035722 | A1 | 2/2014 | Kincaid et al. |
| 2014/0049363 | A1 | 2/2014 | Ahearn et al. |
| 2014/0049365 | A1 | 2/2014 | Ahearn et al. |
| 2014/0051355 | A1 | 2/2014 | Ahearn et al. |
| 2014/0051407 | A1 | 2/2014 | Ahearn et al. |
| 2014/0058568 | A1 | 2/2014 | Imes et al. |
| 2014/0060876 | A1 | 3/2014 | Imes et al. |
| 2014/0128001 | A1 | 5/2014 | Imes et al. |
| 2014/0191848 | A1 | 7/2014 | Imes et al. |
| 2014/0219453 | A1 | 8/2014 | Neafsey et al. |
| 2014/0229385 | A1 | 8/2014 | Neafsey |
| 2014/0258386 | A1 | 9/2014 | Imes et al. |
| 2014/0266687 | A1 | 9/2014 | Britton |
| 2014/0273963 | A1 | 9/2014 | Su et al. |
| 2014/0297766 | A1 | 10/2014 | Imes et al. |
| 2014/0316587 | A1 | 10/2014 | Imes et al. |
| 2014/0328210 | A1 | 11/2014 | Knaappila |
| 2014/0340196 | A1 | 11/2014 | Myers et al. |
| 2014/0359558 | A1 | 12/2014 | Chamberlain |
| 2014/0378064 | A1 | 12/2014 | Tsaur et al. |
| 2015/0019736 | A1 | 1/2015 | Imes et al. |
| 2015/0025697 | A1 | 1/2015 | Imes et al. |
| 2015/0026316 | A1 | 1/2015 | Imes et al. |

OTHER PUBLICATIONS

"Multiprotocol ANT/Bluetooth Low Energy System on Chip," nRF51422 Product Specification v3.1, Nordic Semiconductor, 2014.
"Cisco Wireless Mesh Access Points, Design and Deployment Guide," Release 7.0.116.0, Cisco, Feb. 3, 2015.

(56) References Cited

OTHER PUBLICATIONS

Masica, Ken. "Recommended Practices Guide for Securing ZigBee Wireless Networks in Process Control System Environments," Lawrence Livermore National Laboratory, Apr. 2007.
"ZigBee PRO Smart Energy API User Guide," JN-UG-3059, Revision 3.3, NXP Laboratories UK, Jan. 14, 2013.
"Emerging Wirelsss Standards," Reprinted from Appliance Manufacturer, Jun. 2003.
Yoshida, Junko. "Mesh Network Key to Winning IoT Race," EE Times, Feb. 3, 2015.
"Mesh Networking Architectures and System Topologies," 3e Technologies International, Inc. (3 eTI).

\* cited by examiner

Your Network Devices

The following network devices are currently associated with your account. To add a new device, enter the network device name, serial number, and security token in the fields below and select "Add Device."

You can also toggle the active state of the device or remove the device from your network.

Device Name:
Name ...
*Choose something descriptive.*

Serial No.:
Serial No. ...
*Located on device housing.*

Security Token:
Security Token ...
*Located on device housing.*

[Add Device]

Search... [Go]

| Device Name | Device Type | Serial Number | Status | Remove Device |
|---|---|---|---|---|
| BJE House Gateway | GW 2.24 | GW-7373376981343363 | Active | 🗑 |
| Front Door Lock | RAS Lock 6.11 | RAS-4747098365311242 | Active | 🗑 |
| Back Door Lock | RAS Lock 6.11 | RAS-3502601263211581 | Active | 🗑 |
| Garge Door Opener | GDO 1.9 | GDO-8306181716011713 | Inactive | 🗑 |
| Thermostat | THRM 8.2 | THRM-0598269129514514 | Active | 🗑 |
| Front Window Sensor | WS 1.138 | WS-3416510605961105 | Active | 🗑 |

⇦ 1/2 ⇨　　　　　　　　　　　　　　　　　　　Total Devices: 12

FIG. 10

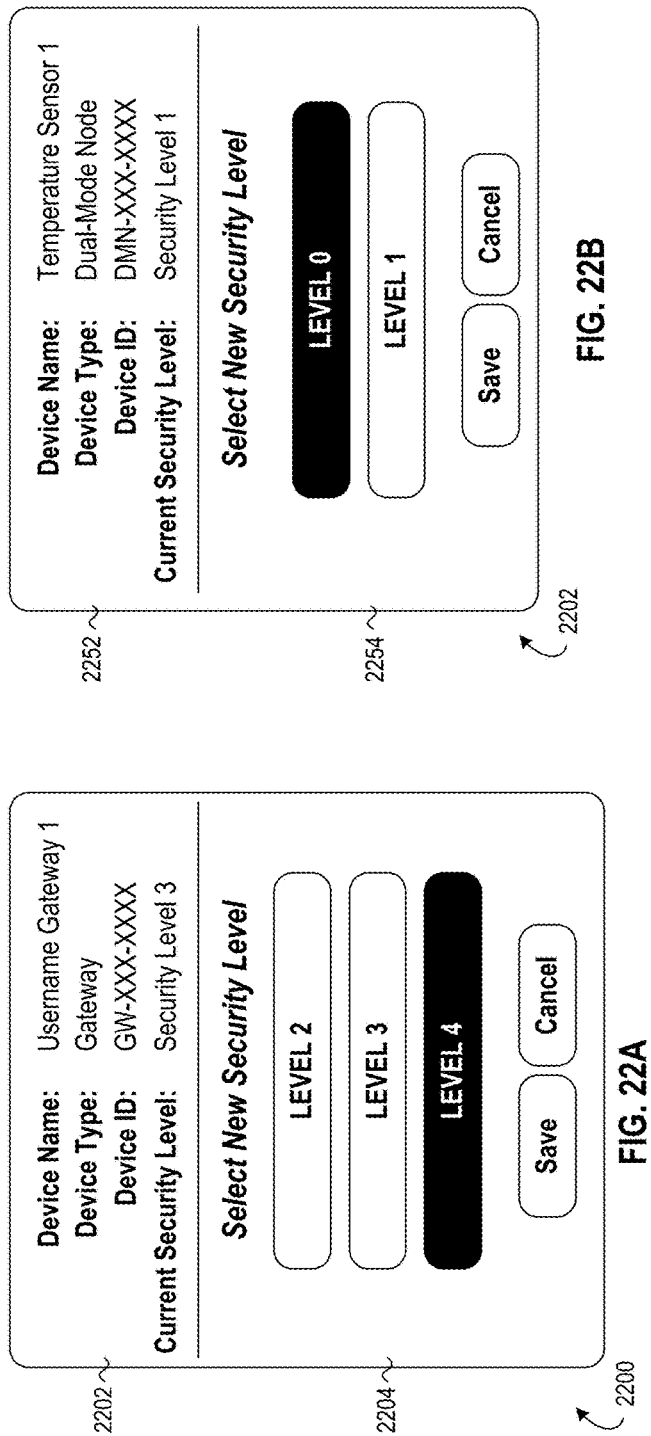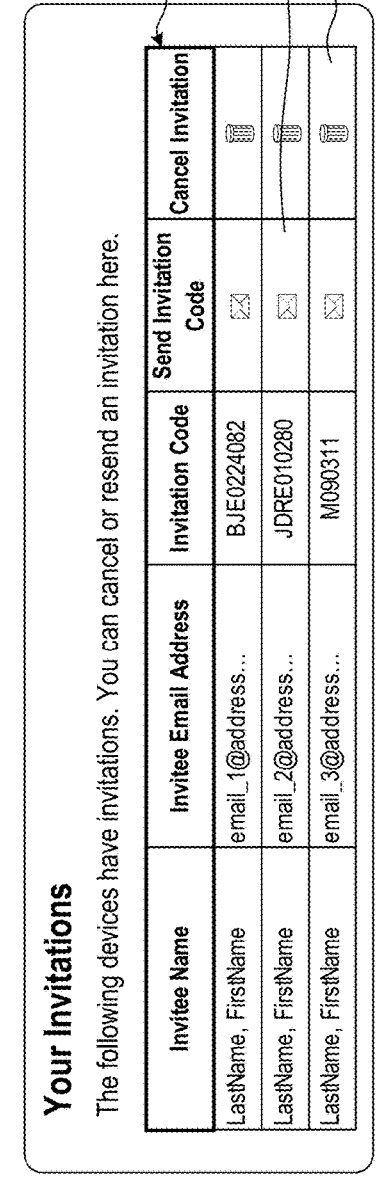

INVITATIONS FOR FACILITATING ACCESS TO INTERCONNECTED DEVICES

CROSS-REFERENCE TO RELATED APPLICATIONS

This application is a continuation of U.S. patent application Ser. No. 14/712,646 entitled "User-Selectable Security Modes for Interconnected Devices" and filed on May 14, 2015 which is incorporated by reference herein in its entirety.

TECHNICAL FIELD

The present disclosure is generally related to network communications and is particularly directed toward local networks of interconnected devices having multiple communication interfaces and user-selectable security modes.

BACKGROUND

The development of communication standards for wireless networks continues to grow. Each standard has its own unique advantages and disadvantages with respect to wireless range, power consumption, potential interference, and the network topologies that may be implemented using that standard. As a result, wireless networks employing one type of wireless communication standard might be incompatible with wireless networks employing another type of wireless communication standard. Therefore a need exists for techniques that can integrate multiple communication standards for wireless networks.

SUMMARY

To overcome the challenges described above, techniques for wirelessly interconnecting heterogeneous devices configured to communicate using a variety of wireless communication standards are provided. Applying the techniques described in further detail below, users may advantageously establish a network of interconnected devices wherein individual devices of the network operate according to different wireless communication standards.

As an example, a network may include i) a first device configured to wirelessly communicate using a wireless local area network (LAN) standard and a cellular communication standard, ii) a second device configured to wirelessly communicate using one or more low-power wireless communication standards, and iii) a third device configured to communicate using a wired LAN standard as well as wirelessly communicate using a wireless LAN standard, a cellular communication standard, a short-range communication standard, and one or more low-power communication standards. Notwithstanding the different communication standards utilized by these devices, however, the arrangement and configuration of the network allow each device to communicate with any of the other devices in the network.

The pathway between devices of the network may depend on the wireless communication standards the devices are configured to utilize and, additionally or alternatively, the proximity of the devices relative to one another. Devices that are configured to employ the same communication standard (e.g., a low-power wireless communication standard) and that are within range of each other may communicate via that standard. If, however, two devices are not within range of each other—or are not configured to employ the same wireless communication standard—the communications between those devices are routed via other devices of the network that are respectively within range of each other and configured to utilize the same respective wireless communication standards. In addition, a remote server may be in signal communication with at least one device of the network and facilitate the exchange of communications between the devices of the network and other devices located remotely relative to the network of interconnected devices.

In addition, users may monitor and control the devices of the network using user-operated devices referred to herein as access devices which may include, for example, handheld computing devices (e.g., "smartphones") and desktop computing devices. The access devices present interfaces at which users may provide input to, e.g., configure the network of devices and individual devices of the network, request information about the network of devices and individual devices of the network, and issue commands to individual devices of the network. The interfaces may be presented, e.g., by a device monitoring and control application that resides at the access device and/or by a web browser residing at the access device.

The devices of the network may also be configured with multiple security modes utilized to secure communications exchanged with other devices of the network and/or with the access devices. Each security mode is associated with a set of security features that determine how the communications are secured. Since the type and number of security features employed may affect the response time of the device, the security modes may each be associated with an expected response time. The particular security mode a device utilizes is thus user-selectable thereby allowing the user to select a preferred security mode based on whether shorter response times or more secure communications are desired. The devices may also be configured with a default security mode at the time of manufacture as well as instructions that limit the security modes available for selection at a device to a subset of all potential security modes. The security modes set as available for selection may be based on a risk assessment performed for each type of device. The respective security features associated with the security modes may also affect power consumption at the device. Accordingly, in addition to preferred response times, security modes may be selected for devices based on an expected level of power consumption from the security mode selected.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 10 depicts an example of an implementation of an interface listing the device nodes of a local network of interconnected devices in accordance with aspects described herein.

FIG. 20 depicts an example of an implementation of an interface listing the pending invitations sent from a user account associated with a local network of interconnected devices in accordance with aspects described herein.

FIG. 22A depicts an example of an implementation of an interface for receiving user selection of a security mode for a device node in accordance with aspects described herein.

FIG. 22B depicts another example of an implementation of an interface for receiving user selection of a security mode for a device node in accordance with aspects described herein.

DETAILED DESCRIPTION

Figure 1:
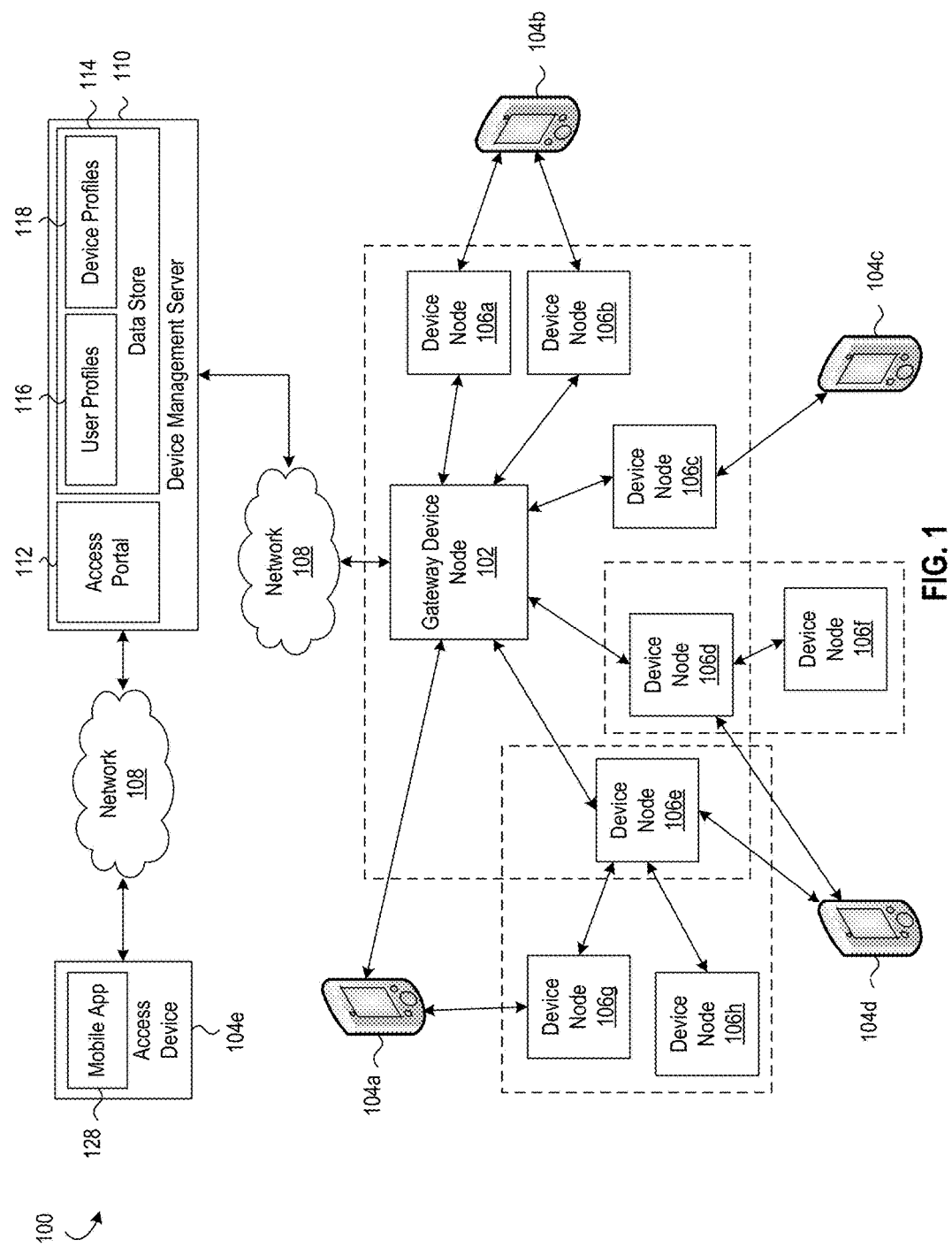
FIG. 1 depicts an example of an implementation of a local network of interconnected devices in accordance with aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

For convenience the following terminology is adopted herein. A local network of interconnected devices as used herein refers to at least two devices that are in signal communication with each other using at least one of a short-range wireless communication standard or a low-power wireless communication standard. The local network of interconnected devices may also include additional devices in signal communication with one or more devices of the network and configured to employ other wired and/or wireless communication standards. A device node as used herein refers to one of the devices of a local network of interconnected devices. A gateway device node as used herein refers to a device of a local network of interconnected devices that is configured for communicating via a wide area network (WAN)—such as the Internet and/or a cellular network—and for communicating with another one of the device nodes of the network. The gateway device node may also function as the hub of the local network of interconnected devices.

The device nodes of the network may be categorized based on their physical proximity to a gateway device node of the network. A zero-level device node as used herein refers to a device node that is located within the wireless range of the gateway device node, i.e., capable of receiving wireless communications transmitted from the gateway device node and/or capable of transmitting wireless communications that will be received at the gateway device node. A first-level device node as used herein refers to a device node that is located outside the wireless range of a gateway node but is located within the wireless range of a zero-level device node. A second-level device node as used herein refers to a device node that is located outside of the wireless range of a gateway device node and the wireless range of a zero-level device node but is located within the wireless range of a first-level device node. Zero-level device nodes are thus in direct signal communication with a gateway device node and may exchange point-to-point wireless communications. First-level device nodes and second-level device nodes are thus in indirect signal communication with a gateway device node, and communications may be routed to first-level device nodes and second-level device nodes via other device nodes of the network.

The device nodes of a local network of interconnected devices may also be deployed in a master/slave configuration. A master device node as used herein refers to a device node that issues commands to another device node. A slave device node as used herein refers to a device node that receives commands from a master device node. A relay device node as used herein refers to a device node that routes a communication between two other device nodes. Although the network of interconnected devices is referred to as a local network of interconnected devices, a device node that is located remotely relative to another device node of the network may communicate with that device node via a WAN (such as the Internet) as described in further detail below.

The device nodes of the local network of interconnected devices are configured to utilize one or more of the following communication standards: wired LAN communication standards; wireless LAN communication standards; cellular communication standards; short-range wireless communication standards; and low-power wireless communication standards. Examples of wired LAN standards include the IEEE 802.3 family of Ethernet standards. Examples of wireless LAN standards include the IEEE 802.11 family of wireless LAN standards commonly known as "Wi-Fi." Examples of cellular communication standards include any of the 2G, 3G, or 4G generation of cellular communication standards. Examples of short-range communication standards include the IEEE 802.15 family of wireless communication standards which include implementations commonly known as Bluetooth Classic developed by the Bluetooth Special Interest Group (SIG), ZigBee developed by the ZigBee Alliance, and any of the near-field communication (NFC) standards developed by the NFC Forum. Short-range wireless communication standards may permit maximum wireless ranges of about 1 meter (m) to about 100 m (i.e., about 3.3 feet (ft) to about 330 ft) depending on transmission power. Examples of low-power wireless communication standards include Bluetooth low energy (also known as Bluetooth LE, BLE, and Bluetooth Smart) also developed by the Bluetooth SIG and include ANT developed by Dynastream Innovations Inc. Accordingly low-power wireless communication standards include those that exhibit a peak power consumption of about 10 milliamps (mA) to about 30 mA when employed to transmit and/or receive wireless communications.

One or more device nodes of the local network of interconnected devices may also be referred to as a low-power device. As used herein, low-power devices include those that, when active and consuming at least some power, are configured to toggle between a sleep mode and an awake mode where the device consumes significantly less power while in the sleep mode relative to the power consumed while in the awake mode. In some example implementations, the power consumed by an example low-power device during a sleep mode may differ from the power consumed during an awake mode by an order of magnitude—e.g., the device may consume power on a scale of microamps (µA) during a sleep mode and consume power on a scale of milliamps during an awake mode. In one particular example, a low-power device may receive a power supply voltage of 3 volts (V) and exhibit the following power consumption characteristics. While in a sleep mode, this example low-power device may exhibit a power consumption of about 0.6 µA with no retention of data in volatile memory, a power consumption of about 1.2 µA with 8 kilobytes (kB) of data retention in volatile memory, and a power consumption of about 1.8 µA with 16 kB of data retention in volatile memory. While in an awake mode, this example low-power device may exhibit a power consumption of about 2.6 µA during periods of relatively low activity at a controller, a power consumption of about 10.5 mA during transmission of a wireless signal at about 0 dBm, and a peak power consumption of about 13 mA during reception of a wireless signal. It will be appreciated that the values provided above are provided by way of example only and that other low-power devices may exhibit different power consumption profiles.

A dual-mode device node as used herein refers to a device node configured to wirelessly communicate using at least two low-power wireless communication standards (e.g., both ANT and BLE). A multi-mode node as used herein refers to a device node configured to wirelessly communicate using at least two low-power wireless communication standards (e.g., both ANT and BLE) as well as at least one other wired or wireless communication standard (e.g., a short-range wireless communication standard, a cellular communication standard, a wired LAN communication standard, and/or a wireless LAN communication standard). It will be recognized that the local network of interconnected devices may, in some circumstances, be or include a personal area network (PAN) where the device nodes of the network are logically associated with an individual user and communicate over relatively short distances. A local area network of interconnected devices may thus include multiple PANs each respectively associated with a particular user, e.g., each the individual of a household.

An access device as used herein refers to a user-operated device node that is configured to interact with other device nodes in the local network of interconnected devices. Examples of access devices include computing devices (e.g., mobile cellular telephones, palmtop computing devices, tablet computing devices, laptop computing devices, desktop computing devices, video game machines, network-enabled televisions, and the like), miniature remotes (e.g., keyfobs), and other types of devices having at least one communication interface configured for communicating with one or more types of devices nodes of a local network of interconnected devices either directly or indirectly via one or more device nodes and/or via local and/or remote computing devices. As described in further detail below, access devices include instructions that, when executed at the access device, cause the access device to wirelessly communicate with device nodes of a local network of interconnected devices. Some of the instructions cause the access device to accept input from the user such that the access device initiates communications to device nodes responsive to and based on that input. Other instructions cause the access device to provide output to the user responsive to and based on communications received from devices nodes. The instructions may reside in non-volatile memory at the access device, and those instructions may or may not be updatable.

In some examples, those instructions may be implemented as an application installed at the access device.

As described in further detail below device nodes may pair and bond with each other when in direct signal communication. As used herein, pairing refers to the process of discovering a device, exchanging device information, and exchanging communications during a temporary communication session. As also used herein, bonding refers to the process of exchanging long-term keys between paired devices such that those devices may subsequently pair automatically when those devices are within their respective wireless ranges.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

Networks of Interconnected Devices

Referring now to FIG. 1, an example of an implementation of a local network of interconnected devices 100 ("network") is shown. As seen in FIG. 1, the network 100 includes multiple device nodes of different types in signal communication with each other. In particular, the network 100, in this example, includes a gateway device node 102 ("gateway"), access devices 104a, 104b, 104c, 104d, and 104e (generally access device 104 and collectively access devices 104a-e), and device nodes 106a, 106b, 106c, 106d, 106e, 106f, 106g, and 106h (generally device node 106 and collectively device nodes 106a-h). It will be appreciated that the network 100 depicted in FIG. 1 is illustrated by way of example only and that other implementations of a local network of interconnected devices may include more or fewer devices nodes in signal communication with each other.

As also seen in FIG. 1, the gateway 102 and the access device 104e are each in signal communication, via a network 108, with a device management server 110. The network 108 may be a WAN that includes one or more wired and/or wireless networks such as, e.g., the Internet, a cellular network, a satellite network, and the like. In this way, the access device 104e may communicate with the gateway 102 or any of the other device nodes 106 of the network 100 even though that access device is located remotely relative to the other device nodes.

The device management server 110, in this example, includes an access portal 112 and a data store 114 storing user profiles 116 and device profiles 118. The access portal 112 is configured to facilitate the communications between the access device 104e and the gateway 102. Accordingly, in some example implementations, the access portal 112 may be implemented as a web server that utilizes the HyperText Transport Protocol (HTTP) to communicate with the access device 104e and the gateway 102. In particular, the access portal 112 may receive HTTP requests from the access device 104e and gateway 102 and transmit HTTP responses to the access device 104e and gateway 102. In addition, the access portal 112 may be configured to push communications to the access device 104e and the gateway 102. In some example implementations, the access portal 112 may utilize HyperText Transport Protocol Secure (HTTPS) to encrypt and thus secure the communications. The content (i.e., the payload) of the communications may be formatted according to an Extensible Markup Language (XML) format and/or a JavaScript Object Notation (JSON) format. Content may thus be submitted to the access portal 112, for example, in HTTP POST requests. The content of the communications may also be encrypted using a key associated with the device node receiving the communications. Encrypting communications between device nodes of a local network of interconnected devices is discussed in further detail below. The access portal 112 of the device management server 110 may thus act as a relay for communications between the gateway 102 and device nodes 106 and the remotely-located access device 104e. Various configurations and arrangements may be employed to implement the device management server 110. In some example implementations, the access portal 112 and data store 114 may reside at the same machine while in other example implementations an access portal and data store may reside at different machines that are in signal communication with each other.

The user profiles 116 stored at the data store 114 include individual user profiles for users each having established respective local networks of interconnected devices. Individual user profiles 116, in this example, include data corresponding to a unique identifier for the user (e.g., a user account number, a username, an email address, a phone number, and the like). Individual user profiles 116 may also include data corresponding to login credentials (e.g., a username and a salted and hashed password). The device profiles 118, in this example, include two types of device profiles: i) device profiles corresponding to the gateway 102 and device nodes 106 of the network 100, and ii) device profiles corresponding to the access devices 104 that communicate with the device nodes 106. Individual device profiles 118 for device nodes include data corresponding to a unique identifier for the device node (e.g., a serial number), a device type, a default or user-specified description of the device, a security token associated with the device, one or more keys associated with the device (e.g., public and private digital signature keys), and a status of the device. In some example implementations, device nodes may be associated with multiple serial numbers, e.g., a 16 byte serial number and a 4 byte serial number. The serial numbers, security token, and keys may be generated at the time of manufacture and associated with the device throughout its lifetime. The keys may be, e.g., 128-bit keys. A device node may utilize one or more of its keys with one or more encryption algorithms to encrypt at least a portion of the communications transmitted and with one or more decryption algorithms to decrypt at least a portion of the communications received.

Individual device profiles 118 for device nodes also include data identifying the user profile 116 the device node is associated with (e.g., the user account number, username, email address, and the like). Individual device profiles for the access devices 104 may likewise include data corresponding to a unique identifier for the access device (e.g., a serial number, a device address such as a media access control (MAC) address, and the like), a type of the access device (e.g., mobile cellular telephone, tablet computing device, keyfob, and the like), a manufacturer of the access device, a model number of the access device, an operating system of the access device, and the like. The device profiles for gateways may also include a command queue corresponding to a list of commands that have been transmitted to the device management server from access devices located remotely relative to the local network of interconnected devices. As described in further detail below, the device management server transmits to a gateway the commands included in its corresponding command queue. Individual user profiles 116 may also include or be otherwise associated with invitations to other access devices authorized to communicate with, and thus access, the device nodes 106 of the network 100. Invitations will be discussed in further detail below. In addition, the data included in the user profiles 116 and device profiles 118 discussed above is described by way of example only. Accordingly other implementations of the user and device profiles may include additional or alternative data corresponding to additional or alternative aspects or characteristics of the users, device nodes, and access devices.

The data store 114 may include a database (not shown) that implements a data model for storing the data of the user profiles 116 and the device profiles 118. The database may store the data of the user profiles 116 and the device profiles 118 according to that data model. The database may thus include one or more tables respectively corresponding to users and device nodes, e.g., a USER table, a DEVICE table, and an INVITATION table. The rows of the USER table may correspond to records of the user profiles 116, and the rows of the DEVICE table may correspond to records of the device profiles 118. The rows of the INVITATION table may correspond to records of invitations that have been generated for access devices. The columns of the tables may correspond to the particular data elements stored for the user profiles 116 and the device profiles 118. The database may associate records of individual user profiles 116 with records of device profiles 118 through the use of primary and/or foreign keys included in those records. The database may associate records of individual user profiles 116 with invitations in a similar fashion. Through the associations of their corresponding database records, users and user accounts are thus associated with access devices 104 and devices nodes 106 of the network 100. The device management server 110 may thus also include a database management system (DBMS, not shown) that manages the storage and retrieval of the data of the user profiles 116 and the device profiles 118, e.g., creating new records, querying for existing records, and deleting records from the database. The access portal 112 and the gateway 102, in this example, are in signal communication with the data store 114 and may store and retrieve the data of the user profiles 116 and the device profiles 118, e.g., via the DBMS.

The access portal 112, in this example, is also configured to authenticate the access device 104e based on login credentials provided by to the access device by the user and subsequently transmitted to the access portal. Upon successful authentication, the access portal 112 may provide a dashboard interface ("dashboard") at which the user may access and manage the devices of the network 100 that are associated with the user account of the user. The access device 104e may present the dashboard to the user and accept input from the user. Through the dashboard, the user may, for example, check the status of device nodes 106 in the network 100, issue commands to device nodes, toggle activation of the device nodes, add device nodes to the network, remove device nodes from the network, view audit logs associated with the device nodes, view access devices currently authorized to communicate with the device nodes, view invitations to other access devices, resend invitations to access devices, create new invitations, and engage in other activities associated with the device nodes that will be appreciated with the benefit of this disclosure. These activities will be discussed further below.

The access devices 104, in this example, are configured with instructions for receiving input from a user and providing output to a user and for communicating with the device management server 110, gateway 102, and device nodes 106. The instructions may be implemented for example, as a device monitoring and control mobile application ("mobile application") installed at an access device such as the mobile application 128 installed at the access device 104e. As discussed in further detail below, the mobile application 128 provides functionality for viewing the status of the device nodes, pairing and/or bonding with those device nodes, and issuing commands to those device nodes.

As noted above, some device nodes in a local network of interconnected devices may be in direct signal communication with each other while other devices nodes may be in indirect signal communication via a relay device node. Whether a device node is in direct or indirect signal communication with another device node depends on the wireless ranges of those device nodes. The network 100 shown by way of example in FIG. 1 illustrates device nodes that are both in direct and indirect signal communication with each other based on their wireless range. The dashed lines surrounding the gateway 102 and device nodes 106 in FIG. 1 demarcate the device nodes that are within their respective wireless range and thus in direct signal communication with each other. In particular, area 120 indicates that the gateway 102 and device nodes 106a-e are within wireless range; area 122 indicates that device nodes 106a-b are within wireless range; area 124 indicates that device nodes 106d and 106f are within wireless range; and area 126 indicates that device nodes 106e and 106g-h are within wireless range. FIG. 1 also illustrates respective access devices 104a-d that are within the wireless range of various device nodes 106 of the network. In particular, access device 104a is in direct signal communication with the gateway 102 and device node 106g, access device 104b is in direct signal communication with device nodes 106a-b, access device 104c is in direct signal communication with device node 106c, and access device 104d is in direct signal communication with device nodes 106d-e. As discussed in further detail below, the communications among the access devices 104, gateway 102, and devices nodes 106 may be secured using various security techniques.

The device nodes 106 may include different classes of device nodes, e.g., dual-mode device nodes and multi-mode device nodes. The device nodes 106 may also include different types of devices nodes within those classes of device nodes. Dual-mode and multi-mode device nodes may include the following types of device nodes: i) sensor-type device nodes that include sensors for measuring various parameters associated with the surrounding environment such as for example, acoustic and optical sensors, chemical sensors (e.g., oxygen, carbon dioxide, carbon monoxide, smoke, etc.), electric and magnetic sensors, electromagnetic radiation sensors, temperature sensors, force and pressure sensors, moisture and fluid flow sensors, air and air flow sensors, velocity and acceleration sensors, position and displacement sensors, proximity and motion sensors, and the like; and ii) activation-type device nodes that include actuators, solenoids, and/or output devices that are operable in response to receipt of commands such as, for example, locks for structures (e.g., doors, gates, and the like) and for containers (e.g., safes, drawers, cabinets, and the like), optical output devices (e.g., lights, display devices, and the like), audio output devices (e.g., speakers, alarms, and the like), automatic garage door openers, automatic gate openers, and the like. In some example implementations, device nodes may be configured to include audio data and/or image data in the communications transmitted to other device nodes, a gateway, the device management server, or an access device.

Figure 2:
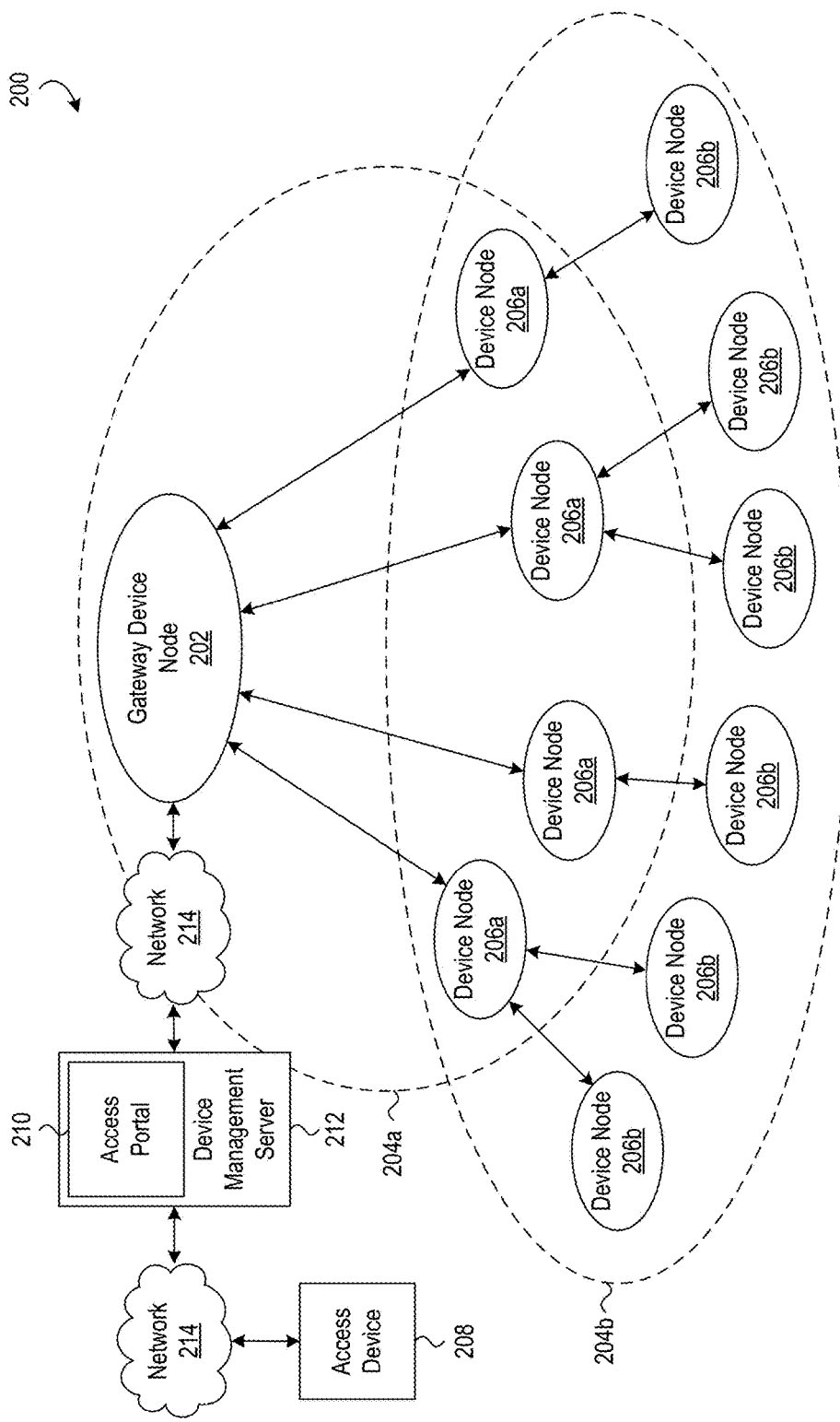
FIG. 2 depicts another example of an implementation of a local network of interconnected devices in accordance with aspects described herein.

Referring now to FIG. 2, another local network of interconnected devices 200 ("network") is shown. In FIG. 2, the hierarchical arrangement of the network 200 is depicted with respect to a gateway device node 202, a set 204a of zero-level device nodes 206a, and a set 204b of first-level device nodes 206b (collectively device nodes 206). In FIG. 2, the zero-level device nodes 206a and the gateway 202 are within their respective wireless ranges and thus in direct signal communication with each other. The first-level device nodes 206b are outside the wireless range of the gateway 202, but within the wireless range of one of the zero-level device nodes 206a. The first-level device nodes 206b are thus in direct signal communication with the zero-level device nodes 206a and in indirect signal communication with the gateway 202 via the zero-level device nodes. Second-level device nodes (not shown) may be in direct signal communication with the first-level device nodes 206b and in indirect signal communication with the gateway 202 via the first-level device nodes and the zero-level device nodes 206a in a similar fashion. Third-level device nodes, fourth-level device nodes, and so on, may be connected to upper-level device nodes in a similar fashion. Accordingly the number of levels of the local network of interconnected devices is not intended to be limited to the two example levels shown in FIG. 2. As also seen in FIG. 2 and noted above, the gateway 202 (and thus the device nodes 206) may be in signal communication with an access device 208 via an access portal 210 of a device management server 212 across a network 214, e.g., a WAN such as the Internet and/or a cellular network.

In this hierarchical arrangement, the gateway 202 and device nodes 206 may interact in a master-slave configuration. In other words, one device may be designated as a master device node, and another device may be configured as a slave device node relative to that master device node. The master device node may issue commands to the slave device node, and the slave device node may respond according to those commands. With respect to the network 200 shown by way of example in FIG. 2, the gateway 202 may be configured as a master device node, and at least one of the zero-level device nodes 206a may be configured as a slave device node to the gateway. Additionally or alternatively, one of the zero-level device nodes 206a may be configured as a master device node, and one of the first-level device nodes 206b may be configured as a slave device node relative to that zero-level device node. Commands transmitted from a master device node to a slave device node include a command to provide the current status of the slave device node (e.g., whether a lock-type device node is in a locked or unlocked state), a command to provide a measurement value measured by the slave device node (e.g., the current reading measured by a sensor-type device node), and a command to perform some action at the slave device node (e.g., perform a lock or unlock operation at a lock-type device node). Other examples of various command types and specific commands will be appreciated with the benefit of this disclosure.

By equipping the device nodes with multiple types of communication interfaces and configuring the device nodes to utilize multiple wireless communication standards, users advantageously derive the benefit of multiple types of network topologies. As an example, various short-range wireless communication standards may be suitable for establishing master/slave configurations in point-to-point networks, star networks, and tree networks but might not be suitable for establishing mesh networks. Various low-power wireless communication standards, however, may be suitable for establishing mesh networks. Accordingly, device nodes configured to utilize both short-range and low-power wireless communication standards may thus establish networks that include a combination of network topologies, e.g., networks exhibiting point-to-point, star, tree, and mesh topologies. The device nodes may advantageously utilize each of the respective features provided by the different technologies, e.g., the master/slave features available with the point-to-point, star, and tree network topologies as well as the relay features and multiple communication pathways available with the mesh network topology.

One or more of the device nodes of the local network of interconnected devices may receive updates with respect to its stored instructions. A device node may receive an update wirelessly or via a wired connection. As an example, a gateway device node may receive an update from the device management server via its wired connection to a wide area network (e.g., the Internet). The device management server may also send an update for one of the device nodes to the gateway device node, and the gateway device node may wirelessly transmit the update to the specified device node (i.e., an over-the-air update). If necessary, the update for the specified device node may be routed from the gateway device node via one or more other device nodes. A device node may also receive an update from an access device in signal communication with the device node. In some circumstances, the device management server may provide the gateway device node with an update to be applied at each device node of the local network of interconnected devices, and the gateway device node may broadcast the update to each of the device nodes.

Device Nodes

Figure 3:
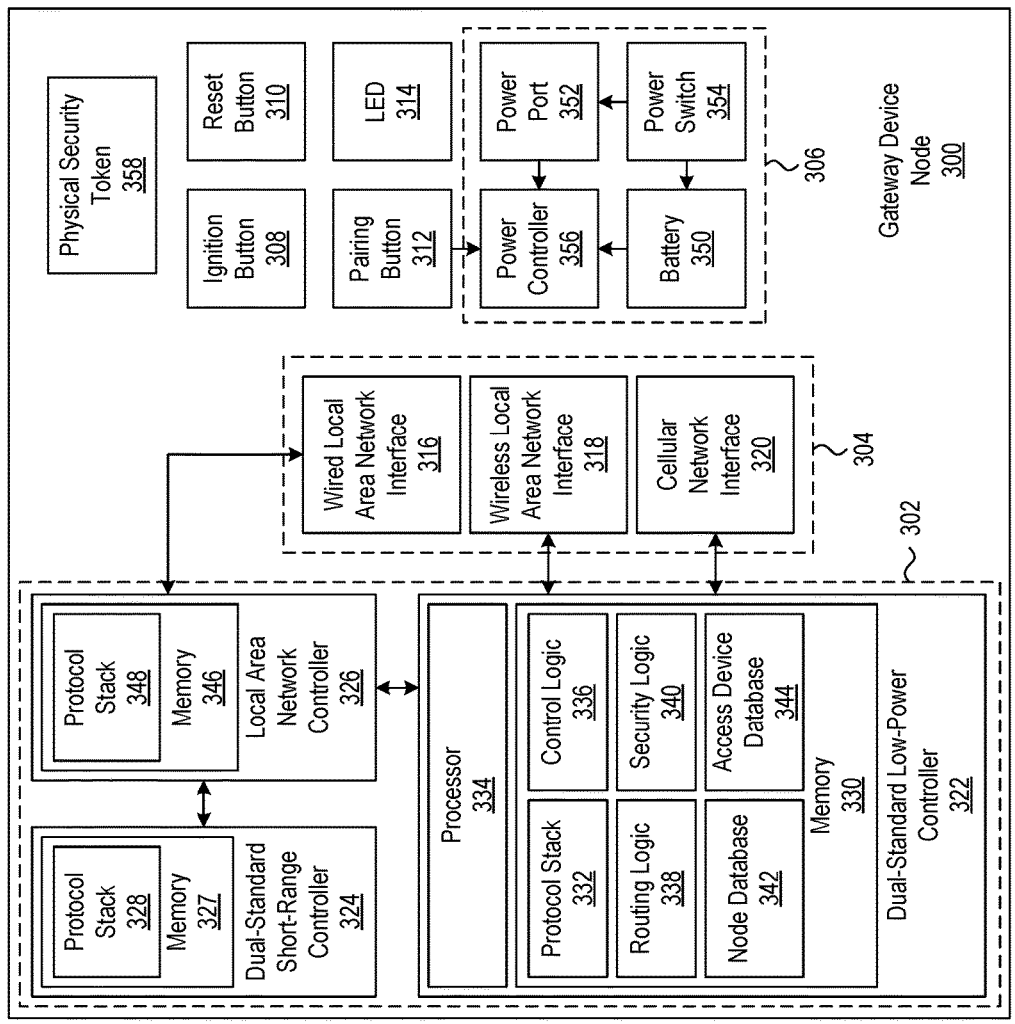
FIG. 3 depicts an example of an implementation of a gateway device node in accordance with aspects described herein.
Figure 5:
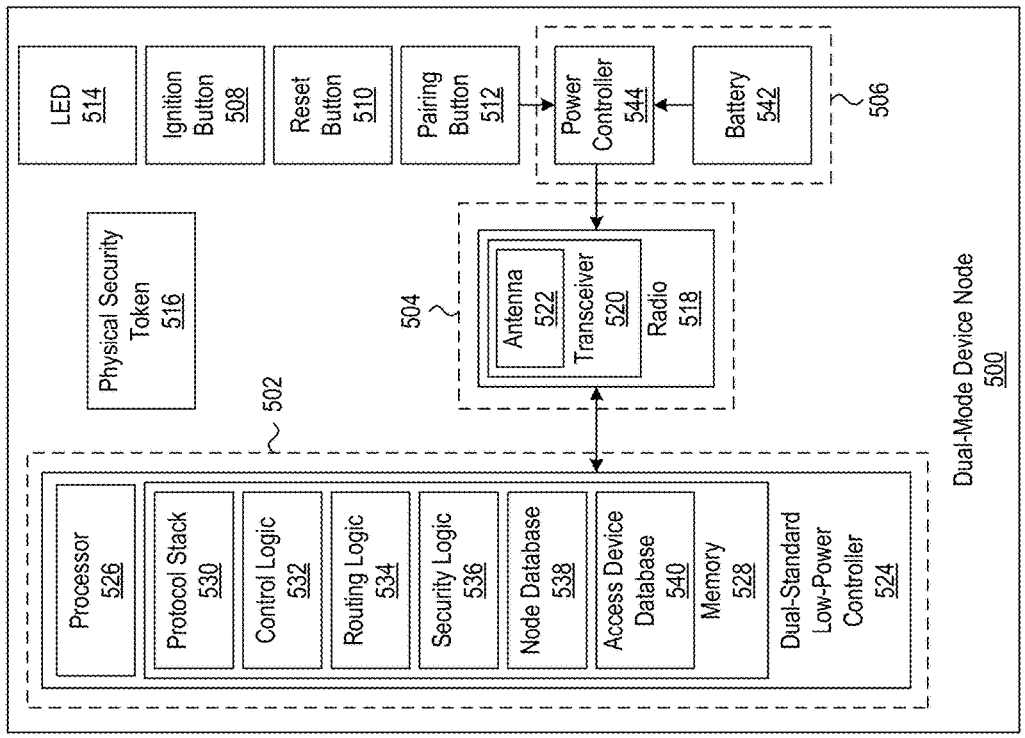
FIG. 5 depicts an example of an implementation of a dual-mode device node in accordance with aspects described herein.
Figure 4:
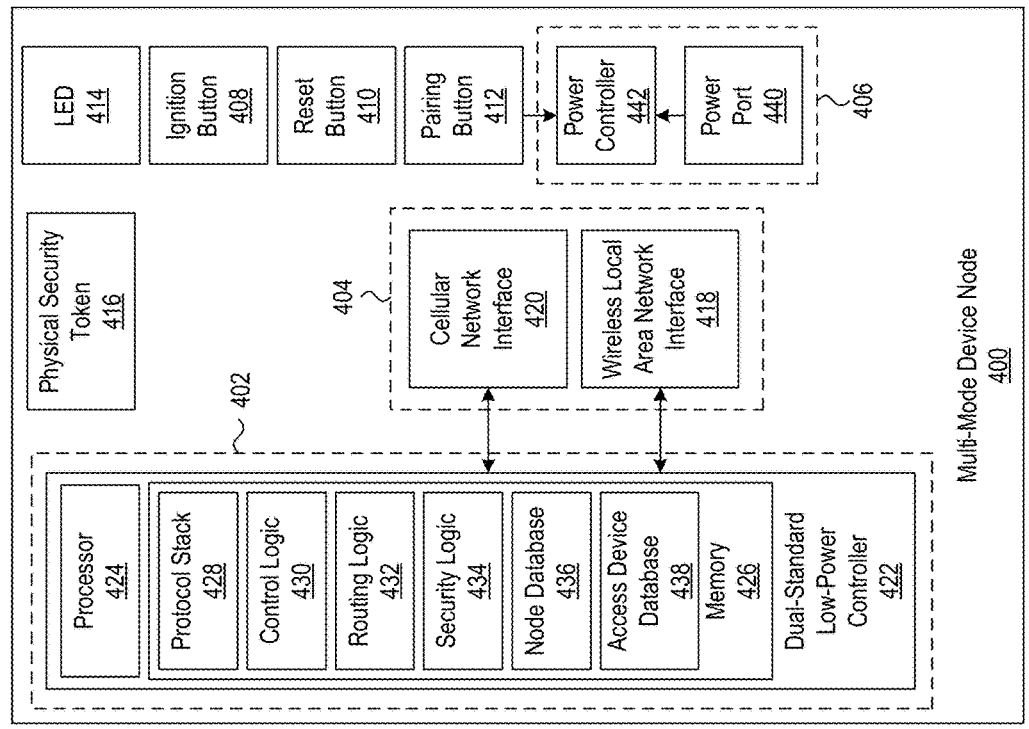
FIG. 4 depicts an example of an implementation of a multi-mode device node in accordance with aspects described herein.

Referring now to FIGS. 3-5 example types of device nodes are illustrated. In FIG. 3, an example of an implementation of a gateway device node is shown. In FIG. 4, an example of an implementation of a multi-mode device node is shown. In FIG. 5, an example of an implementation of a dual-mode device node is shown. The device nodes discussed above with reference to FIGS. 1-2 may respectively correspond to the example device nodes illustrated in FIGS. 3-5 and discussed in further detail below. A local network of interconnected devices may include one or more of each type of device node. In one example implementation of a local network of interconnected devices, a gateway node may serve as the hub of multiple dual-mode device nodes and multi-mode device nodes that are part of the network at various layers. FIGS. 3-5 include lines illustrating the signal paths between various components of the device nodes. It should be appreciated, however, that, for the sake of clarity, not every signal path between the components of the device nodes have been illustrated in the figures.

Device nodes—including gateway device nodes, dual-mode device nodes, and multi-mode device nodes—may each be assigned a serial number, a security token, and a set of keys (e.g., three keys) upon manufacture. This unique identification information is employed to recognize, authenticate, and authorize device nodes when added to a local network of interconnected devices and when communicating with other device nodes of the network and the device management server. The keys are also used to encrypt and decrypt portions of the communications exchanged between access devices and other device nodes. In particular, the device nodes may utilize the keys to encrypt and decrypt session identifiers of the communication sessions established between access devices and other device nodes as well as the content of those communications. Authorized access devices may also be provided with the keys associated with a device node and also utilize those keys to encrypt and decrypt portions of the communications exchanged with the device node.

With reference to FIG. 3, an example of an implementation of a gateway device node 300 ("gateway") is shown. The gateway 300, in this example, includes a control module 302, a communication module 304, a power module 306. The gateway 300, in this example, also includes multiple physical user interface elements including an ignition button 308, a reset button 310, a pairing button 312, and a light emitting diode (LED) 314.

The communication module 304 of the gateway 300 includes multiple communication interfaces. In particular, the communication module 304, in this example, includes a wired LAN interface 316, a wireless LAN interface 318, and a cellular network interface 320. The gateway 300 may thus exchange wired and wireless communications with access devices and device nodes of the local network of interconnected devices via one or more of the wired LAN interface 316, the wireless LAN interface 318, and the cellular network interface 320. Although not shown in FIG. 3 for the sake of clarity, the communication module 304 of the gateway 300 may also include one or more radios with corresponding transmitters, receivers, and/or transceivers having one or more antennas to receive and/or transmit wireless communications. Such radios may include radios configured to operate at one or more frequencies suitable for wireless LAN communications such as those frequencies in the ISM band (e.g., 2.4 GHz radios, 5 GHz radios, 60 GHz radios) as well as radios configured to operate at one or more frequencies suitable for cellular communications such as the frequency bands specified by various cellular network standards (e.g., the 1G, 2G, 3G, and 4G families of cellular network standards). In addition, the communication module 304 of the gateway 300 may also include a physical communication port (e.g., an Ethernet port) configured to communicate via the wired LAN interface 316 (e.g., using one or more of the IEEE 802.3 family of Ethernet standards). The wireless LAN interface 318 may likewise be configured to communicate using one or more of the IEEE 802.11 family of wireless LAN standards. The wired LAN interface 316 and the wireless LAN interface 318 thus facilitate communications at the gateway 300 via IP-based networks including LANs and/or WANs (e.g., the Internet). The cellular interface 320 likewise facilitates the communications to and from the gateway 300 via a cellular network. The cellular network interface 320 may thus include a cellular modem. Cellular modems suitable for use with the cellular network interface 320 include those available from Gemalto M2M GmbH of Munich, Germany such as the cellular machine-to-machine modules having model numbers PLS8, PXS8, PCS3, PVS8, PHS8, PGS8, PDS5, PDS6, PDS8, and the like. The various communication interfaces of the communication module 304 of the gateway 300 advantageously allow access devices that are located remotely relative to the local network of interconnected devices to communicate with the device nodes of the network for monitoring and control purposes.

The control module 302 of the gateway 300 includes multiple controllers for handling and responding to the communications received at and transmitted from the gateway 300. In particular, the control module 302 of the gateway 300, in this example, includes a dual-standard low-power controller 322 ("low-power controller"), a dual-standard short-range controller 324 ("short-range controller"), and a local area network controller 326 ("LAN controller"). As seen in FIG. 3, the LAN controller 326, in this example, is in signal communication with the wired LAN interface 316, the low-power controller 322, and the short-range controller 324. The low-power controller 322, in this example, is also in signal communication with the wireless LAN interface 318 and the cellular network interface 320. The low-power controller 322, wireless LAN interface 318, and cellular network interface 320 may be in respective signal communication with one or more radios (not shown) of the communication module 304.

The short-range controller 324, in this example, is configured to selectively utilize multiple short-range wireless communication standards to wirelessly communicate with access devices and device nodes of the local network of interconnected devices. In some example implementations, the short range controller 324 may be configured to wirelessly communicate using both the Bluetooth Classic and the BLE short-range wireless communication standards. In this way, the gateway 300 may wirelessly communicate with access devices and device nodes that are also configured to wirelessly communicate using the Bluetooth Classic and/or BLE short-range wireless communication standards. In this regard, the short-range controller 324 includes memory 327 storing instructions corresponding to a protocol stack 328 that is configured to handle and process multiple types of short-range wireless communications received at the gateway 300 (e.g., Bluetooth Classic communications and BLE communications) from the access devices or device nodes of the local network of interconnected devices. The protocol stack 328 may be any protocol stack suitable for use with a local network of interconnected devices including, for example, those protocol stacks designed for embedded systems (e.g., the Qualcomm® Bluetopia™ protocol stack available from Qualcomm Atheros, Inc. of San Jose, Calif.).

The low-power controller 322, in this example, is configured to selectively utilize multiple low-power wireless communication standards to wirelessly communicate with access devices and device nodes of the local network of interconnected devices. In some example implementations, the low-power controller 322 may be configured to utilize both the BLE and the ANT low-power wireless communication standards. In this way, the gateway 300 may wirelessly communicate with access devices and device nodes that are also configured to wirelessly communicate using the BLE and/or ANT low-power wireless communication standards. In this regard, the low-power controller 322 likewise includes memory 330 storing instructions corresponding to a protocol stack 332 that is configured to handle and process multiple types of low-power wireless communications received at the gateway 300 (e.g., BLE communications and ANT communications) from the access devices or device nodes of the local network of interconnected devices.

As seen in FIG. 3, the low-power controller 322 is in signal communication with the wired LAN interface 316 (via the LAN controller 326), the wireless LAN interface 318, and the cellular network interface 320. In this way, the gateway 300 may advantageously route communications received via any of these interfaces to device nodes of the local network of interconnected devices, the access devices, and the device management server. The cellular network interface 320 may employ an AT command structure and/or a machine-to-machine command structure for communicating with the low-power controller 322. The wired LAN interface 316 and the wireless LAN interface 318 may likewise employ a serial command structure for communicating with the low-power controller 322. As an example, the wired LAN interface 316 may communicate with the low-power controller 322 via the LAN controller 326 using universal asynchronous receiver/transmitter (UART) communications.

The low-power controller 322 may be a system-on-chip (SoC). Accordingly the low-power controller 322 may include, among other components, a processor 334 and logic stored at the memory 330 for controlling operation of the low-power controller. The low-power controller 322 may thus include other components common to a SoC (e.g., timing sources, peripherals, digital signal interfaces, analog signal interfaces, power management components, and the like) which have been omitted from FIG. 3 for the sake of clarity. Low-power controllers suitable for use as the low-power controller 322 include those available from Nordic Semiconductor of Oslo, Norway such as the Multiprotocol ANT™/Bluetooth® low energy System on Chip having model number nRF51422. In addition, a suitable protocol stack for use as the protocol stack 332 may also be available from Nordic Semiconductor of Oslo, Norway such as the Concurrent ANT™ and Bluetooth® Low Energy Soft Device having model number S310 nRF51422.

The low-power controller 322, in this example, is also configured with instructions for communicating with access devices and device nodes in the local network of interconnected devices. As seen in FIG. 3, the memory 330 of the low-power controller 322 stores instructions corresponding to control logic 336, routing logic 338, and security logic 340 for controlling operational aspects of the gateway 300. As also seen in FIG. 3, the memory 330 of the low-power controller 322 additionally includes a node database 342 for storing records corresponding to the device nodes of the local network of interconnected devices and an access device database 344 for storing records corresponding to the access devices that are authorized to communicate with those device nodes. The records of the node database 342 thus corresponds to a list of the device nodes of the local network of interconnected devices, and the records of the access device database 344 thus corresponds to a list of access devices that are authorized to access the device nodes of the network.

The control logic 336 of the low-power controller 322 corresponds to instructions that handle various operational aspects of the gateway 300. In particular, the control logic 336, in this example, handles the initialization of the gateway 300 upon startup including the configuration of various operating parameters such as, e.g., the operating frequency for the gateway, the initial security mode for the gateway, and the like. The control logic 336 also initiates the periodic transmissions (e.g., every 500 milliseconds) from the gateway 300 announcing its presence to any devices that are within wireless range of the gateway. In addition, the control logic 336 maintains the list of device nodes of the network by creating new records at the node database 342 when new device nodes are added to the network and deleting records from the node database when device nodes are removed from the network. The control logic 336 additionally handles the pairing and bonding procedures performed with access devices. Furthermore the control logic 336 issues commands to the device nodes of the network (e.g., operations to perform) and polls the device nodes for status updates. Moreover the control logic 336, in this example, also sets a security mode of the gateway 300 in response to receipt of user input indicating a user-selected security mode. The control logic 336 additionally issues, to device nodes of the network, commands that instruct those device nodes to employ a user-selected security mode. Additional operational aspects associated with the gateway that the control logic 336 may handle will be appreciated with the benefit of this disclosure.

The routing logic 338 of the low-power controller 322 corresponds to instructions that route communications between device nodes of the local network of interconnected devices, between the device management server and those device nodes, and between the access devices and those device nodes. The routing logic 338 thus ports communications received at the gateway 300 via the low-power wireless communication standards to the other communication standards the gateway 300 is configured to use, e.g., the wired LAN and wireless LAN communication standards, the short-range communication standards, and the cellular communication standards. The routing logic 338 likewise ports communications received via these other communication standards to the low-power communication standards utilized by the low-power controller 322. The routing logic 338 may include routing tables that are utilized to route communications through the local network of interconnected devices. Those routing tables may be updated responsive to changes at the local network of interconnected devices, e.g., as device nodes are added to and removed from the network. The gateway 300 may also be configured to measure various metrics associated with the transmission environment surrounding the gateway (e.g., signal-to-noise ratio, parity check losses, and the like) and make routing decisions based on those metrics, e.g., determining whether to route a communication to a device node using one or more of a low-power wireless communication standard, a short-range wireless communication standard, a wireless LAN communication standard, and/or a wired LAN communication standard. As an example, the metrics measured by the gateway 300 may favor routing a communication via one device node over another device node depending on the environmental metric measurements. The routing logic may also make routing decisions based on the respective security modes set for the device nodes along potential routing pathways. As an example, the routing logic may not select a potential routing pathway where the security mode for a device node along that pathway is relatively less secure than the security mode set for the target device node. In other words, when routing a communication to a target device node, the routing logic may select a routing pathway where the respective security modes of each device node along that pathway is at least as secure as the security mode set for the target device node.

The security logic 340 of the low-power controller 322 corresponds to the instructions that control the manner in which the gateway 300 secures the communications (if at all) between access devices, other device nodes of the network, and the device management server. The security logic 340, in this example, includes respective sets of instructions that each correspond to a particular security mode. Each respective security mode may be configured to employ various techniques for securing the communications or, in some circumstances, permitting unsecured communications. Accordingly, example security modes included in the security logic 340 may include one or more security modes that require communications to be encrypted as well as one or more security modes that permit communications to be unencrypted. In addition, the security modes requiring encryption may each specify a particular encryption method to employ when encrypting the communications, e.g., security modes respectively requiring relatively more or less complex encryption methods. The security logic 340 stored at the memory of the low-power controller 322 may include one or more keys associated with the gateway device node 300 used to encrypt the content (i.e., the payload) and communications transmitted to the access devices as well as decrypt the content and communications received from access devices, the device management server, and other device nodes of the network. The security modes that do not require encryption may include security modes that require authentication of a security token in order to communicate as well as security modes that permit communication without authenticating a security token. The gateway 300 may be configured with a default security mode. As noted above, however, the security mode of the gateway 300 may be changed in response to receipt of user input identifying a security mode selected for the gateway by the user. User-selectable security modes will be discussed in further detail below.

The node database 342, in this example, stores records of the device nodes of the local network of interconnected devices. A device node record includes a set of information associated with one of the device nodes of the network. A device node record may include, for example, the serial number of the device node and a security token associated with the device node. A device node record may also include the local network address assigned to the device node upon joining the network, the serial number of its parent device node, the local network address assigned to its parent device node, and the layer number of the parent device node in the network. A device node record may also include identifications of the class of device node as well as the type of the device node—e.g., whether the device node is dual-mode or multi-mode device node, whether the device node is a sensor-type device node or an activation-type device node, and the particular type of sensor or activatable device. In addition, a device node record may include an indication of the security mode set for the device node. Furthermore a device node record may include an indication of whether the device node is powered via an internal power source (e.g., a battery) or via an external power source (e.g., an AC or DC power supply). In some example implementations, the device class, device type, and power profile may be encoded in the serial number of the device node. A device node record may also include one or more of the keys associated with the device node and used by the low-power controller 322 to encrypt and decrypt content and communications transmitted to and received from the device node corresponding to that device node record.

The access device database 344, in this example, stores records of the access devices that are authorized to exchange communications with device nodes of the local network of interconnected devices. The low-power controller 322 may create a new record for an access device when the gateway 300 successfully bonds with that access device during a pairing and bonding procedure. In this way, the low-power controller 322 may engage in subsequent low-power communication sessions with that access device without repeating the pairing and bonding process. An access device record includes a set of information associated with an access device including information used to secure communications between the gateway 300 and the access device. An access device record may include, for example, a unique identifier for the access device (e.g., a MAC address) and one or more keys exchanged between the gateway 300 and the access device during a bonding procedure (e.g., LTK, EDIV, and Rand keys). The keys exchanged may include, e.g., a key to secure communications exchanged between the gateway 300 and the access device during a communication session as well as a key associated with the access device that is used to verify digital signatures received from the access device and sign content transmitted to the access device. An access device record may also include an invitation code generated for an invited access device that has been authorized to communicate with the gateway 300. The short-range controller 324 may also include an access device database similar to the access device database 344 of the low-power controller 322. In this way, the short-range controller 324 may likewise store records of access devices that have bonded with the gateway 300 which the short-range controller may utilize for subsequent short-range communication sessions with the access device.

The LAN controller 326 handles and processes the communications received at and transmitted from the gateway 300 via the wired LAN interface 316. Such communications may be received from and transmitted to the device management server via an IP-based WAN such as the Internet. Accordingly, the LAN controller 326, in this example, likewise includes memory 346 storing instructions corresponding to a protocol stack 348 that is configured to handle and process IP-based communications received at the gateway 300 from the device management server. Protocol stacks suitable for use as the protocol stack 348 of the LAN controller 326 include those designed for use in embedded systems (e.g., the open source "lightweight IP" protocol stack, the open source "micro IP" protocol stack, and the like). As seen in FIG. 3, the LAN controller 326 is in signal communication with both the short-range controller 324 and the low-power controller 322. Accordingly the LAN controller 326, in this example, is configured to port communications between the wired LAN interface and the short-range controller 324, between the wired LAN interface and the low-power controller, and between the short-range controller and the low-power controller. In addition, some implementations of the gateway device node may store the device node database and access device database in local memory rather than the memory of a low-power controller. The low-power controller, in these example implementations, may thus be in signal communication with the local memory of the gateway device node to access the device node database and access node database.

In some example implementations, the short-range controller 324 and/or the LAN controller 326 may also be SoCs and thus include their own respective processors, timing devices, control logic, and the like. In other example implementations, the gateway 300 itself may include, e.g., one or more processors, timing devices, and memory storing instructions corresponding to control logic (also omitted from FIG. 3 for the sake of clarity) which the short-range controller 324 and/or the LAN controller 326 may utilize for operation.

The power module 306 of the gateway 300 includes components for supplying power to the gateway 300 and configuring how power is supplied to the gateway. The power module 306, in this example, includes both an internal power source, a battery 350, and a power port 352 for connecting to an external power source (e.g., an AC or DC power source). The battery 350 may be a battery (e.g., an alkaline battery, a lithium-ion battery, a nickel-cadmium battery, lead-acid battery, and the like) and may be recharged when an external power source supplies power to the gateway 300 via the power port 352. The power module 306 also includes a power switch 354 for controlling whether the gateway 300 is powered by the battery 350 or an external power source via the power port 352. A user may thus toggle the switch to selectively control whether the internal or external power source provides power to the gateway 300.

The power module 306, in this example, also includes a power controller 356 connected to the battery 350 and the power port 352. The power controller 356 may, in turn, be connected to one or more of the radios (not shown) of the gateway 300 to control the power supplied to the radios and thus control the transmission power of the wireless communications transmitted from the gateway. The power controller 356 may thus control the wireless range of the gateway 300 by controlling the transmission power of its radios. Furthermore the power controller 356 may automatically adjust the power supplied to a radio based on whether the gateway 300 is currently powered by an internal power source (e.g., the battery 350) or an external power source. If currently powered externally, the power controller 356 may provide full power to a radio of the gateway in order to maximize the wireless range of the gateway (e.g., up to about 100 m). In some example implementations, full power to a radio of the gateway 300 may result in transmission power between about 18 decibels (dB) and about 23 dB. If currently powered internally, however, the power controller 356 may provide less than full power to a radio of the gateway in order to reduce or minimize power consumption at the gateway at the expense of a wireless range that is less than the maximized wireless range.

As seen in FIG. 3, the gateway 300, in this example, also includes a paring button 312 connected to the power controller 356. A user may press the pairing button 312 to temporarily reduce the transmission power of the gateway 300 such that its wireless range is minimized (e.g., up to about 1 m). As described in further detail below, the user may press the pairing button to reduce the wireless range of the gateway 300 as a security measure when pairing and bonding an access device with the gateway. In this way, the user may ensure that no other devices can receive the communications exchanged between the gateway and the access device during the pairing and bonding process. In some example implementations, the pairing button 312 may be configured such that the transmission power of the gateway 300 is reduced until the pairing button is again pressed by the user. In other example implementations, the pairing button 312 may be configured to initiate a temporary reduction of the transmission power of the gateway for a predetermined time period (e.g., about 1-2 minutes) such that, at the end of that time period, the transmission power of the gateway returns to the previous transmission power.

The ignition button 308 of the gateway 300, in this example, triggers an initialization procedure at the gateway 300. In some example implementations, the control logic 336 of the low-power controller 322 is configured to carry out the initialization procedure. The initialization procedure may include, for example, setting various operating parameters (e.g., selecting an operating frequency channel), confirming signal communication with the device management server via the wired LAN interface 316, confirming signal communication with a cellular network via the cellular network interface 320, clearing any existing records from the node database 342 and the access device database 344, and transmitting announcements indicating the gateway is present and available to accept requests to join the local network of interconnected devices. Forming the local network of interconnected devices is discussed in further detail below. The reset button 310 of the gateway 300, in this example, triggers re-initialization of the gateway 300. The LED 314 of the gateway 300, in this example, may indicate one or more statuses of the gateway 300, e.g., via the on/off status of the LED or via its blink pattern. One or more respective blink patterns of the LED may indicate, for example, that an error has occurred during the initialization procedure (e.g., the gateway could not connect to the device management server or the cellular network), that an access device has successfully paired and bonded with the gateway, that a device node has been added to or removed from the local network of interconnected devices, and the like.

Finally, the gateway 300, in this example, includes a physical security token 358 that is affixed to the gateway 300 and accessible to a user. As an example, the physical security token 358 may be affixed to a housing of the gateway 300. The physical security token 358 may be a barcode (e.g., a QR code) that encodes information associated with the gateway 300. The encoded information may include, e.g., the serial numbers of the gateway 300, the device class and device type, the default security level for the gateway, and the security token associated with the gateway. This information may also be encrypted, and the barcode may encode the encrypted information. The information may be encrypted using an encryption algorithm suitable for embedded systems such as, e.g., the tiny-AES128-C encryption algorithm. An access device may scan the barcode (e.g., using an optical input device such as a camera) to obtain the encoded information. The access device may also store a key (e.g., as part of the mobile application), and use the key to decrypt the encrypted information obtained from the barcode.

Referring now to FIG. 4, an example of an implementation of a multi-mode device node 400 is shown. Similar to the gateway device node 300, the multi-mode device node 400, in this example, includes a control module 402, a communication module 404, and a power module 406. The multi-mode device node 400, in this example, also includes an ignition button 408, a reset button 410, a pairing button 412, and an LED 414. The multi-mode device node 400 may also include a physical security token 416 affixed to the device node, e.g., to a housing of the device node.

The ignition button 408, the reset button 410, and the pairing button 412 may be the same as or at least similar to the ignition button 308, the reset button 310, and the pairing button 321 respectively discussed above with reference to FIG. 3. In some example implementations, the multi-mode device node 400 may be configured to enter into a sleep mode if it is unable to connect to a local network of interconnected devices after a user presses the ignition button 408. Engaging the reset button 410 may cause the multi-mode device node to awake from the sleep mode and reattempt the process of locating a network to connect to. The physical security token 416 may also be the same as or at least similar to the physical security token 358 discussed above with reference to FIG. 3 and encode the same type of information associated with the multi-mode device node 400.

The communication module 404 of the multi-mode device node 400, in this example, likewise includes multiple communication interfaces. In particular, the communication module 404, in this example, includes a wireless LAN interface 418 and a cellular network interface 420. The multi-mode device node 400 may thus exchange wireless communications with a access devices, a gateway device node, and other device nodes of the local network of interconnected devices via one or more of the wireless LAN interface 418 and the cellular network interface 420. The wireless LAN interface 418 may be the same as or at least similar to the wireless LAN interface 318 discussed above with reference to FIG. 3, and the cellular network interface 420 may be the same as or at least similar to the cellular network interface 320 also discussed above with reference to FIG. 3. In addition, although again not shown in FIG. 4 for the sake of clarity, the communication module 404 of the multi-mode device node 400 may also likewise include one or more radios with corresponding transmitters, receivers, and/or transceivers having one or more antennas to receive and/or transmit those wireless communications. The radios of the multi-mode device node 400 may likewise be the same as or at least similar to the radios of the gateway device node 300 discussed above with reference to FIG. 3.

The control module 402 of the multi-mode device node 400, in this example, includes a single controller 422 for handling and responding to the wireless communications received at and transmitted from the multi-mode device node. The controller 422, in this example, is also a dual-standard low-power controller ("low-power controller") configured to selectively utilize multiple low-power wireless communication standards to wirelessly communicate with access devices, a gateway device node, the device management server, and other device nodes of the local network of interconnected devices. In some example implementations, the low-power controller 422 may be configured to utilize both the BLE and ANT low-power wireless communication standards. As seen in FIG. 4, the low-power controller 422 is in signal communication with both the wireless LAN interface 418 and the cellular network interface 420. The low-power controller 422 may also be in signal communication with one or more of the radios of the multi-mode device node 400. In this way, the multi-mode device node 400 may likewise route communications received via any of these interfaces to access devices, the gateway device node, the device management server, and other device nodes of the network.

The low-power controller 422 may be the same as or at least similar to the low-power controller 322 discussed above with reference to FIG. 3, e.g., an SoC. In this regard, the low-power controller 422 likewise includes a processor 424 and memory 426 storing instructions that are executed by the processor for controlling operational aspects associated with the multi-mode device node 400. The instructions stored at the memory 426 of the low-power controller 422, in this example, include instructions corresponding to a protocol stack 428 that is configured to handle and process multiple types of low-power wireless communications received at and transmitted from the multi-mode device node 400 (e.g., BLE communications and ANT communications) from access devices, a gateway device node, the device management server, or other device nodes of the local network of interconnected devices. The protocol stack 428 of the low-power controller 422 may thus be the same as or at least similar to the protocol stack 332 of the low-power controller 322 discussed above with reference to FIG. 3.

In some example implementations, a device node may also include a signal processor situated between the low-power controller and the radio. The signal processor may intercept the output sent from the low-power controller to the radio and likewise intercept input received at the radio to be sent to the low-power controller. Processing the input and output may include filtering and/or amplifying the signals. As an example, it may be desirable to amplify the signals output from the low-power controller to increase the wireless transmission range of the device node. The extent to which those signals may be amplified might be limited, however, due to distortion that occurs when the signals are amplified beyond a certain power level, e.g., −5 dBm. In order to further amplify the signals and avoid distortion, the signal processor may intercept the signals output by the low-power controller and filter and amplify those signals before passing the signals to the radio for transmission. Suitable signal processors include the 2.4 GHz ZigBee®/802.15.4 Front-End Module having model number SE2431L available from Skyworks Solutions, Inc. of Woburn, Mass.

The memory 426 of the low-power controller 422, in this example, also stores instructions corresponding to control logic 430, routing logic 432, and security logic 434 also for controlling operational aspects of the multi-mode device node 400. The routing logic 432 and the security logic 434 may be the same as or at least similar to the routing logic 338 and security logic 340 discussed above with reference to the gateway 300 in FIG. 3. The routing logic 432 may thus also route communications to an access device, a gateway device node, a device management server, or other device nodes of the local network of interconnected devices.

Depending on the device node type of a multi-mode device node, however, the security logic 434 may include instructions corresponding to a subset of the security modes available at a gateway device node. As an example, the security logic of multi-mode device nodes that are configured to secure buildings, structures, and containers (e.g., lock-type device nodes), may include instructions corresponding to security modes that are relatively more secure than other security modes. The security logic of multi-mode device nodes that are not at risk for unauthorized access may include instructions corresponding to both relatively less secure and relatively more secure security modes. Where the multi-mode device node is a sensor-type device node, for example, the risk or costs of unauthorized access may be relatively small. Accordingly, the security logic of one or more sensor-type multi-mode device nodes may include instructions corresponding to one or more relatively less secure security modes. In addition, as noted above, the security logic 434 of the multi-mode device node 400 may be configured to employ a default security mode or a user-selected security mode.

The control logic 430 of the low-power controller 422 may depend on the device node type of the multi-mode device node 400. For activation-type multi-mode device nodes, the control logic 430 may include instructions for receiving and processing commands from a gateway device node, the device management server, or other device nodes of the local network of interconnected devices. For activation-type multi-mode device nodes, commands may include commands to activate a motor, an actuator, solenoid, optical output device or unit, audio output device or unit, and the like. For lock-type multi-mode device nodes, in particular, commands may include commands to toggle a lock status, i.e., commands to lock or unlock. For sensor-type multi-mode device nodes, commands may include commands to, e.g., activate or deactivate one or more sensors, adjust one or more sensor parameters (e.g., sensitivity), take a new measurement, and provide a most recent measurement, the previous x number of measurements, or a measurement obtained at a specified date and/or time or within a specified date range or time period.

The control logic 430 of the low-power controller 422 may also include instructions that are not dependent on the device node type. In particular, the control logic 430 for each type of multi-mode device node may include instructions for initializing the multi-mode device node upon startup, searching for and connecting to a local network of interconnected devices to join (e.g., a gateway device node or another device node), responding to polling commands (e.g., transmitted by a gateway device node), adding a new device node to the network, registering that new device node with a gateway device node, removing a device node from the network, establishing a master/slave relationship with another device node, and exchanging communications with an access device. The control logic 430 of the low-power controller 422 may also include instructions for toggling between a sleep mode and an awake mode during which the multi-mode device node 400 transmits announcements at periodic intervals (e.g., every 10-50 ms) for a predetermined time period (e.g., for 30-60 seconds). If the multi-mode device node 400 receives a pairing request while awake— e.g., from an access device or another device node—then the multi-mode device node may pair and communicate with that access device or device node. The control logic 430 may also include instructions that terminate the connection if a communication (e.g., a command request) is not received for a predetermined time period (e.g., 60 seconds). Furthermore the control logic 430 may include instructions to reenter a sleep mode upon termination of a connection and upon failing to receive a pairing request while awake during the predetermined time period.

As also seen in FIG. 4, memory 426 of the low-power controller 422 also stores a device node database 436 and an access device database 438. The access device database 438 may be the same as or at least similar to the access device database 344 discussed above with reference to FIG. 3. In this regard, the access device database 438, in this example, may store records corresponding to the access devices that have paired and bonded with the multi-mode device node 400 and are thus authorized to access the multi-mode device node. As noted above, an access node record may also include one or more keys associated with the access device and used by the low-power controller 422 to encrypt and decrypt content and communications transmitted to and received from the access device corresponding to that access device record. An access node record may also store an invitation code for an invited access device that has been authorized to communicate with the multi-mode device node 400.

The device node database 436, in this example, stores records of the next-level device nodes that are connected to the multi-mode device node 400 in the local network of interconnected devices. For a zero-level device node, the device node database 436 may thus store records corresponding to its child device nodes, i.e., the first-level device nodes in signal communication with that zero-level device node as well as the corresponding child device nodes of each of its child device nodes, i.e., the second-level device nodes in signal communication with those first-level device nodes. For a first-level device node, the device node database 436 may likewise store records corresponding to its child device nodes, i.e., the second-level device nodes in signal communication with that first-level device node. Accordingly, a device node record may include: the serial number of the child node and the network address assigned to the child node, the serial number of the parent node and the network address assigned to the parent node, the layer number of the parent node, and a registration status of the child node. The registration status of the child node may indicate whether the child node has been registered with an upper level device node. As an example, the device node record stored at a first-level device node for a second-level device node may indicate whether that second-level device node has been registered with a zero-level device node and/or a gateway device node.

The power module 406 of the multi-mode device node 400, in this example, includes a power port 440 for receiving power from an external power source and a power controller 442 for controlling the power supplied to one or more of the radios (not shown) of the multi-mode device node. As seen in FIG. 4, the power controller 442 is connected to the pairing button 412. Accordingly, like the pairing button 312 discussed above with reference to FIG. 3, the pairing button 412, when pressed by a user, may cause the power controller 442 to reduce the transmission power of the multi-mode device node 400 thus reducing its wireless range.

It will be appreciated that some implementations of multi-mode device nodes may also include an internal power source such as a battery in addition to a power port for receiving power from an external power source. Multi-mode device nodes having both an internal and an external power source may also include a power switch for toggling whether the multi-mode device node is powered internally or externally as described above with reference to FIG. 3. In addition, a multi-mode device node may also include a wired LAN interface and corresponding wired LAN controller similar to those of the gateway device node 300 discussed above. In addition, other implementations of a multi-mode device node may store its node database and access device database in local memory rather than the memory of the low-power controller.

With reference now to FIG. 5, an example of an implementation of a dual-mode device node 500 is shown. Similar to the gateway device node 300 and the multi-mode device node 400, the dual-mode device node 500, in this example, includes a control module 502, a communication module 504, and a power module 506. The dual-mode device node 500, in this example, also includes an ignition button 508, a reset button 510, a pairing button 512, and an LED 514. The dual-mode device node 500 may also include a physical security token 516 affixed to the device node, e.g., to a housing of the device node.

The ignition button 508, the reset button 510, and the pairing button 512 may be the same as or at least similar to, respectively, the ignition button 308, the reset button 310, and the pairing button 321 discussed above with reference to FIG. 3. In some example implementations, the dual-mode device node 500 may be configured to enter into a sleep mode if it is unable to connect to a local network of interconnected devices after a user presses the ignition button 508. Engaging the reset button 510 may cause the dual-mode device node to awake from the sleep mode and reattempt the process of locating a network to connect to. The physical security token 516 may also be the same as or at least similar to the physical security token 358 discussed above with reference to FIG. 3 and encode the same type of information associated with the dual-mode device node 500.

The communication module 504 of the dual-mode device node 500, in this example, includes one communication interface. In particular, the communication module 504, in this example, includes a radio having a transceiver 520 and corresponding antenna 522. The radio 518 may be configured to operate at one or more frequencies within the ISM radio band. Accordingly the radio 518 may be, e.g., a 2.4 GHz and/or 5 GHz radio. Other types of radios and frequency bands suitable for wireless communications may be selectively employed. The radios discussed above with reference to the gateway device node 300 and the multi-mode device node 400 may be the same as or at least similar to the radio 518 of the dual-mode device node 500.

The control module 502 of the dual-mode device node 500, in this example, also includes a single controller 524 for handling and responding to the wireless communications received at and transmitted from the dual-mode device node. The controller 524, in this example, is also a dual-standard low-power controller ("low-power controller") configured to selectively utilize multiple low-power wireless communication standards to wirelessly communicate with access devices, a gateway device node, and other device nodes of the local network of interconnected devices. In some example implementations, the low-power controller 524 is configured to utilize both the BLE and ANT low-power wireless communication standards. As seen in FIG. 5, the low-power controller 524 is in signal communication with the radio 518.

The low-power controller 524 may be the same as or at least similar to the low-power controller 322 discussed above with reference to FIG. 3, e.g., an SoC. In this regard, the low-power controller 524 likewise includes a processor 526 and memory 528 storing instructions that are executed by the processor for controlling operational aspects associated with the dual-mode device node 500. The instructions stored at the memory 528 of the low-power controller 524, in this example, include instructions corresponding to a protocol stack 530 that is configured to handle and process multiple types of low-power wireless communications received at and transmitted from the dual-mode device node 500 (e.g., BLE communications and ANT communications) from access devices, a gateway device node, or other device nodes of the local network of interconnected devices. The protocol stack 530 of the low-power controller 524 may thus be the same as or at least similar to the protocol stack 332 of the low-power controller 322 discussed above with reference to FIG. 3.

The memory 528 of the low-power controller 524, in this example, also stores instructions corresponding to control logic 532, routing logic 534, and security logic 536 for controlling operational aspects of the dual-mode device node 500. The routing logic 534 and the security logic 536 may be the same as or at least similar to the routing logic 338 and security logic 340 discussed above with reference to the gateway 300 in FIG. 3. The routing logic 534 may thus also route communications to an access device, a gateway device node, or other device nodes of the local network of interconnected devices.

Like the security logic 434 of the multi-mode device node 400, the security logic 536 may similarly depend on the device node type of a dual-mode device node. The security modes included in the security logic 536 of the low-power controller 524 may thus depend on the risk associated with unauthorized access to the dual-mode device node (e.g., sensor-type device nodes versus lock-type device nodes). Accordingly where relatively less risk is associated with the dual-mode device node 500, the security logic 536 may include instructions corresponding to relatively less secure security modes. Likewise where relatively more risk is associated with the dual-mode device node 500, the security logic 536 may include instructions only corresponding to relatively more secure security modes. The security logic 536 of the low-power controller 524 may also be configured to employ a default security mode or a user-selected security mode.

The control logic 532 of the low-power controller 524 may likewise depend on the device node type of the dual-mode device node 500. Accordingly, the control logic 532 of the low-power controller 524 may be similar to the control logic 430 discussed above, e.g., with respect to activation-type dual-mode device nodes and sensor-type dual-mode device nodes. The control logic 532 of the low-power controller 524 may likewise include instructions that are not dependent on the device node type. In particular, the control logic 532 for each type of dual-mode device node may include instructions for initializing the dual-mode device node upon startup, searching for and connecting to a local network of interconnected devices to join (e.g., a gateway device node or another device node), responding to polling commands (e.g., transmitted by a gateway device node), adding a new device node to the network, registering that new device node with a gateway device node, removing a device node from the network, establishing a master/slave relationship with another device node, and exchanging communications with an access device. The control logic 532 of the low-power controller 524 may thus also include instructions for toggling between a sleep mode and an awake mode during which the dual-mode device node 500 transmits announcements at periodic intervals for a predetermined time period. The control logic 532 may thus likewise include instructions to terminate a connection and reenter a sleep mode if a communication is not received within a predetermined time period or reenter a sleep mode if a pairing request is not received in response to an announcement transmitted within a predetermined time period.

The memory 528 of the low-power controller 524 likewise stores a device node database 538 and an access device database 540. The access device database 540 may be the same as or at least similar to the access device databases 344 and 438 discussed above with reference to FIGS. 3-4. In this regard, the access device database 540, in this example, may store records corresponding to the access devices that have paired and bonded with the dual-mode device node 500 and are thus authorized to access the dual-mode device node. As noted above, an access node record may also include one or more keys (e.g., a public key) associated with the access device and used by the low-power controller 524 to encrypt and decrypt content and communications transmitted to and received from the access device corresponding to that access device record as well as an invitation code generated for an invited access device that has been authorized to communicate with the dual-mode device node. The device node database 538 likewise stores records of the next-level device nodes that are connected to the dual-mode device node 500 in the local network of interconnected devices. Accordingly the device node database 538 and its corresponding device node records may be the same as or at least similar to the device node database 436 discussed above with reference to FIG. 4.

The power module 506 of the dual-mode device node 500, in this example, includes an internal power source, in particular, a battery 542 and a power controller 544 for controlling the power supplied to the radio 518. As seen in FIG. 5, the power controller 544 is connected to the pairing button 512. Accordingly, like the pairing button 312 discussed above with reference to FIG. 3, the pairing button 512, when pressed by a user, may cause the power controller 544 to reduce the transmission power of the dual-mode device node 500 thus reducing its wireless range.

It will be appreciated that some implementations of dual-mode device nodes may also include a power port for receiving power from an external power source in addition to a battery. Dual-mode device nodes having both an internal and an external power source may also include a power switch for toggling whether the dual-mode device node is powered internally or externally as described above with reference to FIG. 3. It will also be appreciated that in some implementations of gateway device nodes, multi-mode device nodes, and dual-mode device nodes one or more of the ignition button, the reset button, the pairing button, and the LED may be optional. In addition, other implementations of a dual-mode device node may store the device node database and access device database in local memory rather than in the memory of the low-power controller.

Figure 6A:
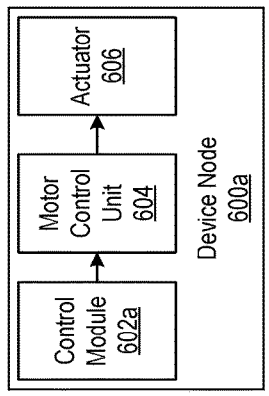
FIG. 6A depicts an example of an implementation of a first type of device node in accordance with aspects described herein.
Figure 6B:
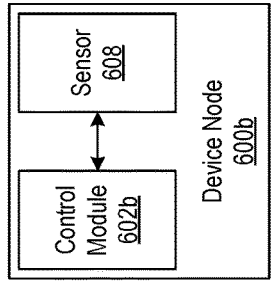
FIG. 6B depicts an example of an implementation of a second type of device node in accordance with aspects described herein.

Referring now to FIGS. 6A-B, respective examples of implementations of two types of device nodes 600a and 600b are shown. In FIG. 6A, an activation-type device node 600a is shown, and in FIG. 6B, a sensor-type device node 600b is shown. Like the device nodes discussed above, the activation-type device node 600a and the sensor-type device node 600b each include, respectively, a control module 602a and 602b. The control modules 602a and 602b may be the same as or similar to the control modules discussed above with respect to the gateway device node, the multi-mode device node, and the dual-mode device node. The control module 602a, in this example, is in signal communication with a motor control unit 604 (MCU) which is in turn in connected to an actuator 606. The control module 602a may issue commands to the MCU 604 which in turn triggers activation of the actuator 606 based on those commands. As noted above, activating the actuator 606 may include locking or unlocking a lock, automatically opening or closing a door (e.g., a garage door), and the like. Instead of an MCU 604 and actuator 606, other activation-type device nodes may include optical output devices (e.g., display screens, lights, etc.), audio output devices (e.g., speakers), solenoids, and the like that are connected to the control module 602a. The control module 602b, in this example, is in signal communication with a sensor 608. The control module 602a may thus issue commands to the sensor 608 as discussed above and/or receive data from the sensor (e.g., one or more sensor readings). Various types of sensors that may be employed will be appreciated with the benefit of this disclosure.

Figure 6C:
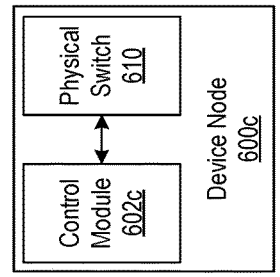
FIG. 6C depicts an example of an implementation of a device node in accordance with aspects described herein.

With reference to FIG. 6C, another example of an implementation of a device node 600c is shown. The device node 600c may correspond to any of the various types of device nodes described above. Like the device nodes 600a-b, the device node 600c includes a control module 602c. The device node 600c, in this example, also includes a physical switch 610 in signal communication with the control module 602c and accessible to a user. A user may engage the physical switch 610 to toggle the active/inactive status of the device node 600c and/or toggle the awake/asleep status of the device node. Accordingly, in some example implementations, the physical switch 610 may be the same as or at least similar to the ignition buttons or reset buttons discussed above. In an inactive state, the device node 600c may be completely powered down. In an active state, the device node may be powered up and either in an asleep state or an awake state. In the asleep state, the device node 600c may only listen for communications transmitted by other device nodes of the local network of interconnected devices. In response to receipt of a communication while in the asleep state, the device node 600c may enter the awake state and take some action, e.g., transmit a response to the communication received. In the awake state, the device node 600c may both listen for communications transmitted by other device nodes as well as transmit communications to other device nodes. The device node 600c may also perform other types of actions when in the awake state, e.g., trigger an actuator or obtain data measured by a sensor. If the device node 600c is in the inactive state, engaging the switch 610 activates the device node. A device node may be configured to enter either the asleep state or the awake state when activated, and the state the device node enters when activated may depend on the type of device. A keyfob, for example, may be configured to immediately enter the asleep state (i.e., power up and listen) when its physical switch is engaged. A door lock, however, may be configured to immediately enter the awake state when its physical switch is engaged and attempt to join the local network of interconnected devices (i.e., power up and transmit). In a similar fashion, a device node may be configured to either listen or immediately transmit when entering the awake state from the asleep state, i.e., wake up and listen versus wake up and transmit. Additional examples will be appreciated with the benefit of this disclosure.

As noted above, the control logic of the respective controllers at the gateway device nodes, multi-mode device nodes, and the dual-mode device nodes include instructions for forming a local network of interconnected devices, securing and routing communications along pathways through and to device nodes of the network, and responding to commands received in those communications. These functional aspects are discussed in further detail below.

Device Node Communications and Operations

Functional aspects associated with the device nodes include forming the local network of interconnected devices, authorizing access devices to access the device nodes of the network, securing the communications exchanged, and routing communications between access devices and device nodes of the network.

Figure 7:
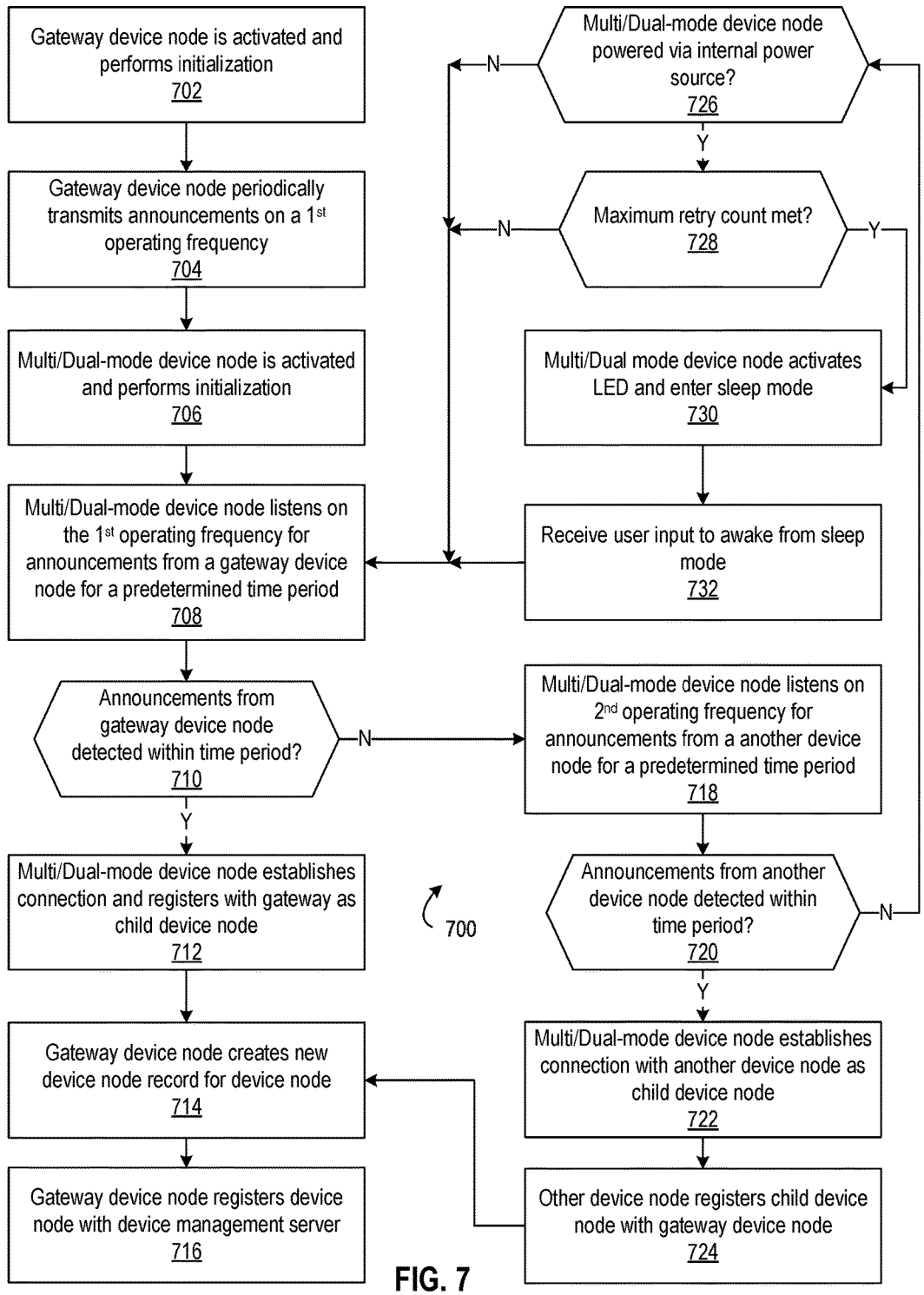
FIG. 7 depicts a flowchart of example method steps for forming a local network of interconnected devices in accordance with aspects described herein.

In FIG. 7, a flowchart 700 of example method steps for forming a local network of interconnected devices is shown. The local network formed through performance of these example steps may be a mesh network of device nodes and formed using a low-power wireless communication standard (e.g., the ANT wireless communication standard). A local network of interconnected devices may be formed by first activating a gateway device node and perform an initialization procedure (block 702). After initializing the gateway device node ("gateway") periodically transmits announcements (e.g., every 10-500 ms) on a first operating frequency (block 704). In some example implementations, the operating frequency may be a first one of two channels (e.g., channel zero at 2466 MHz). In addition, the gateway device node may include its serial number and its device type (e.g., gateway) in the announcements transmitted. While the gateway device node is transmitting its announcements, a new device node may be activated and also perform an initialization (block 706). This new device node may be a multimode device node or a dual-mode device node as discussed above.

After initializing, the new device node listens, for a predetermined period of time, on the first operating frequency for announcements transmitted from a gateway device node (block 708). If the new device node does receive an announcement, the new device node may determine it was transmitted by a gateway device node based on the device node type information included in the announcement. In addition, the new device node may only listen for announcements transmitted from a gateway device node for a predetermined period of time before listening for announcements transmitted from another device node (e.g., another multi- or dual-mode device node) instead. In some example implementations, the predetermined period of time may be, e.g., between about 30 seconds to about 120 seconds. If the new device node does receive an announcement transmitted from a gateway device node within the predetermined time period (block 710: Y), then the new device node establishes a connection with the gateway device node as a child device node (block 712). Establishing a connection with the gateway device node as a child device node includes assigning the child device node a network address in the local network of interconnected devices. Once connected to the new device node, the gateway device node creates a new record in its device node database corresponding to the new device node (block 714) as described above. The gateway device node then, in turn, registers the new device node with the device management server (block 716) which also updates its database of device nodes to associate the gateway device node and the new device node.

If, however, the new device node does not receive an announcement transmitted from a gateway device node within the predetermined time period (block 710: N), then the new device node listens, for a predetermined time period, on a second operating frequency for announcements transmitted from another node (e.g., another multi- or dual-mode device node) of the local network of interconnected devices (block 718). The other device node may be, e.g., a zero-level or first-level device node. In some example implementations, multi- and dual-mode device nodes may be configured to transmit announcements on a different operating frequency than the gateway device node, for example, the second of two channels (e.g., 2468 MHz). The predetermined period the device node listens on the second operating frequency may likewise be about 30 seconds to about 120 seconds. If the new device node does receive an announcement transmitted from another device node within the predetermined time period (block 720: Y), then the new device node establishes a connection with the other device node as a child device node (block 722). The new device node is likewise assigned a network address in the local network of interconnected devices via that other device node. The other device node also registers the new device node with the gateway device node (block 724) which, in turn, creates a new device node record for the new device node (block 714) and registers the new device node with the device management server (block 716).

If, however, the new device node does not receive an announcement transmitted from another device node of the local network of interconnected devices (block 720: N), then the subsequent response may depend on whether the new device node is powered internally or externally. If the new device node is powered via an external power source (block 726: N), then the new device node continually repeat the process of listening on a first operating frequency for announcements transmitted from a gateway device node (block 708) and, if needed, listening on a second operating frequency for announcements transmitted from another device node (block 718). If, however, the device node is powered via an internal power source (block 726: Y), then the new device node may reattempt to discover a gateway device node or another device node for a predetermined number of attempts (e.g., a maximum of three attempts). If the maximum retry count of the device node has not been met yet (block 728: N), then the new device node repeats the process of listening for announcements transmitted from a gateway device node (block 708) or, if needed, another device node (block 718). If, however, the maximum retry count has been met (block 728: Y), then the new device node may activate an LED indicating it could not locate a gateway device node or another device node to connect to and enter a sleep mode (block 730). The new device node may remain in the sleep mode until it receives user input (e.g., at a reset button) to awake it from the sleep mode (block 732). Upon awaking from the sleep mode, the new device node repeats the process of listening for announcements transmitted from a gateway device node (block 708) or, if needed, another device node (block 718). One or more of the steps depicted in FIG. 7 may be repeated to add other device nodes to the local network of interconnected devices.

Figure 8:
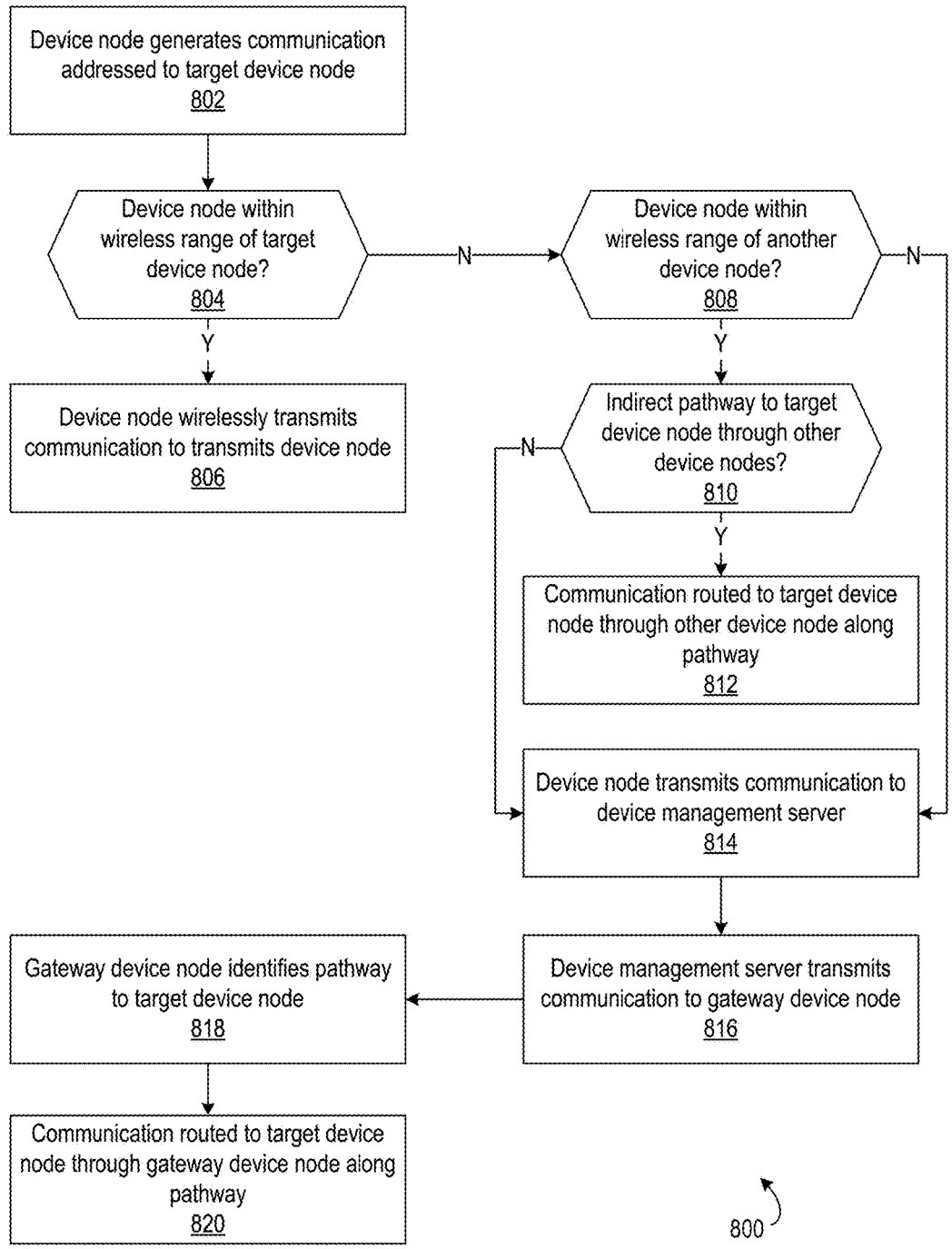
FIG. 8 depicts a flowchart of example method steps for routing a communications to a device node in a local network of interconnected devices in accordance with aspects described herein.

In FIG. 8, a flowchart 800 of example method steps for routing a communications to a device node in a local network of interconnected devices is shown. A device node of the local network of interconnected devices generates a communication addressed to a target device node in the network (block 802). If the device node is within wireless range of the target device node (block 804: Y), then the device node wirelessly transmits the communication to the target device node (block 806). The device node may transmit the wireless communication using, for example, a short-range wireless communication standard (e.g., Bluetooth Classic) or a low-power wireless communication standard (e.g., BLE or ANT). The device node may determine whether it is within wireless range of the target device node based on receipt of an announcement, which the target device node may periodically transmit as discussed above. The device node may identify an announcement transmitted from the target device node based on the serial number of the target device node included in the announcement. In addition, the target device node may be configured to transmit an acknowledgement back to the device node upon successfully receiving the communication. Accordingly, the device node may be configured to periodically transmit the communication until an acknowledgement is received from the target device node or until a maximum retry count has been met.

If the device node is not within wireless range of the target device node (block 804: N)—or if an acknowledgement is not received—the device node attempts to route the communication to the target device node via one or more other device nodes of the local network of interconnected devices or through the device management server, the device node may likewise determine it is within wireless range of another device node based on announcements periodically transmitted by another device node. If the device node is within wireless range of another device node (block 808: Y), then the device node may determine whether there is an indirect pathway to the target device node through one or more device nodes of the network (e.g., via one or more of a gateway device node, multi-mode device node, or dual-mode device node). If there is an indirect pathway to the target device node (block 810: Y), then the device nodes of the network route the communication from the device node to the target device node (block 812). If, however, an indirect pathway through the other device nodes cannot be determined (block 810: N), then the device node transmits the communication to the device management server (block 814). If configured for WLAN and/or cellular network communications, the device node may transmit the communication to the device management server using, e.g., one of a WLAN network interface or a cellular communication interface as described above. The device management server then sends the communication to the gateway device node of the network (block 816) which identifies a pathway to the target device node (block 818), e.g., a direct or indirect pathway. The communication is thus routed to the target device node along the identified pathway (block 820). The acknowledgement from the target device node may be routed back to the device node along the same pathway (or a different pathway depending on the environmental conditions when target device node sends the acknowledgement).

Figure 9:
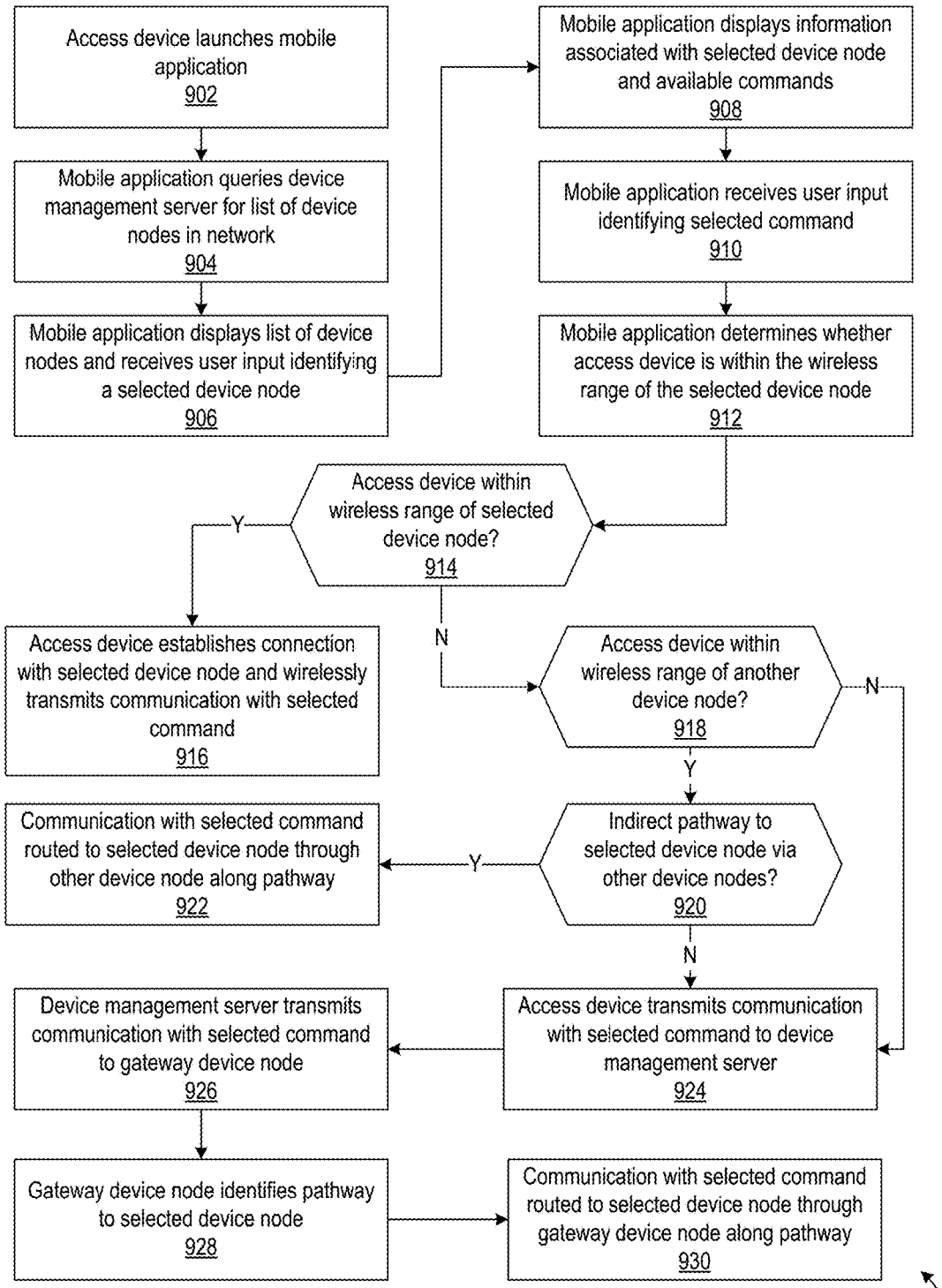
FIG. 9 depicts a flowchart of example method steps for routing a communication from an access device to a device node in a local network of interconnected devices in accordance with aspects described herein.

In FIG. 9, a flowchart 900 of example method steps for routing a communication from an access device to a device node in a local network of interconnected devices is shown. An access device launches a mobile application (block 902) and queries the device management server for a list of the device nodes in the local network of interconnected devices (block 904). The device management server may authenticate the mobile application based on access credentials received at the mobile application (e.g., a username and password) and compared to access credentials stored for the corresponding user account. The list of device nodes may thus be the device nodes associated with that user account.

The mobile application displays the list of device nodes and receives user input identifying a selected device node (block 906). Upon selection of a device node, the mobile application displays information associated with the selected device node (e.g., device name, device serial number, device type) as well as the commands available to send to the device (block 908). The mobile application receives user input identifying a selected command to send to the selected device node (block 910). The mobile application then determines whether the access device is within the wireless range of the selected device node (block 912). If the access device is within the wireless range of the selected device node (block 914: Y), then the access device establishes a connection with the selected device node and wirelessly transmits a communication to the selected device node with the selected command (block 916). The access device may likewise determine whether it is within wireless range of the selected device node based on announcements periodically transmitted by the selected device node as described above. The access device may wirelessly transmit the communication using, for example, a short-range wireless communication standard (e.g., Bluetooth Classic) or a low-power wireless communication standard (e.g., BLE or ANT).

If, however, the access device is not within wireless range of the selected device node (block 914: N), then the mobile application may determine whether the access device is within wireless range of the selected device node, e.g., based on announcements periodically transmitted by another device node as described above. If the access device is within wireless range of another device node (block 918: Y), then the mobile application may determine whether there is an indirect pathway to the selected device node through one or more device nodes of the network. If there is an indirect pathway to the selected device node (block 920: Y), then the device nodes of the network route the communication from the access device to the selected device node along that pathway (block 922). If, however, an indirect pathway through the other device nodes cannot be determined (block 920: N), then the access device transmits the communication to the device management server (block 924). The access device may likewise send the communication to the device management server using, e.g., one of a WLAN network interface or a cellular network interface. The device management server then sends the communication to the gateway device node of the network (block 926) which identifies a pathway to the selected device node (block 928), e.g., a direct or indirect pathway. The communication is thus routed to the selected device node along the identified pathway (block 930). The selected device node may likewise send the access device an acknowledgment upon receipt of the communication that includes the selected command, which may be sent directly or routed along the same pathway or a different pathway back to the access device.

As described above, one of the low-power wireless communication standards (e.g., ANT) may be employed to form and maintain the network of interconnected devices and route communications to target device nodes through the network. The communications routed to target device nodes may be routed along pathways made up of device nodes that are within wireless range of each other. The capacity of the low-power wireless communications may be limited (e.g., to 8 bytes). Accordingly, content that exceeds the capacity of the low-power wireless communications may be divided into packets and transmitted to a target device node in a series of communications (e.g., using start, end, and continue flags in the communications).

As also described above, the gateway device node maintains the local network of interconnected devices. The gateway device node may thus transmit communications intended for all device nodes as well as communications intended for a particular device node. Accordingly the gateway device node may address a communication using a global network address when transmitting communications intended for all device nodes and the assigned network address of a particular device node when transmitting a message intended for that particular device node. Other types of device nodes (e.g., multi- or dual-mode device nodes) may also transmit communications to their child nodes. In a master/slave configuration, for example, the master device node may transmit communications to a slave device node at any time whereas the slave device node may be configured to only transmit a communication in response to receipt of a communication from its master device node.

Forming and maintaining the local network of interconnected devices includes the exchange of communications between device nodes for, e.g., assigning network addresses, issuing operation requests, adding additional device nodes, removing existing device nodes, and polling the device nodes of the network.

Assigning network addresses may include the following example sequence of communications. This example sequence of communications may be exchanged between a device node that requests a network address (i.e., the requesting device node) and the device node that provides the assigned network address (i.e., the assigning device node). In various example scenarios, the assigning device node may be a gateway device node, a zero-level device node, or a first-level device node, and the requesting device node may be, respectively, a zero-level device node, a first-level device node, or a second-level device node. The assigning device node, in this example, transmits an announcement indicating a network address is available. The announcement may identify the serial number of the assigning device node, the layer number of the assigning device node in the network (e.g., layer zero, layer one, etc.), and the network address that is available. Upon receipt of the announcement, the requesting device node transmits to the assigning device node a request for assignment of the available network address. The request may identify the serial number of the requesting device node. The assigning device node then transmits a confirmation to the requesting device node in response to receipt of the request. The confirmation may identify the serial number of the requesting device node and the network address being assigned to the requesting device node. The requesting device node then transmits an acknowledgement back to the assigning device node acknowledging receipt of the confirmation. The acknowledgement may identify the serial number of the requesting device node. The assigning device node may store the serial number of the requesting device node and the network address assigned to the requesting device node in memory such that the serial number and network address are associated with each other. In this way, the assigning device node may route communications addressed to the requesting device node.

As noted above, a gateway device node may transmit or route communications received from the device management server to the appropriate device node. Communications received from the device management sever may be initially transmitted to the device management server from an access device or one of the device nodes of the local network of interconnected devices. The communications from the device management server may include commands identifying operations for the device node to perform and thus may be referred to as operation requests. Transmitting or routing operation requests from the device management server to a device node may include the following example sequence of communications. The gateway device node receives an operation request from the device management server, e.g., via a wired LAN interface, a wireless LAN interface, or a cellular network interface. This operation request may identify the serial number of the targeted device node, the device node type of the device node, a timestamp, and a payload to deliver to the targeted device node. The device management server may also encrypt the content of the communication (i.e., the payload) using a key associated with the gateway device node. The payload may identify an operation to perform (e.g., open/close, lock/unlock, activate/deactivate, etc.). Following receipt of this operation request, the gateway device node may decrypt the content of the communication using its key and re-encrypt the content of the communication using a key associated with the targeted device node. The gateway device node also determines the wireless communication standard to utilize to send the operation request to the targeted device node (e.g., a short-range or low-power wireless communication standard). The gateway device node may also determine whether the targeted device node is within the wireless range of the gateway device (e.g., a zero-level device node) or whether the operation request needs to be routed via a parent device node to the targeted device node (e.g., where the targeted device node is a first-level device node or a second-level device node).

Where the targeted device node is within the wireless range of the gateway device node, the gateway device node transmits an operation request directly to the targeted device node. The operation request from the gateway device node may include the network address assigned to the targeted device node and the encrypted content. In response to receipt of the operation request from the gateway device node, the targeted device node transmits an acknowledgement back to the gateway device node. This acknowledgement may include the serial number of the targeted device node and the network address assigned to the targeted device node. The targeted device node may decrypt the encrypted content using its key and perform the specified operation.

Where the targeted device node is not within the wireless range of the gateway device node, the gateway routes the operation request through a parent device node of the targeted device node (e.g., via a zero-level device node and/or first-level device node). The gateway device node transmits an operation request to the parent device node that may include the network address assigned to the parent device node and the encrypted content. In turn the parent device node transmits an operation request to the targeted device node that may likewise include the network address assigned to the targeted device node and the encrypted content. The targeted device node then transmits acknowledgement back to its parent device node that may include the serial number of the targeted device node and the network address assigned to the targeted device node. The targeted device node likewise decrypts the encrypted content using its key and performs the specified operation. In turn, the parent device node transmits an acknowledgement to the gateway device node that may similarly include the serial number of the targeted device node and the network address assigned to the parent device node. The gateway device node may likewise transmit an acknowledgement back to the device management server that may include the serial number of the targeted device node and an indication the operation request was successfully delivered to the targeted device node. If the gateway device node does not receive an acknowledgement from the targeted device node or its parent, then the gateway device node may transmit an acknowledgement back to the device management server that includes an indication the operation request could not be delivered to the selected device node. The device management server may likewise transmit a communication to the access device or device node that initiated the request indicating whether the operation request was successfully delivered to the targeted device node.

As also noted above, device nodes may be added as child device nodes to a gateway device node or to other device nodes of the local network of interconnected devices. When a device node adds a child device node, that device node may inform the gateway device node that a new child device node has been added. The parent device node thus transmits a communication message to the gateway device node that includes information associated with the child device node. The communication may include the serial number of the parent device node, the network address assigned to the parent device node, the serial number of the child device node, the network address assigned to the child device node, the layer number of the parent device node, and the registration state of the child device node. The gateway device node may transmit back to the parent device node an acknowledgement upon receipt of the communication. A parent device node may also transmit to a gateway device node a request to remove (i.e., unregister) one of its child device nodes. The request may include the network address assigned to the parent device node and the serial number of the child device node to remove.

A parent device node may also poll its child device nodes for their respective statuses. A parent device node may periodically transmit a status request to one or more of its child device nodes. The status request may include the network address assigned to the parent device node and the serial number of the child device node. The parent device node may sequentially transmit a status request to each of its child device nodes. In response to receipt of the status request, a child device node transmits an acknowledgement back to its parent device node. The parent device node may maintain, for each child device node, a status polling counter that is incremented whenever the parent device node does not receive an acknowledgement from the child device node in response to a status request transmitted by the parent device node. The parent device node may reset the counter to zero upon receipt of an acknowledgement from the child device node. If, however, the counter reaches a maximum value (e.g., 10), then the parent device node may remove that child device node. The parent device node may also remove any child device nodes connected to the child device node that was removed. The parent device node may fail to receive an acknowledgement from a child device node in response to a status request where, for example, the child device node shuts off. A child device node may likewise maintain a status polling counter that is incremented at predetermined intervals (e.g., every second). The child device node may reset the counter to zero upon receipt of a status request from its parent device node. If, however, the counter reaches a maximum value, then the child device node may remove itself from the parent device node. The child device node may also remove its own child device nodes.

In FIG. 10, an example of an implementation of an interface 1000 listing the device nodes of a local network of interconnected devices is shown. A user may access the interface 1000 via the access portal of the device management server as described above. The interface 1000 presents to the user information regarding the local network of interconnected devices that is associated with the corresponding user account for the user. As seen in FIG. 10, the interface 1000, in this example, include a list 1002 of the device nodes associated with a user account. The list 1002 indicates, for each device node, the descriptive name given to the device node when the user first added the device node to the network, the device node type of the device node, the serial number given to the device node during manufacture, and the current status of the device node in the network (e.g., active versus inactive). The list 1002 of device nodes also includes, for each device node, a user input element 1004 for removing the device node from the local network of interconnected devices. The list 1002 also includes, for each device node listed, a user input element 1006 for toggling the status of a device node. Upon receiving input, the input element 1006 for a device node may trigger a command to toggle the current status of that device node. The device management server may transmit a communication with the command to the gateway device node of the network which may, in turn, route the communication to the appropriate device node. The device node may transmit an acknowledgement back to the device management server which may update the interface 1000 in response to indicate the new status of the device node.

The interface 1000, in this example, also includes a section 1008 at which a user may provide information associated with a new device node in order to add that new device node to the local network of interconnected devices. As seen in FIG. 10, the user may be required to provide a descriptive name for the new device node, the serial number of the new device node, and the security token associated with the new device node. As described above, the user may obtain the serial number and security token for the new device node by scanning a physical security token (e.g., a barcode) affixed to the housing of the new device node using an access device and decrypting the scanned information using a mobile application residing at the access device. The user may provide this information at the interface 1000, and the device management server compares the device node information received to the device node information stored at its database of device node records. If the serial number and security token received match the serial number and security token stored, then the device management server associates the device node with the user account for the user and update the list 1002 of device nodes to include the new device node added. The interface 1000 may also be configured such that the user may select individual device nodes in the list of device nodes 1002 in order to display additional information and commands associated with a selected device node. The interface 1000 is depicted by way of example only, and other implementations of the interface may include additional or alternative information associated with the local network of interconnected devices and/or associated with individual device nodes of the network. In addition, the mobile application residing at an access device may be configured to provide functionality that is the same as or at least similar to the functionality described above with reference to interface 1000.

Figure 11:
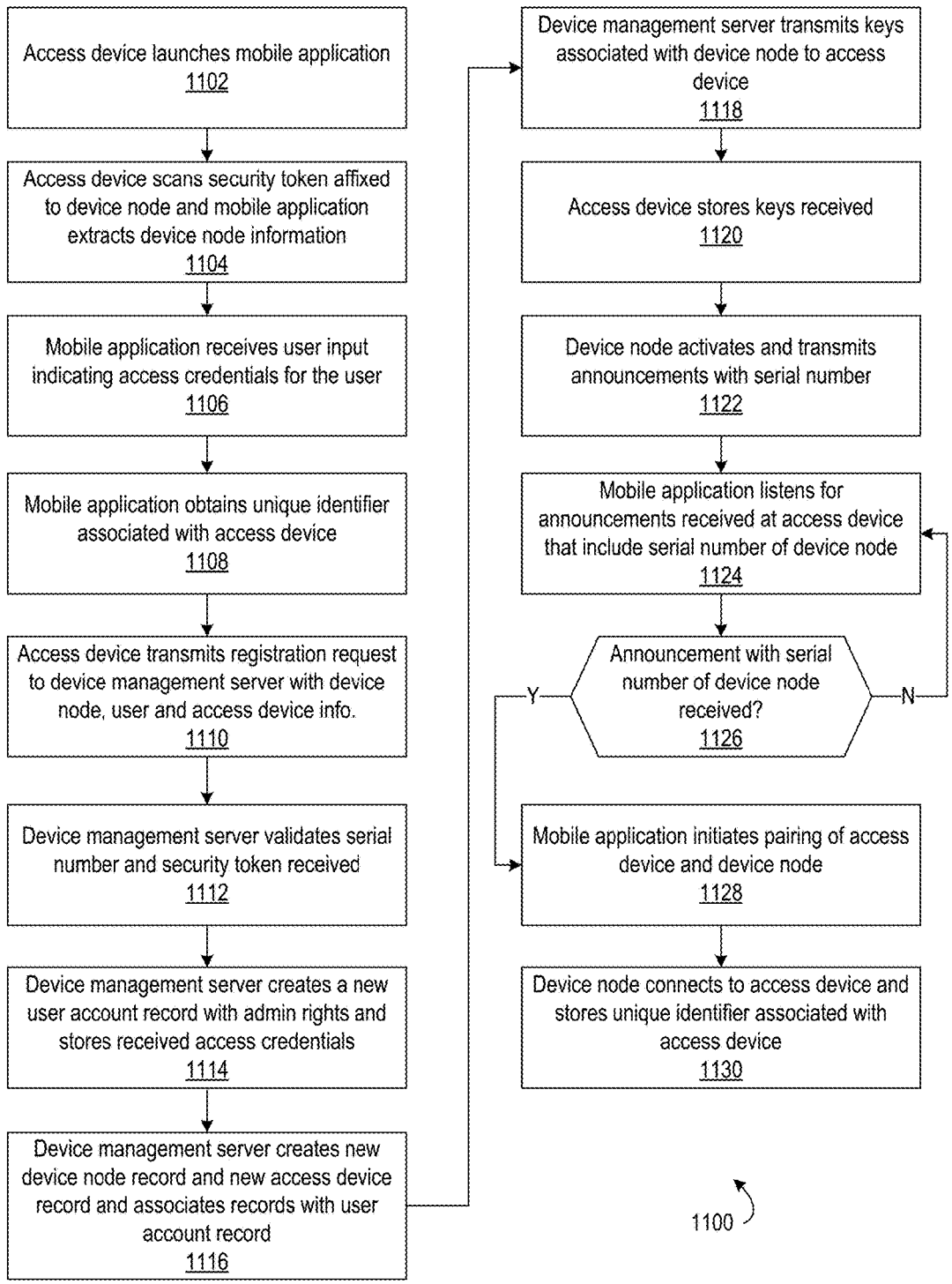
FIG. 11 depicts a flowchart of example method steps for registering an access device having administrative rights with a device management server in accordance with aspects described herein.

In FIG. 11, a flowchart 1100 of example method steps for registering an access device having administrative rights with a device management server is shown. An access device launches a mobile application (block 1102) The access device scans the physical security token affixed to the device node, and the mobile application extracts from the scanned information the information associated with the device node (block 1104), e.g., the serial number of the device node, the security token for the device node, the device node type, and the default security mode for the device node. The mobile application also receives user input indicating access credentials the user selects to access the user account at the device management server (block 1106), e.g., a preferred username, password, and/or email address. The mobile application also obtains information associated with the access device (block 1108), e.g., a unique identifier such as a MAC address, a universally unique identifier (UUID), a serial number, and the like.

Having obtained the information associated with the device node, the user, and the access device, the access device transmits a registration request to the device management server that includes that information (block 1110). The device management server validates the serial number and security token received and matches them against the serial number and security token stored in its database of device node records (block 1112). If the received serial number and security token match the stored serial number and security token, the device management server creates a new user account record with administrative rights and stores the received access credentials with that user account record (block 1114). The device management server also associates the device node record for the device node with the new user account record (block 1116).

Having created the new user account and associated the device node with the new user account, the device management server may retrieve the keys associated with the device node and transmit those keys to the access device (block 1118). As described above, the keys for a device node may be generated during manufacture of the device node and stored at the device management server with the device node record for that device. The device node itself may also store the keys in memory. In some example implementations, the keys may include a first key the device node utilizes to encrypt a session identifier for a wireless communication session established with an access device and the access device utilizes to decrypt the session identifier, a second key the access device uses to encrypt the session identifier of the communication session and the device node utilizes to decrypt the session identifier, and a third key the device node and access device each utilize to encrypt and decrypt the content (i.e., the payload) of the communications exchanged. Upon receipt of the keys from the device management server, the access device stores the keys in memory (block 1120). The access device may store the received keys in a device node record stored at a device node database maintained by the access device or otherwise store the keys in memory. Since the access device may store keys associated with multiple device nodes, the access device may store the keys in memory such that the access device may determine which device node corresponds to which keys, e.g., by associating the serial number of the device nodes with their respective keys in memory.

The device node may then activate and periodically transmit announcements that include its serial number (block 1122). As noted above, the device node may transmit the announcements using a short-range wireless communication standard (e.g., Bluetooth Classic) or a low-power wireless communication standard (e.g., BLE or ANT). As also described above, the device node may transmit the announcements on a particular operating frequency which may depend on the device node type of the device node. As noted above, a gateway device node may transmit announcements on one operating frequency while multi- and dual-mode device nodes transmit announcements on a different operating frequency. Based on the device node type indicated in the scanned information, the mobile application listens for announcements received at the access device that include the serial number of the device node (block 1124). If the access device does not receive an announcement transmitted from the device node (block 1126: N), then the mobile application may continue to listen until the access device receives an announcement transmitted from the device node. Upon receiving an announcement transmitted from the device node (block 1126: Y), the mobile application initiates a pairing procedure to pair the access device with the device node (block 1128). During the pairing procedure, the access device may provide the device node with its unique identifier, and the device node may store that unique identifier (block 1130). In this way, the access device and the device node may be bonded such that the access device and device node may subsequently pair automatically when within their respective wireless ranges.

Figure 12:
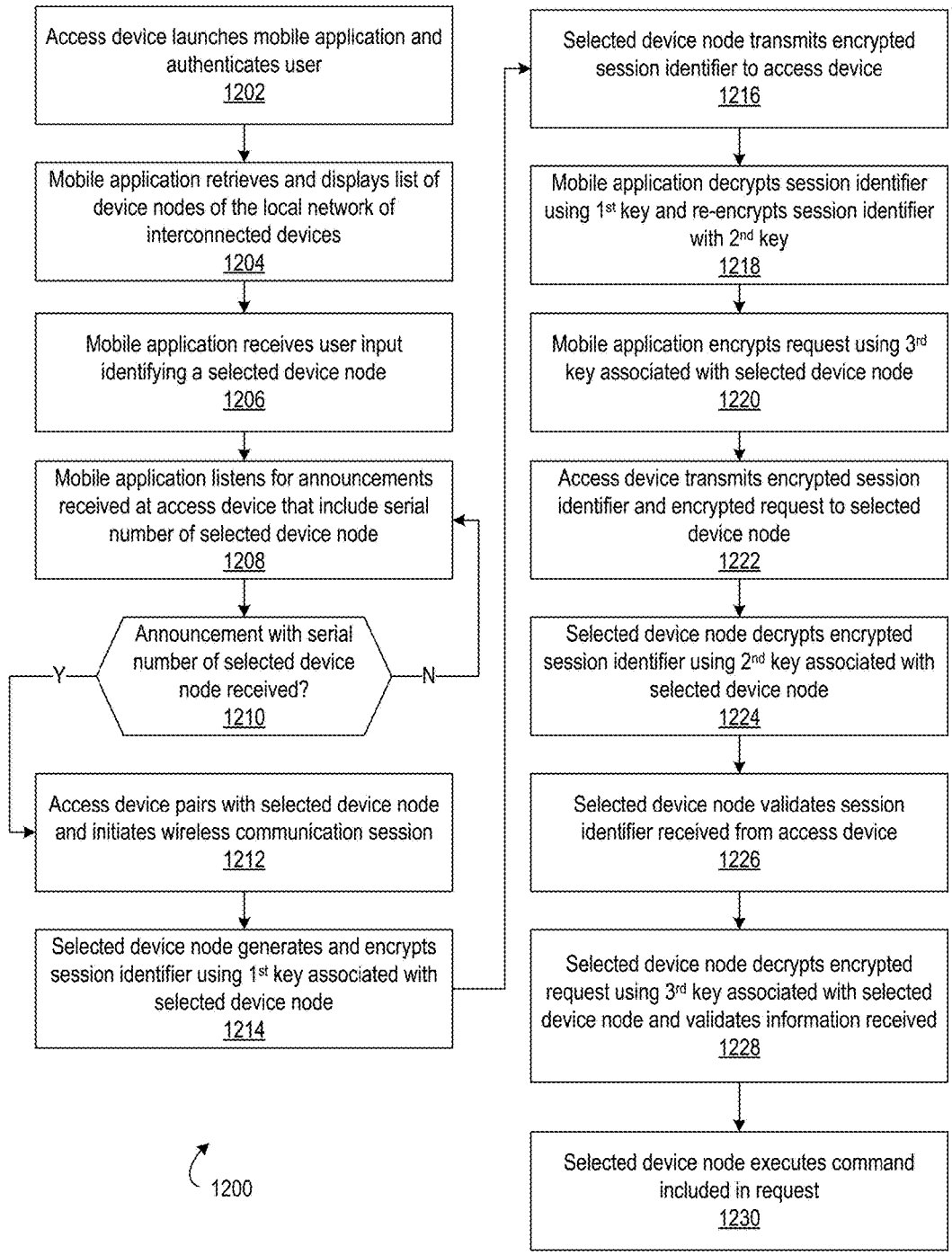
FIG. 12 depicts a flowchart of example method steps for establishing a connection between an access device having administrative access rights and a device node in accordance with aspects described herein.

In FIG. 12, a flowchart 1200 of example method steps for establishing a connection between an access device having administrative access rights and a device node is shown. An access device launches a mobile application and authenticates the user (block 1202), e.g., using the access credentials provided by the user when first registering the access device with the device management server. In some example implementations, the mobile application may submit an authentication request to the device management server with the access credentials, and the device management server may respond to the mobile application with an indication of whether the user has been authenticated. The mobile application retrieves (e.g., from the device management server) and displays a list of device nodes of the local network of interconnected devices (block 1204). The mobile application receives user input identifying a selected device node (block 1206) and listens for announcements received at the access device that include the serial number of the selected device node (block 1208). If the access device does not receive an announcement transmitted from the selected device node (block 1210: N), the mobile application may continue to listen for announcements transmitted from the selected device node, e.g., until a announcement is received or until a predetermined timeout period has elapsed (e.g., about 10 seconds to about 30 seconds). Once an announcement transmitted from the selected device node is received (block 1210: Y), however, the access device pairs with the selected device node and initiates a new wireless communication session (block 1212). As noted above, the wireless connection may be established using, e.g., a short-range wireless communication standard (e.g., Bluetooth Classic) or a low-power wireless communication standard (e.g., BLE or ANT).

The access device and selected device node may secure the wireless communication session using the keys associated with the selected device node. The selected device node generates and encrypts a session identifier using a first key associated with the device node (block 1214). The selected device node transmits the encrypted session identifier to the access device (block 1216) which, in turn, decrypts the session identifier using the first key and re-encrypts the session identifier using a second key associated with the device node (block 1218). The mobile application may generate and encrypt a request using a third key associated with the selected device node (block 1220). The request may include, e.g., the serial number of the selected device node, the security token of the selected device node, the unique identifier of the access device, a request command to execute, and a timestamp. The command included in the request may be a command selected by the user at the mobile application. Example commands include commands to execute a lock or unlock operation, commands to execute an open or close operation, commands to execute an activation or actuation operation, commands to provide a current status or measurement value, commands to change a configuration parameter such as a security mode, and other types of commands that will be appreciated with the benefit of this disclosure.

The access device then transmits the encrypted session identifier and the encrypted request to the selected device node (block 1222). The selected device node decrypts the received session identifier using the second key associated with the device node (block 1224) and validates the session identifier received from the access device (block 1226). If the selected device node validates the session identifier received, the selected device node decrypts the request received from the access device using the third key associated with the identifier and (block 1228). The selected device node likewise validates the information received in the request, e.g., the serial number and security token included in the request as well as the unique identifier of the access device received in the request. If the serial number and security token received match the serial number and security token of the selected device node—and if the access device unique identifier received matches on of the access device unique identifiers stored at the selected device node—then the selected device node executes the command included in the request (block 1230). An access device and a device node may perform the respective steps depicted in FIG. 12 whenever the access device connects to the device node to transmit a command. As noted above, however, the steps of FIG. 12 are described only by way of example, and other implementations may include additional or alternative steps to discover a device node at an access device, establish a communication session between the access device and device node, and transmit a command from the access device to the device node.

Figure 13:
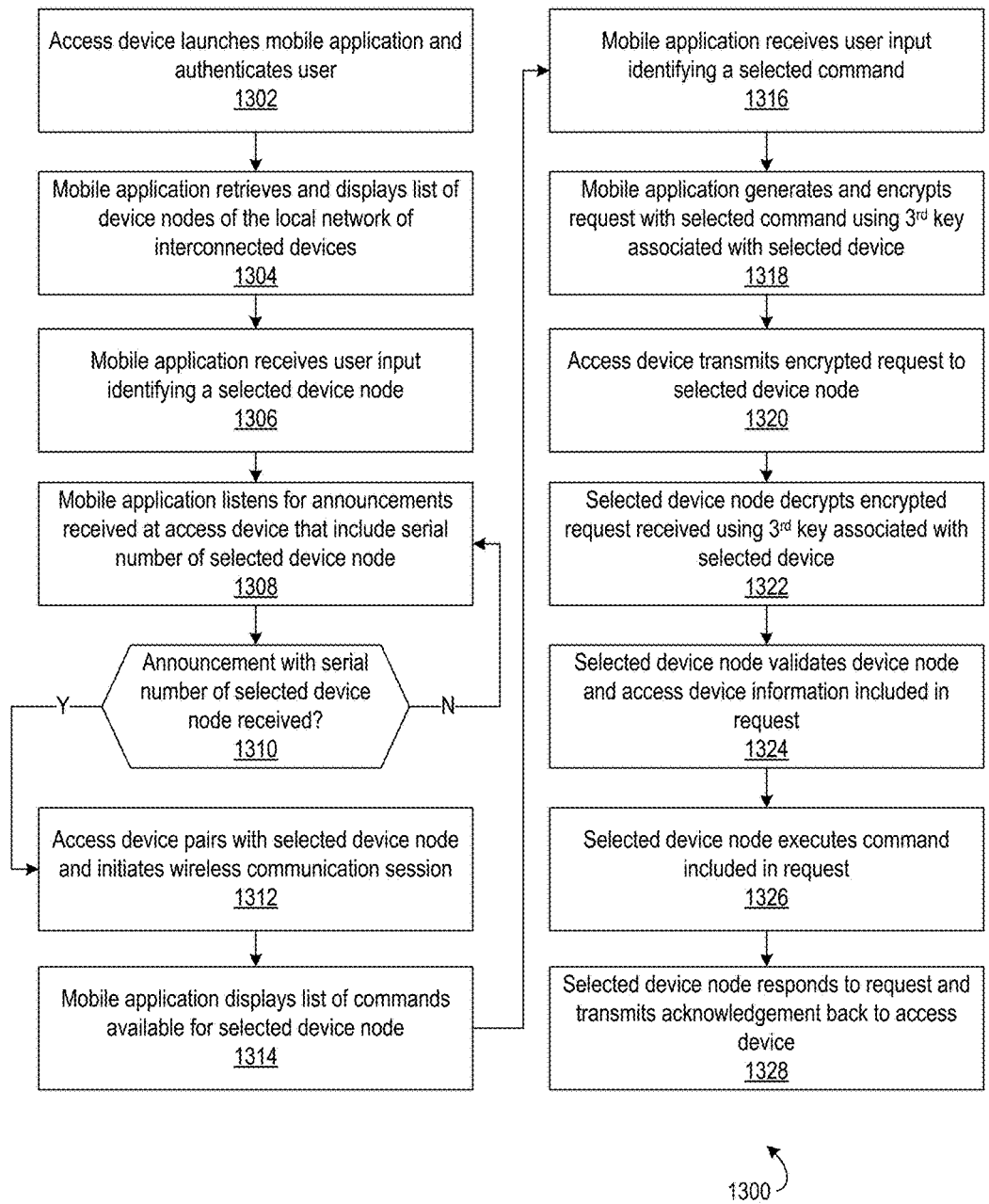
FIG. 13 depicts a flowchart of example method steps for transmitting a command to a device node from an access device in direct signal communication with the device node in accordance with aspects described herein.

In FIG. 13, a flowchart 1300 of example method steps for transmitting a command to a device node from an access device in direct signal communication with the device node is shown. An access device launches a mobile application and authenticates the user (block 1302) as described above. The mobile application retrieves (e.g., from the device management server) and displays a list of device nodes of the local network of interconnected devices (block 1304). The mobile application receives user input identifying a selected device node (block 1306) and listens for announcements received at the access device that include the serial number of the selected device node (block 1308). If the access device does not receive an announcement transmitted from the selected device node (block 1310: N), the mobile application may continue to listen for announcements transmitted from the selected device node, e.g., until an announcement is received or until a predetermined timeout period has elapsed. Once an announcement transmitted from the selected device node is received (block 1310: Y), however, the access device pairs with the selected device node and initiates a new wireless communication session (block 1312). As noted above, the wireless connection may be established using, e.g., a short-range wireless communication standard (e.g., Bluetooth Classic) or a low-power wireless communication standard (e.g., BLE or ANT). As also noted above with reference to FIG. 12, the selected device node and the access device may each respectively encrypt and decrypt a session identifier for the wireless communication session using a first and second key associated with the selected device node.

Having connected to the selected device node, the mobile application displays a list of commands for the selected device node that are available for selection by the user (block 1314). The mobile application receives user input identifying a selected command (block 1316), generates a request that includes the selected command and encrypts the request using a third key associated with the selected device node (block 1318). The request may also include information associated with the selected device node (e.g., the serial number and security token) as well as information associated with the access device (e.g., the unique identifier). The access device transmits the encrypted request to the selected device node (block 1320), and the selected device node decrypts the request received using the third key (block 1322), validates the device node and access device information included in the request (block 1324), and, if the information is valid, executes the command included in the request (block 1326). After successfully executing the command, the selected device node sends back to the access device a response acknowledging the selected device node successfully executed the command (block 1328). In the event that the selected device node could not execute the command, the response sent to the access device may indicate the command was not executed. The response may also provide a message indicating the reason the command was not executed.

Figure 14:
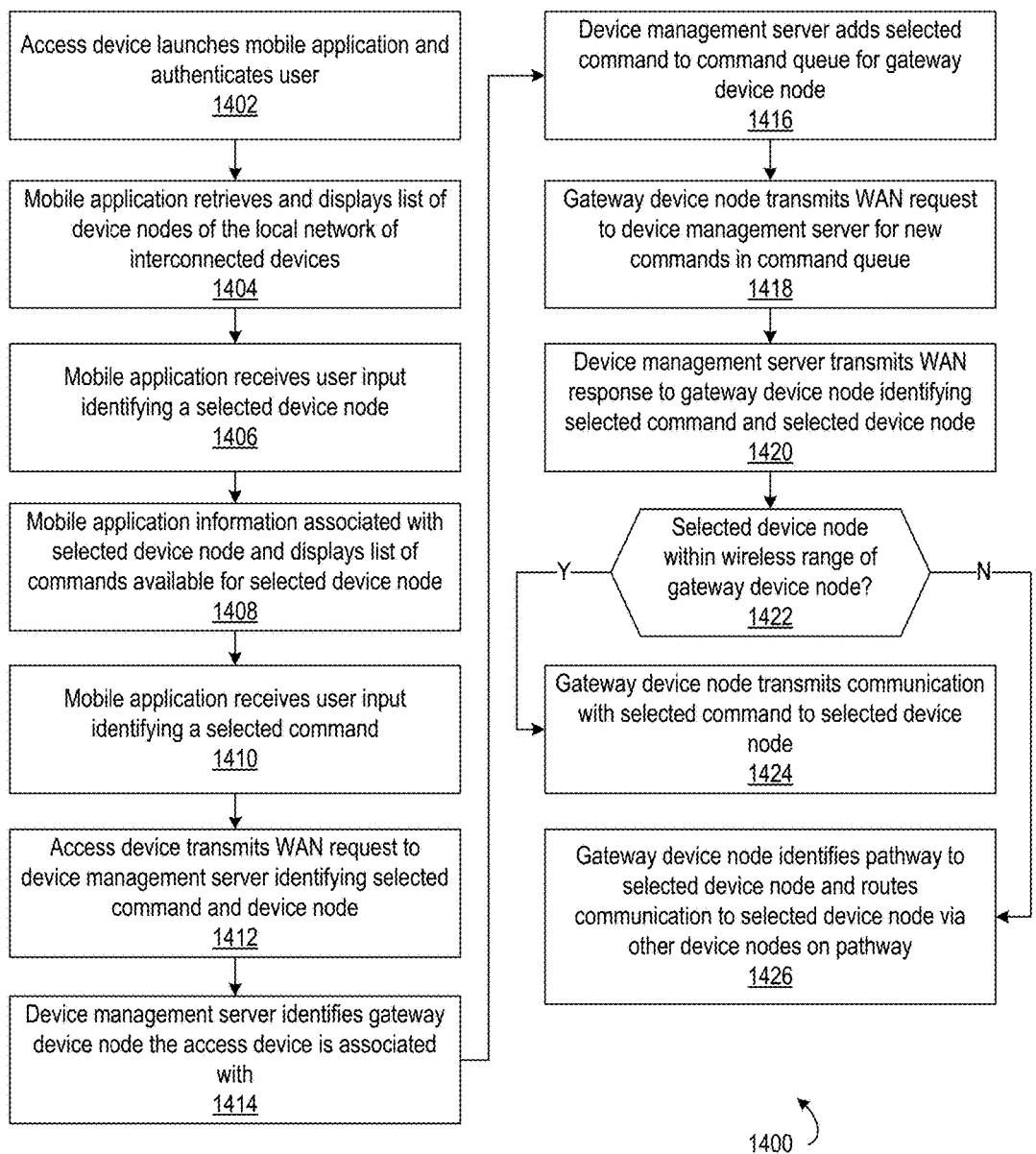
FIG. 14 depicts a flowchart of example method steps for transmitting a command to a device node from an access device located remotely relative to the device node in accordance with aspects described herein.

In FIG. 14, a flowchart 1400 of example method steps for transmitting a command to a device node from an access device located remotely relative to the device node is shown. An access device launches a mobile application (block 1402) then retrieves and displays a list of the device nodes in the local network of interconnected devices (block 1404). The device management server may authenticate the mobile application based on access credentials received at the mobile application (e.g., a username and password) and compared to access credentials stored for the corresponding user account. The list of device nodes may thus be the device nodes associated with that user account. The mobile application displays the list of device nodes and receives user input identifying a selected device node (block 1406). Upon selection of a device node, the mobile application displays information associated with the selected device node (e.g., device name, device serial number, device type) as well as the commands available to send to the device (block 1408). The mobile application receives user input identifying a selected command to send to the selected device node (block 910).

Since the access device is not in direct signal communication with the selected device node or indirect communication with the selected device node via another device node, the access device transmits the selected command to the selected device node via the device management server. The access device transmits to the device management server a WAN request (e.g., an HTTP request) identifying the selected device node and the selected command (block 1412). The access device may transmit the WAN request using, e.g., a WLAN interface or a cellular network interface as described above. Upon receipt of the WAN request, the device management server identifies the gateway device node the access device is associated with (block 1414) and adds the selected command to the command queue for that gateway device node (block 1416). The gateway device node then transmits a WAN request to the device management server (e.g., via a wired LAN interface) to retrieve any new commands that have been added to the command queue for the gateway device node (block 1418). Upon receipt of the WAN request from the gateway device node, the device management server to the gateway device node a WAN response that identifies the selected device node and the selected command (block 1420). The gateway device node may thus periodically submit requests (e.g., every 100-500 ms) to the device management server for any new commands added to the command queue. In other implementations, the device management server may additionally or alternatively push new commands to the gateway device node.

If the selected device node is within the wireless range of the gateway device node (block 1422: Y), then the gateway device node transmits to the selected device node a communication identifying the selected command (block 1424). If, however, the selected device node is not within wireless range of the gateway device node (block 1422: N), the gateway device node identifies a pathway to the selected device node via one or more other device nodes of the network and routes the communication to the selected device node via that pathway (block 1426). As noted above, the gateway device node may transmit the communication to the selected device node using a short-range wireless communication standard (e.g., Bluetooth Classic) or a low-power wireless communication standard (e.g., BLE or ANT). Upon receipt of the communication, the selected device node may transmit an acknowledgement back to the access device via the gateway device node and device management server.

Figure 15:
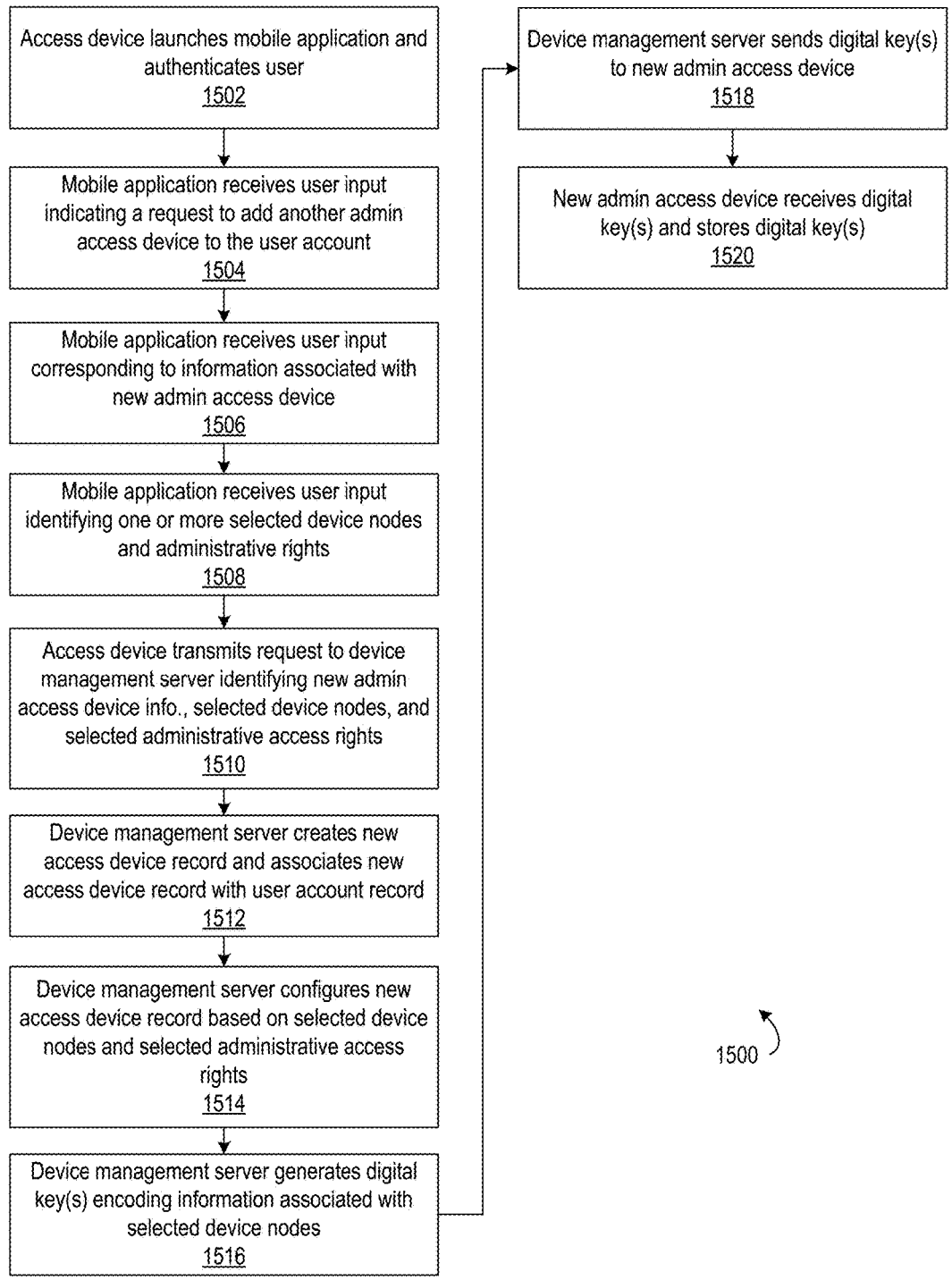
FIG. 15 depicts a flowchart of example method steps for registering an additional access device having administrative rights with a device management server in accordance with aspects described herein.

In FIG. 15, a flowchart 1500 of example method steps for registering an additional access device having administrative rights with a device management server is shown. An access device launches a mobile application and authenticates the user (block 1502) as described above. The mobile application receives user input indicating a request to add another access device having administrative rights to the user account associated with the user (block 1504). The mobile application receives user input associated with the new access device (block 1506), e.g., an email address or phone number associated with the new access device. The mobile application also receives user input identifying one or more selected device nodes as well as one or more selected administrative rights for the new access device (block 1508). In this way, the user may add a new access device that is authorized to access all device nodes of the local network of interconnected device or a subset of those device nodes. The user may also provide the new access device with all administrative rights or a subset of those administrative rights.

Having received the necessary input to add the new access device, the access device transmits to the device management server a request that includes the new access device information as well as information identifying the selected device nodes and the selected administrative rights (block 1510). The information identifying the selected device nodes may include the serial numbers and security tokens of the selected device nodes. In response to receipt of the request, the device management server creates a new access device record in its database of access device records and associates the new access device record with the user account record corresponding to the user (block 1512). The device management server configures the new access device record based on the selected device nodes and the selected access rights (block 1514). Such configuration may include associating the new access device record with the device node records respectively corresponding to the selected device nodes and indicating the operations the new access device is authorized to perform with respect to the selected device nodes. The device management server also generates, for each selected device node, a digital key that encodes information associated with the selected device node (block 1516). The device management server then sends the digital keys generated to the new access device (block 1518), e.g., via email or text message. Upon receipt of the digital keys, the new access device may store them in memory (block 1520). The new access device subsequently utilizes those digital keys when communicating with the selected device nodes.

The steps of FIG. 15 may be employed to configure a keyfob as an access device. When configuring a keyfob as an access device, an access device having a mobile application may be employed. The access device may pair with the keyfob to obtain the unique identifier associated with the keyfob (e.g., the keyfob serial number). The access device may include the unique identifier of the keyfob in the request submitted to the device management server to add the new access device. The device management server may provide the access device with the keys associated with the selected device node, and the access device may pair with the selected device node to provide the selected device node with the unique identifier associated with the keyfob. The selected device node may store the unique identifier associated with the keyfob and transmit an acknowledgement to the access device. Upon receipt of the acknowledgement from the selected device node, the access device may transmit to the keyfob the keys associated with the selected device node. The keyfob may store the keys received in memory and utilize the keys to encrypt the session identifier and content of subsequent communications exchanged with the selected device node as also described above.

Figure 16:
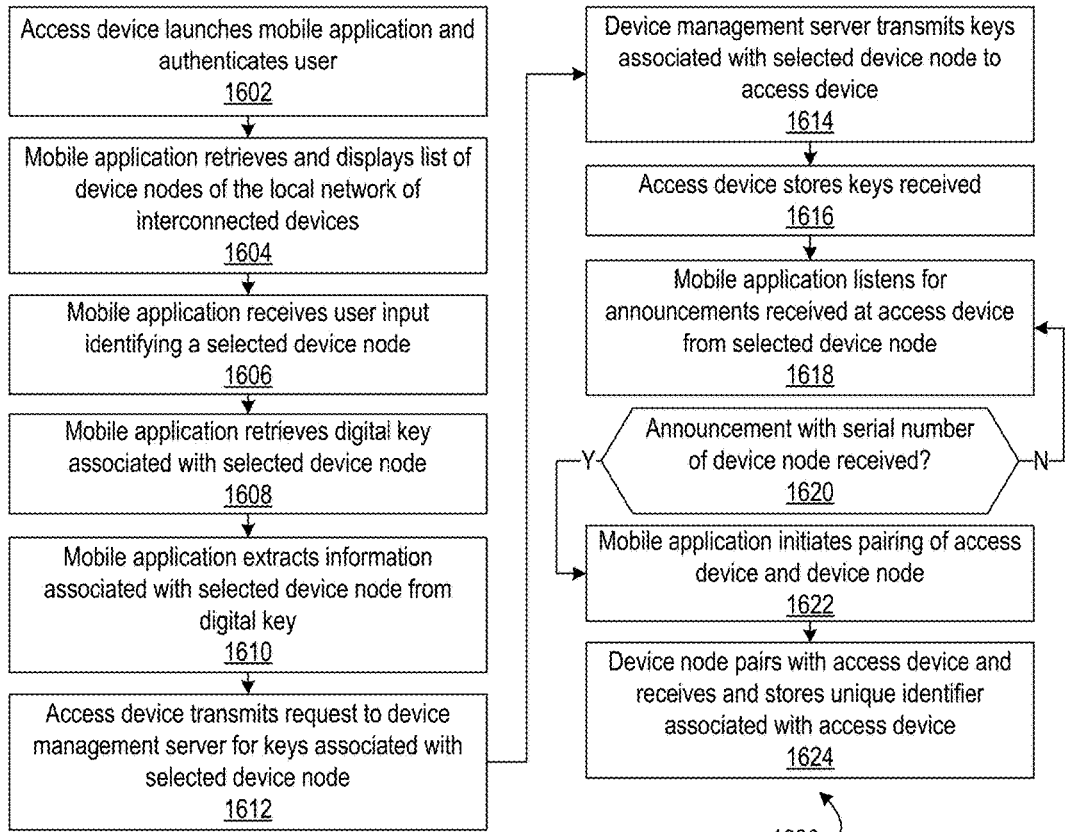
FIG. 16 depicts a flowchart of example method steps for establishing a connection between an additional access device having administrative rights and a device node in accordance with aspects described herein.

In FIG. 16, a flowchart 1600 of example method steps for establishing a connection between an additional access device having administrative rights and a device node is shown. An access device launches a mobile application and authenticates the user (block 1602) as described above. The mobile application queries the device management server for a list of the device nodes in the local network of interconnected devices and displays the list of device nodes (block 1604). The mobile application receives user input identifying a selected device node (block 1606). Upon selection of a device node, the mobile application retrieves the digital key associated with the selected device node (block 1608) which was provided to the access device during a registration procedure as described above by way of example with reference to FIG. 15.

The mobile application extracts the information associated with the selected device node that is encoded in the digital key (block 1610), e.g., the serial number, security token, device type, default security level, and administrative access rights assigned. The access device then transmits to the device management server a request for the keys associated with the selected device node (block 1612). The request may include at least a portion of the information associated with the selected device node that the mobile application extracts from the digital key, e.g., the serial number and the security token. The request may also include access credentials the device management server uses to authenticate the mobile application as well as a unique identifier associated with the access device, e.g., a MAC address or UUID. In response to receipt of the request, the device management server transmits the keys associated with the selected device node to the access device (block 1614), and the access device stores in memory the keys received (block 1616).

Having received the keys associated with the selected device node, the mobile application listens for announcements received at the access device from the selected device node (block 1618). As described above, the mobile application may identify announcements transmitted from the selected device node based on the serial number of the selected device node included in the announcements. If the access device does not receive a announcement transmitted from the selected device node (block 1620: N), then the mobile application may continue to listen, for example, for a predetermine time period (e.g., 30 seconds). When the access device does receive a announcement transmitted from the selected device node (block 1620: Y), the mobile application initiates a pairing procedure to pair the access device with the selected device node (block 1622). During the pairing procedure, the access device may provide the device node with its unique identifier, and the device node may store that unique identifier (block 1624). In this way, the access device and the device node may be bonded such that the access device and device node may subsequently pair automatically when within their respective wireless ranges.

Figure 17:
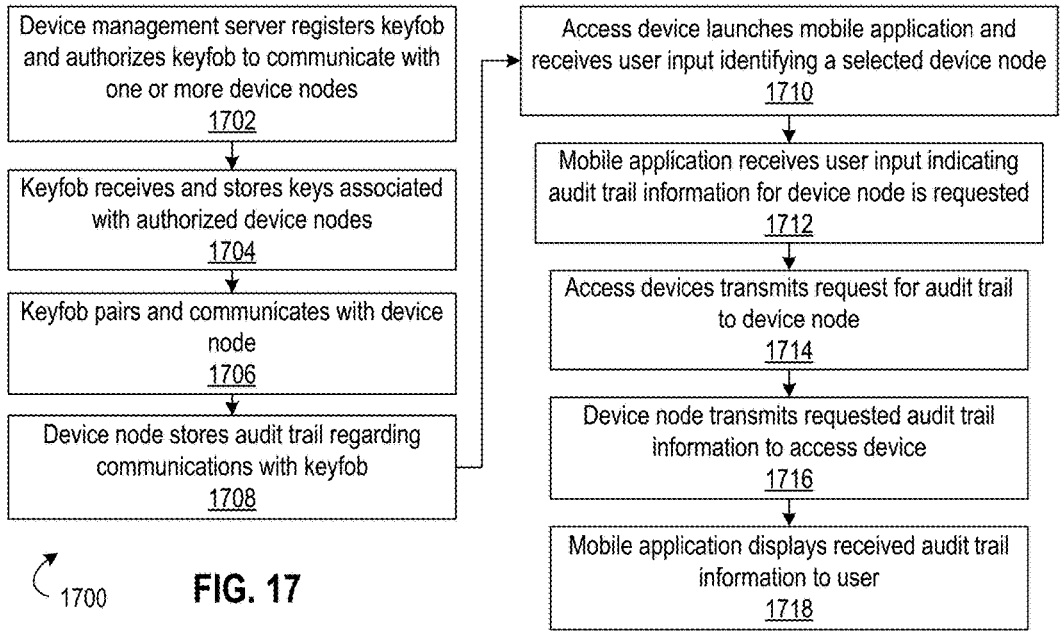
FIG. 17 depicts a flowchart of example method steps for configuring and using a keyfob as an access device in accordance with aspects described herein.

In FIG. 17, a flowchart 1700 of example method steps for configuring and using a keyfob as an access device is shown. A user may add a keyfob as an additional access device as described above with reference to FIG. 15. During that process, a device management server registers the keyfob as an authorized access device and authorizes the keyfob to communicate with one or more device nodes of a local network of interconnected devices (block 1702). The keyfob also receives from the device management server keys associated with one or more authorized device nodes and stores those keys in memory (block 1704). Having obtained the keys for a device node, the keyfob may subsequently pair and wirelessly communicate with that device node (block 1706). As one example, a user may add a keyfob as an access device for a lock-type device node. That keyfob may thus store the keys associated with the lock-type device node and subsequently communicate with that lock-type device node using a short-range wireless communication standard (e.g., Bluetooth Classic) or a low-power wireless communication standard (e.g., BLE or ANT). The keyfob may utilize the keys to secure the communications exchanged with the lock-type device node as described above, e.g., using the keys to encrypt the session identifier of the communication session and the content of the communications.

In some example implementations the device node stores an audit trail regarding the communications exchanged with the keyfob (block 1708). The audit trail may include information indicating the date and time of the communications as well as the commands transmitted to the device node from the keyfob. A user may be able to access the audit trail for the device node from, e.g., another access device. An access device launches a mobile application and receives user input identifying a selected device node (block 1710). The mobile application then receives user input indicating that the user requests the audit trail for the selected device node (block 1712). The access device transmits a request for the audit trail to the device node (block 1714), and the device node transmits the requested audit trail to the access device in response (block 1716). The mobile application may then display the audit trail received from the device node to the user (block 1718).

The device node may store the audit trail permanently or temporarily. The device node may also upload the audit trail to the device management server (e.g., via a gateway device node or via the access portal) for storage. Accordingly an access device may request and receive the audit trail for a selected device node directly from the device node (e.g., when the access device is within the wireless range of the selected device node), indirectly from another device node of the network (e.g., when the access device is outside the wireless range of the selected device node but within the wireless range of another device node), or via the device management server (e.g., when the access device is located remotely relative to the selected device node). The user may also obtain the audit trail for a selected device node at an interface provided by the device management server via the access portal.

Figure 18:
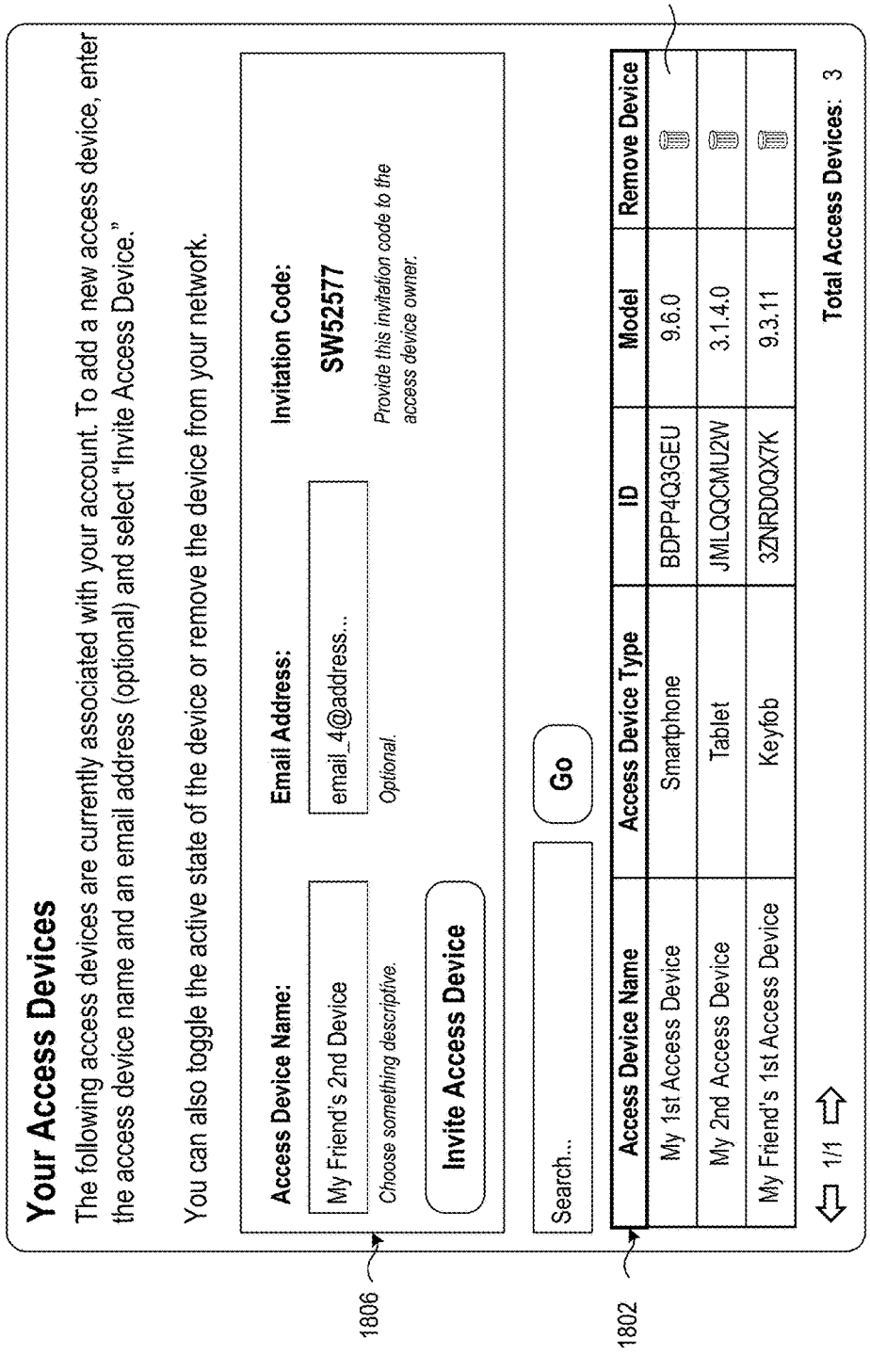
FIG. 18 depicts an example of an implementation of an interface listing the access devices registered with the user account associated with a local network of interconnected devices in accordance with aspects described herein.

In FIG. 18, an example of an implementation of an interface 1800 listing the access devices registered with the user account associated with a local network of interconnected devices is shown. A user may likewise access the interface 1800 via the access portal of the device management server as described above. The interface 1800 presents to the user information regarding the access devices that are associated with the user account for the local network of interconnected devices and thus authorized to access one or more of the device nodes of the network. As seen in FIG. 18, the interface 1800, in this example, includes a list 1802 of the access devices associated with the user account. The list 1802 indicates, for each access device, the descriptive name given to the access device when the user first registered the access device with the user account, the access device type of the access device, the unique identifier for the access device, the model number of the access device. The list 1802 may also indicate, for each access device, the device nodes of the network that the access device is authorized to communicate with (e.g., all of the device nodes or one or more particular device nodes).

The list 1802 of access devices also includes, for each access device, a user input element 1804 for removing the access device from the set of access devices authorized to access the device nodes of the network. A user may remove an access device with respect to all device nodes of a local network of interconnected devices or individual devices nodes. Upon receiving a selection of an access device to remove via, e.g., the interface 1800, the device management server may transmit to one or more device nodes (e.g., via a gateway device node) a communication indicating the unique identifier of the selected access device along with a command to delete that unique identifier from memory. The device management server may also delete the record of the access device from its database of access device records. The user may also remove an access device via the mobile application residing at an access device having administrative rights. Using the mobile application, the user may select an access device to remove and transmit to the device management server and/or a device node, the unique identifier of the selected access device to remove. In response, the device management server and the device node may delete the access device record from their respective databases of access device records. Since the device node no longer stores the unique identifier associated with the removed access device, authentication of the access device at the device node would thus fail if that access device attempted to communicate with the device node subsequent to removal.

The interface 1800, in this example, also includes a section 1806 at which the user may invite additional access devices to access one or more device nodes of the local network of interconnected devices. As seen in FIG. 18, the section 1806 includes input elements that receive a descriptive name for the invited access device and contact information associated with the invited access device (e.g., an email address, a phone number, and the like). The device management server is configured to generate an invitation code for the invited access device and send the invitation code using the contact information associated with the access device. The device management server may also send the invitation code to one or more of the device nodes of the local network of interconnected devices, and those device nodes may store the invitation code in memory. As described in further detail below, an invited access device utilizes the invitation code when communicating with a device node of a local network of interconnected devices, and the device node authenticates the invited access device based, at least in part, on the invitation code. In addition, the mobile application residing at an access device may additionally or alternatively be configured to enable a user to invite another access device to access the local network of interconnected devices. The mobile application may thus provide at the access device an interface similar to that shown in FIG. 18 and submit invitation requests to the device management server based on invitation information received from the user at the mobile application.

Figure 19:
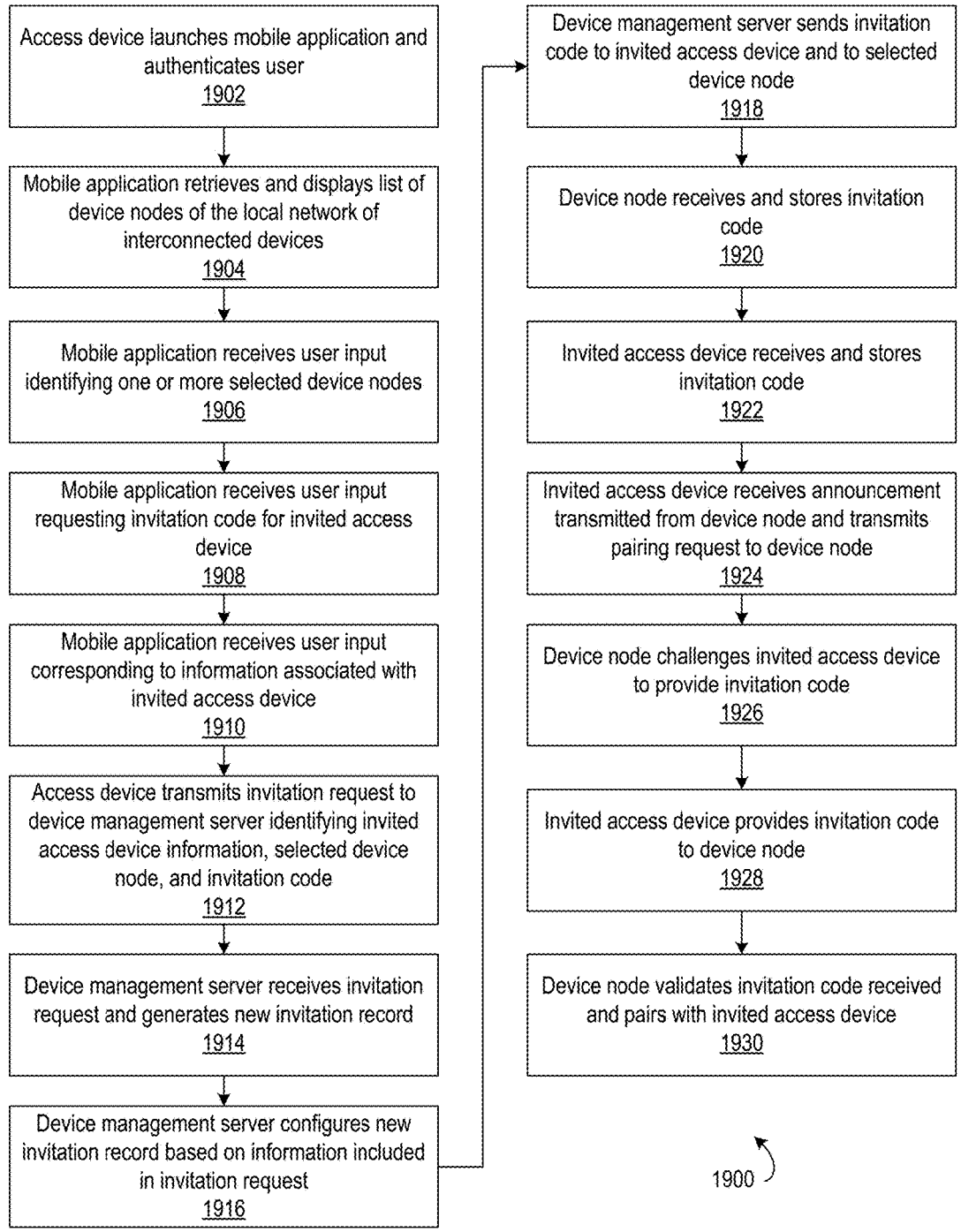
FIG. 19 depicts a flowchart of example method steps for inviting an access device to access a device node of a local network of interconnected devices in accordance with aspects described herein.

In FIG. 19, a flowchart 1900 of example method steps for inviting an access device to access a device node of a local network of interconnected devices is shown. An access device launches a mobile application and authenticates the user (block 1902) as described above. The mobile application then retrieves and displays a list of the device nodes of the local network of interconnected devices associated with the user account of the user (block 1904). The mobile application receives user input identifying one or more selected device nodes (block 1906) as well as user input requesting an invitation code for an invited access device (block 1908). In addition, the mobile application receives user input corresponding to information associated with the invited access device (block 1910), e.g., an email address or phone number. The access device then transmits to the device management server an invitation request identifying the one or more selected device nodes, the information associated with the invited access device, and an invitation code generated by the mobile application for the invited access device (block 1912). In other implementations, the device management server may generate the invitation code itself in response to receipt of the invitation request from the access device.

Upon receipt of the invitation request, the device management server generates a new invitation record (block 1914) and configures the new invitation record based on the information included in the invitation request (block 1916).

Configuring the new invitation record may include, e.g., associating the invitation record with the user account of the user, associating the invitation record with the device node records corresponding to the one or more selected device nodes, and storing in the invitation record the information associated with the invited access device and the invitation code generated for the invited access device. As noted above, the device management server may also transmit the invitation code generated to the invited access device (e.g., via email or text message) and to each of the one or more selected device nodes (block 1918). Upon receiving the invitation code from the device management server, a selected device node stores the invitation code in memory (block 1920). The invited access device also stores the invited access code in memory upon receipt (block 1922). Having received the invitation code, the invited access device may be configured to subsequently pair and communicate with the one or more selected device nodes.

The invited access device listens for and receives announcements transmitted from one of the selected device nodes and transmits to the device node a pairing request in response (block 1924). Upon receiving the pairing request from the invited access device, the device node challenges the invited access device to provide the invitation code (block 1926) which the invited access device transmits to the device node in response (block 1928). The invited access device may also include with the invitation code in the communication transmitted to the device node the serial number and security token of the device node as described above. The device node validates the invitation code received and, if valid, pairs with the invited access device (block 1930). The invited access device may also obtain (e.g., from the device management server or the device node) the keys associated with the device node and utilize those keys to encrypt the session identifier of a communication session established with the device node as well as the content of those communications as described above.

In FIG. 20, an example of an implementation of an interface 2000 listing the pending invitations sent from a user account associated with a local network of interconnected devices is shown. As seen in FIG. 20, the interface 2000, in this example, include a list 2002 of the invitations the user has generated for invited access devices. The list 2002 of invitations includes the name of the user associated with the invited access device, contact information associated with the invited access device (e.g., an email address), the invitation code generated for the invitation, and input elements 2004 and 2006 for respectively sending the invitation code to the invited access device or cancelling the invitation to the invited access device. In some example implementations, the list of invitations may also identify the device nodes the invited access device is authorized to communicate with. Upon receiving input to cancel an invitation, the device management server may transmit commands to the device nodes associated with the invitation to delete the invitation code generated for that invitation.

User-Selectable Security Modes

As noted above, a user may be able to select the security mode an access device and device node utilize to secure the communications exchanged. Different security modes may be associated with different response times. Accordingly the user may select a security mode based on whether faster response times or more secure communications are more important.

Figure 21:
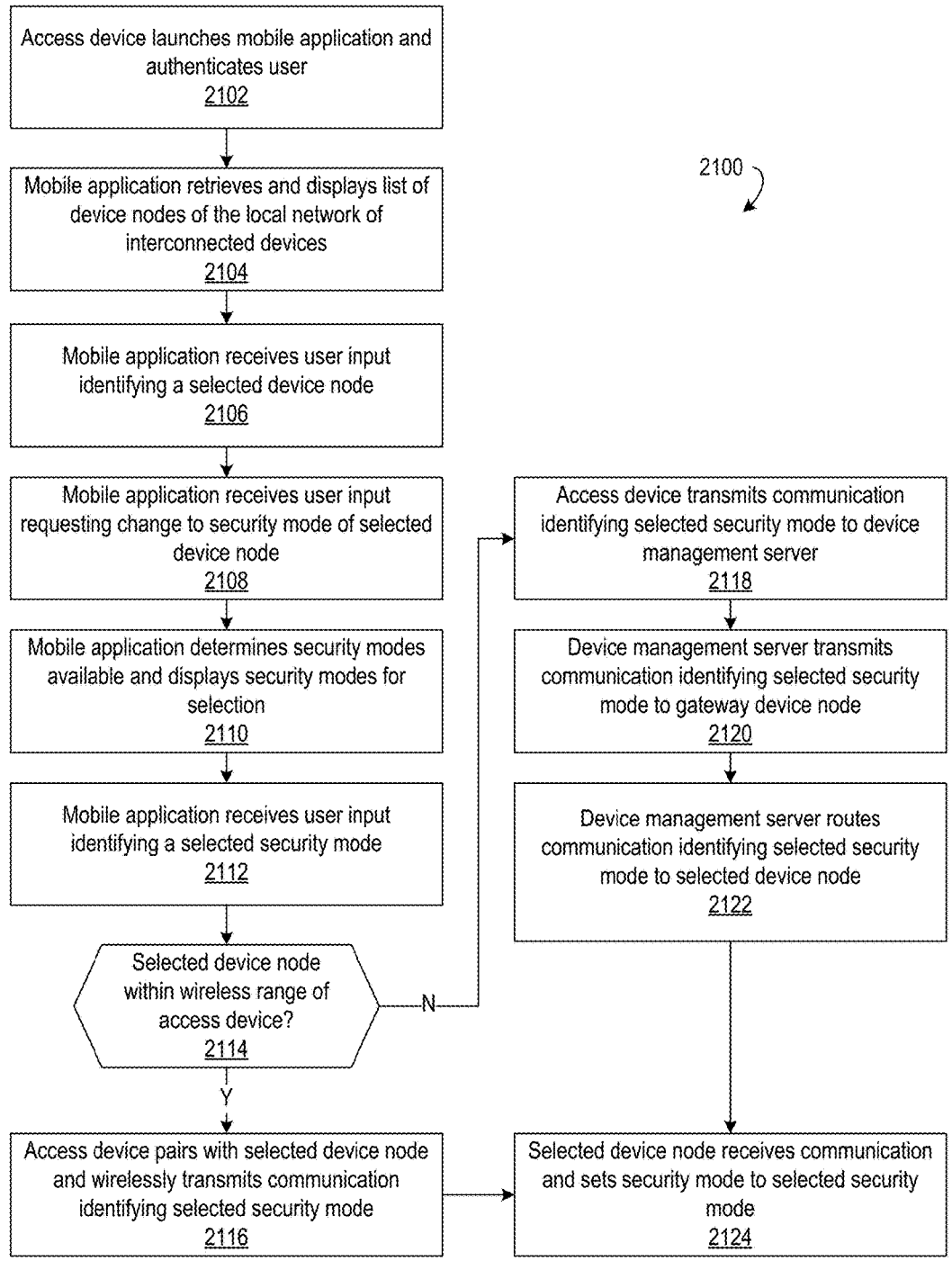
FIG. 21 depicts a flowchart of example method steps for setting a user-selected security mode at a device node in accordance with aspects described herein.

In FIG. 21, a flowchart 2100 of example method steps for setting a user-selected security mode at a device node is shown. An access device launches a mobile application and authenticates the user (block 2102) as described above. The mobile application then retrieves and displays a list of the device nodes of the local network of interconnected devices associated with the user account of the user (block 2104). The mobile application receives user input identifying one or more selected device nodes (block 2106) as well as user input requesting to change the security mode of the selected device node (block 2108). The mobile application determines the security modes available at the selected device node (e.g., based on the device node type) and displays those security modes to the user (block 2110). The mobile application receives user input identifying a selected security mode (block 2112).

If the access device is within wireless range of the selected device node (block 2114: Y), then the access device pairs with and wirelessly transmits to the selected device node a communication identifying the selected security mode (block 2116). As described above, however, the access device may alternatively transmit the communication via another device node within wireless range of the access device. If the access device is not within wireless range of the selected access device (block 2114: N), then the access device transmits to the device management server the communication identifying the selected security mode (block 2118). The device management server, in turn, transmits the communication identifying the selected security mode to the gateway device node (block 2120) which routes the communication to the selected device node (block 2122) either directly or indirectly via one or more other device nodes of the network. The device management server may also update the device node record corresponding to the selected device node to identify the selected security mode. Upon receipt of the communication identifying the selected security mode (block 2124), the selected device node sets its security mode to the user-selected security mode. The user may also set the security mode of a device node at an interface provided by the access portal of the device management server. Rather than routing the communication to the selected device node through the device management server, the access device may transmit the communication to another one of the device nodes of the network, and that other device node may route the communication to the selected device node.

In some example implementations, the security logic of the device nodes of a local network of interconnected devices may include sets of instructions corresponding to five different security modes. These example security modes are respectively referred to herein as a zero-level security mode, a first-level security mode, a second-level security mode, a third-level security mode, and a fourth-level security mode. These example security modes may be progressively more secure from the zero-level security mode to the fourth-level security mode. In other words, the first-level security mode may be relatively more secure than the zero-level security mode, the second-level security mode may be relatively more secure than the first-level security mode, and so forth. The relative degree of security provided by each of the security modes depends on the particular security features those security modes are configured to employ. Examples of various security features the security modes may be configured to employ include: whether or not an access device needs to use a security token and/or invitation code to communicate with a device node, whether or not a session identifier of the communication session is encrypted, whether or not the content (i.e., the payload) of the communications is encrypted, the particular encryption techniques employed, whether or not the access device bonds with the device node, and whether the wireless range of the device node is reduced when communicating with the access device. Additional and alternative security features will be appreciated with the benefit of this disclosure and may be selectively employed.

The example security modes identified above may be configured to employ none, some, or all of the example security features also identified above. The zero-level security mode, in this example, is configured such that no security features are employed to secure the communications exchanged between an access device and a device node. Device nodes configured to employ the zero-level security mode simply establish a connection (e.g., a BLE connection) without authentication (e.g., using the serial number and security token associated with the device node) and exchange unencrypted communications. The security features of the first-level security mode, in this example, include authentication of the serial number and security token associated with the device node and encryption of the content of the communications exchanged between the access device and the device node. When the device node is configured to employ the first-level security mode, the device node, in this example, does not execute a bonding procedure with the access device. The security features of the second-level security mode, in this example, include authentication of the serial number and security token associated with the device node, encryption of the content of the communications exchanged between the access device and the device node, and execution of a bonding procedure between the access device and the device node. The security features of the third-level security mode, in this example, include reduction of the wireless range of the device node (e.g., using a power controller), authentication of the serial number and security token associated with the device node, encryption of the content of the communications exchanged between the access device and the device node, and execution of a bonding procedure between the access device and device node. The security features of the fourth-level security mode, in this example, include authentication of the serial number and security token associated with the device node, encryption of the session identifier using keys associated with the device node, encryption of the content of the communications exchanged between the access device and the device node, and execution of a bonding procedure between the access device and device node. The various security modes, in this example, may be configured to employ a relatively more or less complex encryption techniques to encrypt the content of the communications exchanged between the access device and the device node. As an example, the fourth-level security mode may be configured to employ a relatively more complex encryption technique than the first-, second-, and third-level security modes. Examples of encryption techniques that may be selectively employed include those that employ the Data Encryption Standard (DES), Triple DES, Advanced Encryption Standard (AES), block cipher modes of operation including the Electronic Codebook (ECB), Cipher Block Chaining (CBC), Propagating CBC, Cipher Feedback (CFB), Output Feedback (OFB), and Counter modes of operation.

In view of the various security features the security modes may selectively employ, the security modes of the device nodes may be exhibit different response times with respect to, e.g., establishing a connection and responding to a command received. In particular, the security modes employing relatively more security features and/or relatively more complex security features (e.g., relatively more complex encryption techniques) may be associated with a relatively longer response time as compared to the security modes employing relatively fewer security features and/or relatively less complex security features (e.g., relatively less complex encryption techniques). In this regard, the zero-level security mode may be associated with a relatively shorter response time as compared to the response time of the first-level security mode, the first-level security mode may be associated with a relatively shorter response time as compared to the response time of the second-level security mode, and so forth. In other words, the respective response times of the security modes, in this example, may get progressively longer between the zero-level security mode and the fourth-level security mode with the zero-level security mode being associated with the relatively shortest response time and the fourth-level security mode associated with the relatively longest response time. Accordingly there may be a trade-off between the strength of the security provided by the security modes versus response time due to the respective response time respectively associated with those security modes. Although the response times associated with the device nodes may appear to be particularly short (e.g., on the scale of milliseconds), the difference between, e.g., a 500 ms response time (i.e., half a second) and a 100 ms response time (i.e., one-tenth of a second) can be enough to affect the user experience when communicating with a device node via an access device, especially when aggregating those response times across multiple communications that may be exchanged between the devices. Enabling a user to select a desired security mode advantageously allows the user to configure the device node to choose between a faster response time and a more robust security mode and thus advantageously improves the user experience by conforming to the preferences of the user. As noted above and discussed in further detail below, however, the security modes available for selection may depend on the device node type of a device node.

In FIGS. 22A-B, examples of implementations of respective interfaces for receiving user selection of a security mode for a device node is shown. In FIG. 22A, an example of an interface 2200 for setting the security mode of a gateway device node is shown. As seen in FIG. 22A, the interface 2200, in this example, includes a section 2202 that includes information associated with the gateway device node, e.g., the device name, the device node type, the device node serial number, and the currently selected security level for the device. The interface 2200 also includes a list 2204 of security modes available for selection. As noted above, the security modes available for selection may depend on the device node type of the device node. For the gateway device node, in this example, the available security modes available for selection are limited to the second-level, third-level, and fourth-level security modes. As also noted above, higher level security modes may respectively implement relatively more security features thus providing relatively more security. Since a gateway device node may be associated with relatively more risk with respect to the cost and consequences of unauthorized access, the security modes available for a gateway device node may be limited to those security modes that provide relatively more security.

In contrast to FIG. 22A, an example of an implementation of an interface 2250 for setting the security mode of a sensor-type device node is shown in FIG. 22B. The interface 2250, in this example, likewise includes a section 2252 that includes information associated with the sensor-type device node as well as a list 2254 of the security modes available for the sensor-type device node. For the sensor-type device node, in this example, the available security modes available for selection include the zero-level and first-level security mode. Since a sensor-type device node may be associated with relatively lower risk with respect to the cost and consequences of unauthorized access, the security modes available for a sensor-type device node may include those security modes that provide relatively less security. It will be appreciated, however, that various implementations of the local network of interconnected devices and its corresponding device nodes may be configured such that any combination of security modes may be selectively made available for selection according to the preferences and/or constraints of those implementations. As an example, all security modes may be available for gateway device nodes, activation-type device nodes, and/or sensor-type device nodes in some example implementations. In addition, the example interfaces 2200 and 2250 may be provided by a mobile application at an access device and/or by the device management server via the access portal.

Figure 23C:
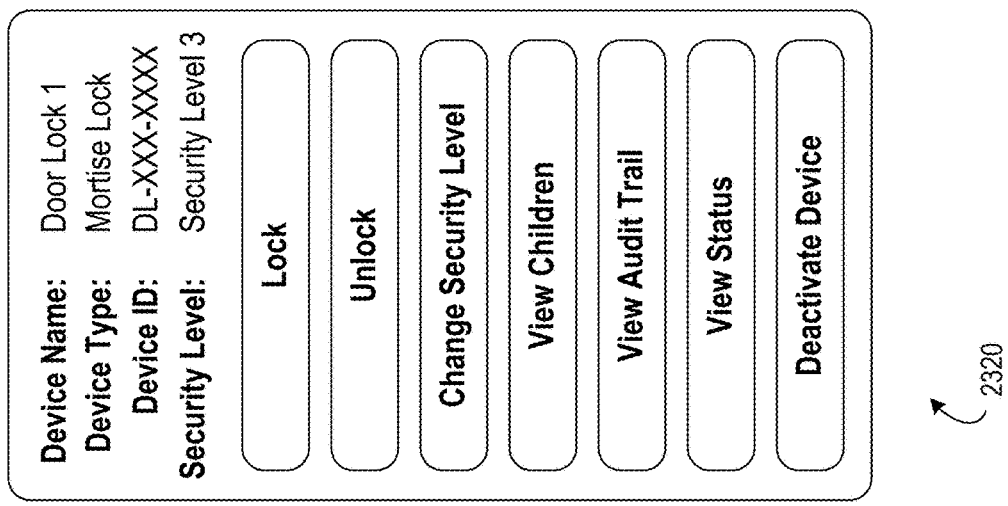
FIG. 23C depicts an example of an implementation of an interface for managing a device node of a local network of interconnected devices in accordance with aspects described herein.
Figure 23B:
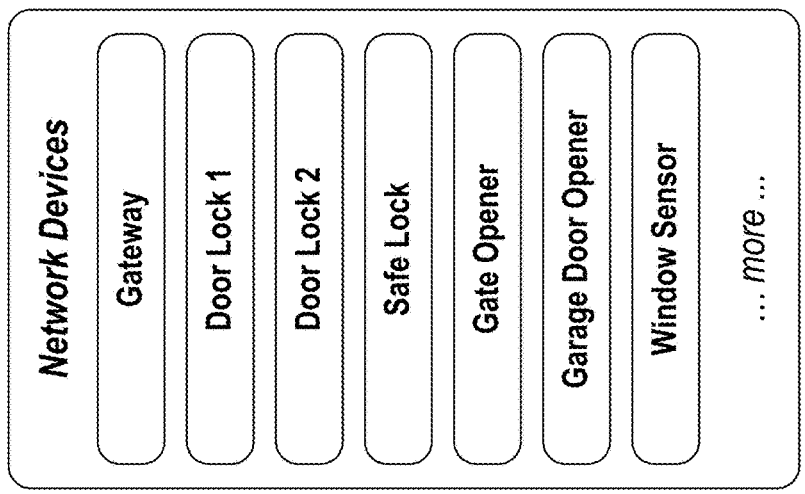
FIG. 23B depicts an example of an implementation of an interface for managing individual device nodes of a local network of interconnected devices in accordance with aspects described herein.
Figure 23A:
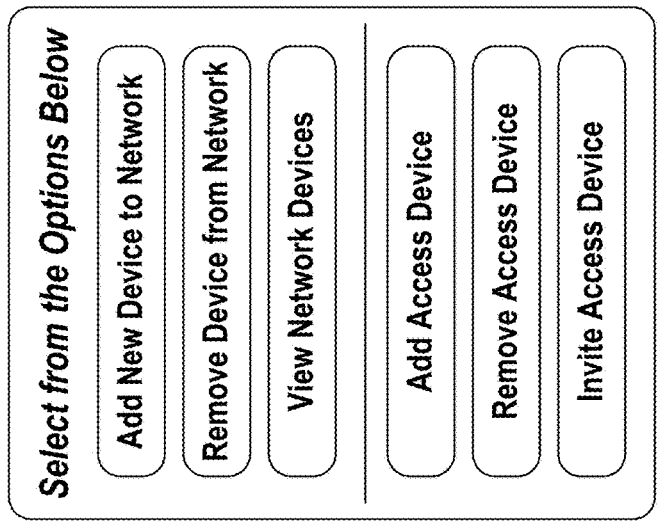
FIG. 23A depicts an example of an implementation of an interface for managing a local network of interconnected devices in accordance with aspects described herein.

Referring now to FIGS. 23A-C, example interfaces for managing a local network of interconnected devices and its corresponding device nodes is shown. In FIG. 23A, an example of an implementation of an interface 2300 for managing a local network of interconnected devices is shown. As seen in FIG. 23A, the interface 2300, in this example, includes selectable input elements for, e.g., adding a new device node to the network, removing an existing device node from the network, and viewing the device nodes of the network. As also seen in FIG. 23A, the interface 2300 includes selectable input elements for, e.g., adding a new access device, removing an existing access device, and inviting an access device. In FIG. 23B, an example of an implementation of an interface 2310 for managing individual device nodes of a local network of interconnected devices is shown. As seen in FIG. 23B, the interface 2310, in this example, includes a list of the device nodes of the network. The list includes selectable input elements for viewing information associated with a device node as well as commands that may be transmitted to the device node. In FIG. 23C, an example of an implementation of an interface 2320 for managing a selected device node of a local network of interconnected devices is shown. As seen in FIG. 23C, the interface 2320, in this example, includes information associated with the selected device nodes (e.g., device name, device type, device serial number, and current security level) as well as selectable input elements respectively corresponding to commands that may be transmitted to the selected device node (e.g., lock/unlock, change security level, view audit trail, view status, and activate/deactivate the device) as well as input elements for viewing the child device nodes currently connected to the selected device node. The interfaces depicted in FIGS. 23A-C may likewise be presented by a mobile application residing at an access device or by the access portal of the device management server.

Figure 24:
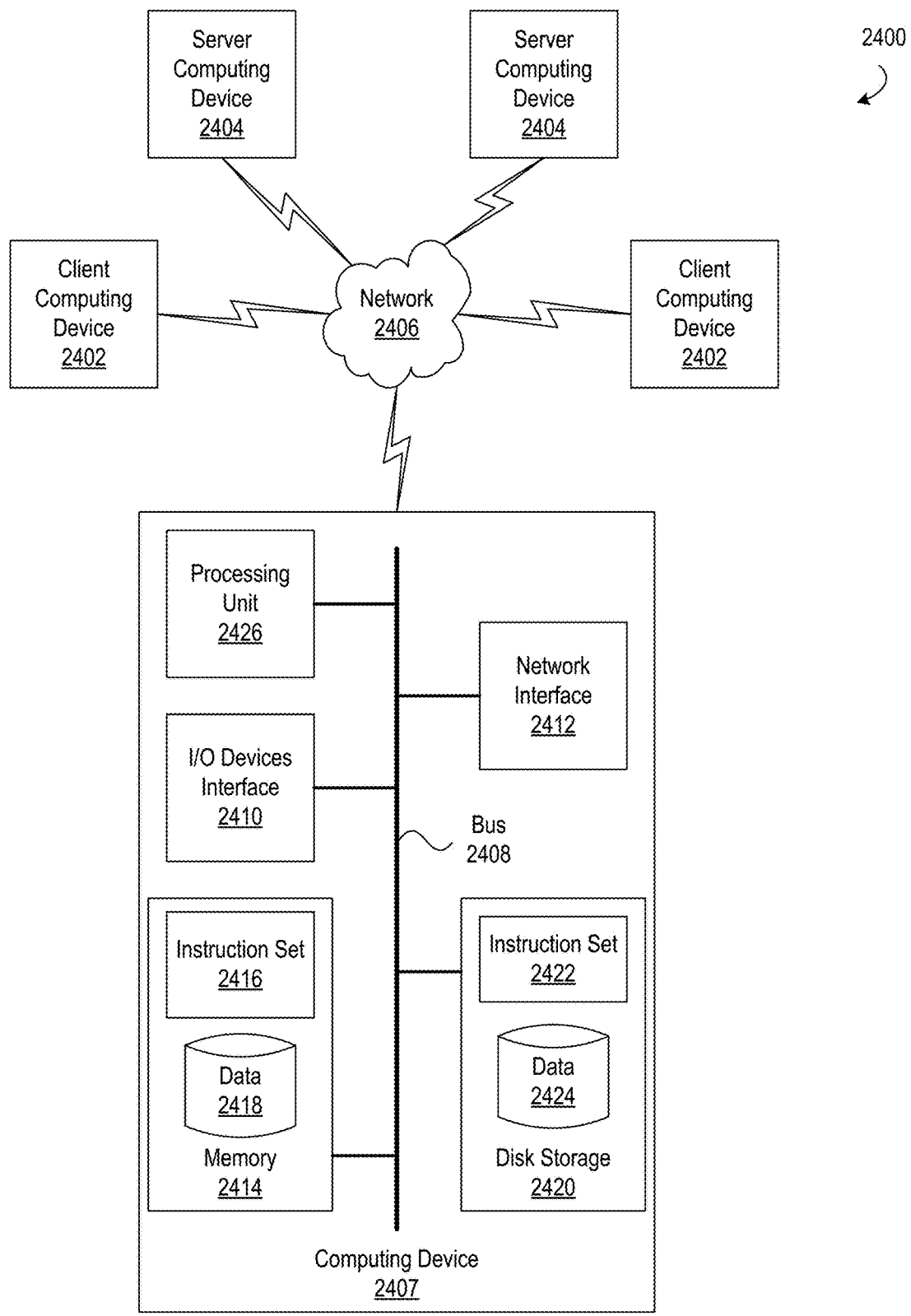
FIG. 24 depicts an example of an implementation of a computing environment in which aspects of the present disclosure may be implemented.

Referring now to FIG. 24, an example of an implementation of a computing environment 2400 in which aspects of the present disclosure may be implemented is shown. The computing environment may include both client computing devices 2402 and server computing devices 2404. The client computing devices 2402 and server computing devices 2404 may provide processing, storage, input/output devices, application programs, and the like. Client computing devices 2402 may include, e.g., desktop computers, laptop computers, tablet computers, palmtop computers, smartphones, smart televisions, and the like. Client computing devices 2402 may also be in signal communication to other computing devices, including other client devices computing devices 2402 and server computing devices 2404 via a network 2406. The network 2406 may be part of a remote access network, a wide area network (e.g., the Internet), a cellular network, a worldwide collection of computers, local area networks, and gateways that currently use respective protocols (e.g., FTP, HTTP, TCP/IP, etc.) to communicate with one another. Other electronic device architectures and computer network architectures may be selectively employed.

FIG. 24 also depicts a block diagram of one of a computing device 2407 of the computing environment 2400. The computing device 2407 contains a bus 2408 the computing device utilizes to transfer information among its components. The bus 2408 connects different components of the computing device 2407 (e.g., processor, disk storage, memory, input/output ports, network ports, etc.) and enables the transfer of information between those components. An I/O device interface 2410 is connected to the bus 2408. The I/O device interface 2410 connects various input and output devices (e.g., keyboard, mouse, microphone, camera, displays, printers, speakers, etc.) to the computing device 2407. A network interface 2412 is also attached to the bus 2408 and allows the computing device 2407 to connect to various other devices attached to a network (e.g., network 2406). The memory 2414 provides volatile storage for one or more instruction sets 2416 and data 2418 used to implement aspects described herein. Disk storage 2420 provides non-volatile storage for one or more instruction sets 2422 (e.g., an operating system) and data 2424 used to implement various aspects described herein. The processing unit 2426 is also attached to the bus 2408 and executes the instructions stored in the memory 2414 and/or the disk storage 2420. The instruction sets 2416 and 2422 as well as the data 2418 and 2424 include a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. At least a portion of the instructions may also be downloaded via the network 2406. As noted above, computer-readable media include all non-transitory computer-readable media and do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as, e.g., HTML, XML, JavaScript, and the like. The executable instructions may be stored on a computer readable medium such as a hard disk, optical disk, removable storage media, solid state memory, RAM, ROM, etc. The functionality of the program modules may be combined or distributed as desired in various embodiments. In addition, the functionality may be embodied in whole or in part in firmware or hardware equivalents such as integrated circuits, field programmable gate arrays (FPGAs), and the like. Various data structures may be used to more effectively implement one or more aspects of the disclosure, and such data structures are contemplated to be within the scope of the executable instructions and computer-usable data described herein.

Aspects of the disclosure have been described in terms of illustrative embodiments thereof. While illustrative systems and methods as described herein embodying various aspects of the present disclosure are shown, it will be understood that the disclosure is not limited to these embodiments. Modifications may be made particularly in light of the foregoing teachings. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method of facilitating device access comprising:
   generating, by a first device, an invitation code for a second device, wherein the second device is part of a mesh network and the second device is configured for wireless communication via a plurality of different low-power wireless communication standards;
   providing, by the first device, the invitation code to a third device, wherein the third device is user-operated and configured to automatically provide the invitation code to the second device in response to receipt of a challenge for the invitation code from the second device; and
   causing the second device and the third device to be paired automatically upon successful validation of the invitation code provided to the second device by the third device in response to the challenge.

2. The method of claim 1, wherein:
   the first device is user-operated.

3. The method of claim 1, wherein:
   the first device is a server located remotely relative to the mesh network.

4. The method of claim 3, wherein providing the invitation code to the third device comprises sending an invitation request from a fourth device to the first device,
   wherein the invitation request comprises a first identifier associated with the second device and a second identifier associated with a user of the third device.

5. The method of claim 4, further comprising:
   displaying a list of a plurality of devices of the mesh network at the fourth device; and
   receiving a selection of the second device at the list.

6. The method of claim 1, further comprising:
   providing the invitation code to the second device for storage.

7. The method of claim 6, wherein:
   providing the invitation code to the second device comprises routing the invitation code via the mesh network to the second device from a gateway device of the mesh network.

8. The method of claim 1, further comprising:
   providing a serial number of the second device to the third device.

9. The method of claim 8, further comprising:
   providing a security token of the second device to the third device, the security token being generated prior to generation of the invitation code.

10. The method of claim 1, wherein:
    the mesh network is associated with a first individual; and
    the third device is associated with a second individual.

11. A method of facilitating device access comprising:
    receiving, by a user-operated device associated with a first user and from a first device, an invitation code, the invitation code being associated with a second device of a mesh network associated with a second user, the second device being configured for wireless communication using a plurality of different low-power wireless communication standards;
    requesting to pair the user-operated device and the second device;
    providing automatically the invitation code from the user-operated device to the second device in response to receipt of a challenge from the second device for the invitation code; and
    pairing the user-operated device and the second device automatically upon successful validation of the invitation code provided to the second device by the user-operated device in response to the challenge.

12. The method of claim 11, further comprising:
    receiving an announcement at the user-operated device from the second device when the user-operated device is within wireless range of the second device;
    wherein the requesting comprises requesting to pair the user-operated device and the second device in response to receipt of the announcement.

13. The method of claim 11, further comprising:
    receiving, by the user-operated device, an encryption key associated with the second device, the encryption key being generated prior to generation of the invitation code; and
    using the encryption key to encrypt a wireless communication transmitted from the user-operated device to the second device during a wireless communication session established after the pairing.

14. The method of claim 11, further comprising:
    receiving, by the user-operated device, a serial number of the second device; and
    transmitting a wireless communication comprising the serial number from the user-operated device to the second device during a wireless communication session established after the pairing.

15. The method of claim 11, further comprising:
    receiving, by the user-operated device from the first device, a security token associated with the second device, the security token being generated prior to generation of the invitation code; and
    transmitting a wireless communication comprising the security token from the user-operated device to the second device during a wireless communication session established after the pairing.

16. The method of claim 11, further comprising:
    receiving, by the user-operated device from the first device, a serial number of the second device and a security token associated with the second device, the security token being generated prior to generation of the invitation code;
    wherein the providing comprises providing automatically the serial number and the security token to the second device in response to receipt of the challenge.

17. A method of facilitating device access comprising:
    storing, subsequent to receiving from a first device, an invitation code at a second device of a mesh network associated with a first individual, the second device being configured for wireless communication using a plurality of different low-power wireless communication standards;

receiving, by the second device, a request to pair the second device and a user-operated device associated with a second individual;

challenging, by the second device, the user-operated device to provide the invitation code in response to receipt of the request;

validating, by the second device, the invitation code provided by the user-operated device in response to the challenging; and pairing the second device with the user-operated device upon successful validation of the invitation code.

18. The method of claim 17, further comprising:

receiving, during a wireless communication session established after the pairing, a wireless communication comprising a serial number at the second device and from the user-operated device; and comparing the serial number received from the user-operated device to a serial number of the device.

19. The method of claim 17, further comprising:

receiving during a wireless communication session established after the pairing, a wireless communication comprising a security token at the second device and from the user-operated device; and comparing, by the second device, the security token received from the user-operated device to a security token associated with the second device, the security token associated with the second device being generated prior to generation of the invitation code.

20. The method of claim 17, further comprising:

receiving, automatically in response to the challenging, a wireless communication at the second device and from the user-operated device, the wireless communication comprising the invitation code, a serial number, and a security token;

comparing, by the second device, the serial number received from the user-operated device to a serial number of the second device; and comparing, by the second device, the security token received from the user-operated device to a security token associated with the second device, the security token associated with the second device being generated prior to generation of the invitation code.

* * * * *